US009871255B2

(12) United States Patent
Swiegers et al.

(10) Patent No.: US 9,871,255 B2
(45) Date of Patent: Jan. 16, 2018

(54) MODULAR ELECTROCHEMICAL CELLS

(71) Applicant: AquaHydrex Pty Ltd, North Wollongong (AU)

(72) Inventors: Gerhard Frederick Swiegers, Woonona (AU); Stephen Thomas Beirne, Farmborough Heights (AU); Jun Chen, Balgownie (AU); Caiyun Wang, Mangerton (AU)

(73) Assignee: AquaHydrex Pty Ltd, North Wollongong (AU)

( * ) Notice: Subject to any disclaimer, the term of this patent is extended or adjusted under 35 U.S.C. 154(b) by 4 days.

(21) Appl. No.: 14/908,352

(22) PCT Filed: Jul. 30, 2014

(86) PCT No.: PCT/AU2014/050161
§ 371 (c)(1),
(2) Date: Jan. 28, 2016

(87) PCT Pub. No.: WO2015/013766
PCT Pub. Date: Feb. 5, 2015

(65) Prior Publication Data
US 2016/0211528 A1 Jul. 21, 2016

(30) Foreign Application Priority Data

Jul. 31, 2013 (AU) ................................ 2013902844
Dec. 10, 2013 (AU) ................................ 2013804804
(Continued)

(51) Int. Cl.
*H01M 4/86* (2006.01)
*C25B 15/02* (2006.01)
(Continued)

(52) U.S. Cl.
CPC ............. *H01M 4/8626* (2013.01); *C25B 1/13* (2013.01); *C25B 1/14* (2013.01); *C25B 1/245* (2013.01);
(Continued)

(58) Field of Classification Search
CPC .... H01M 4/8626; H01M 4/8807; H01M 8/08; H01M 8/04104; H01M 4/8605;
(Continued)

(56) References Cited

U.S. PATENT DOCUMENTS 3,284,243 A   11/1966   Von Sturm
3,553,029 A    1/1971   Kordesch et al.
(Continued)

FOREIGN PATENT DOCUMENTS

CA   2238738    6/1997
DE   29823321   8/1999
(Continued)

OTHER PUBLICATIONS

Winther-Jensen et al., "Towards hydrogen production using a breathable electrode structure to directly separate gases in the water splitting reaction," International Journal of Hydrogen Energy, May 2012, pp. 8185-8189, vol. 37, No. 10, Elsevier Ltd.

*Primary Examiner* — Cynthia K Walls
(74) *Attorney, Agent, or Firm* — Knobbe Martens Olson and Bear LLP

(57) ABSTRACT

A gas diffusion electrode for an electro-synthetic or electro-energy cell, for example a fuel cell, including one or more gas permeable layers, a first conductive layer provided on a first side of the gas diffusion electrode, and a second layer, which may be a second conductive layer, provided on a second side of the gas diffusion electrode. The one or more gas permeable layers are positioned between the first conductive layer and the second layer, which may be a second
(Continued)

conductive layer, and the one or more gas permeable layers provide a gas channel. The one or more gas permeable layers are gas permeable and substantially impermeable to the liquid electrolyte. The porous conductive material is gas permeable and liquid electrolyte permeable. The gas diffusion electrode can be one of a plurality of alternating anode/cathode sets.

52 Claims, 26 Drawing Sheets

(30) Foreign Application Priority Data

| Dec. 10, 2013 | (AU) | 2013904802 |
|---|---|---|
| Dec. 10, 2013 | (AU) | 2013904803 |
| Dec. 10, 2013 | (AU) | 2013904806 |

(51) Int. Cl.

| C25C 7/00 | (2006.01) |
|---|---|
| C25B 9/08 | (2006.01) |
| H01M 8/04089 | (2016.01) |
| C25B 1/13 | (2006.01) |
| C25B 1/14 | (2006.01) |
| C25B 1/24 | (2006.01) |
| C25B 1/26 | (2006.01) |
| C25B 1/30 | (2006.01) |
| C25B 3/00 | (2006.01) |
| C25B 11/03 | (2006.01) |
| H01M 8/08 | (2016.01) |
| H01M 4/88 | (2006.01) |
| H01M 8/083 | (2016.01) |

(52) U.S. Cl.
CPC .............. *C25B 1/26* (2013.01); *C25B 1/265* (2013.01); *C25B 1/30* (2013.01); *C25B 3/00* (2013.01); *C25B 9/08* (2013.01); *C25B 11/035* (2013.01); *C25B 15/02* (2013.01); *C25C 7/00* (2013.01); *H01M 4/8605* (2013.01); *H01M 4/8807* (2013.01); *H01M 8/04104* (2013.01); *H01M 8/08* (2013.01); *H01M 8/083* (2013.01); *H01M 2300/0011* (2013.01); *Y02E 60/366* (2013.01)

(58) Field of Classification Search
CPC .. C25B 1/265; C25B 1/26; C25B 1/14; C25B 11/035; C25B 1/13; C25B 3/00; C25B 1/30; C25B 1/245; C25B 15/02; C25B 9/08
See application file for complete search history.

(56) References Cited

U.S. PATENT DOCUMENTS

| 3,697,410 | A | 10/1972 | Johnson et al. |
|---|---|---|---|
| 3,854,994 | A | 12/1974 | Binder et al. |
| 3,923,629 | A | 12/1975 | Shaffer |
| 4,091,176 | A | 5/1978 | Alfenaar |
| 4,564,427 | A | 1/1986 | Gruver et al. |
| 4,568,442 | A | 2/1986 | Goldsmith |
| 4,581,116 | A | 4/1986 | Plowman et al. |
| 4,586,999 | A | 5/1986 | Goldsmith et al. |
| 4,865,925 | A | 9/1989 | Ludwig et al. |
| 5,242,765 | A | 9/1993 | Naimer et al. |
| 5,336,570 | A | 8/1994 | Dodge |
| 5,376,253 | A | 12/1994 | Rychen et al. |
| 5,396,253 | A | 3/1995 | Chia |
| 5,423,967 | A | 6/1995 | Kunimatsu et al. |
| 5,538,608 | A | 7/1996 | Furuya |
| 6,203,676 | B1 | 3/2001 | Phillips et al. |
| 6,368,473 | B1 | 4/2002 | Furuya et al. |
| 6,733,639 | B2 | 5/2004 | Busse et al. |
| 7,229,944 | B2 | 6/2007 | Shao-Horn et al. |
| 7,326,329 | B2 | 2/2008 | Gomez |
| 7,651,602 | B2 | 1/2010 | Helmke et al. |
| 2002/0150812 | A1 | 10/2002 | Kaz et al. |
| 2003/0035990 | A1 | 2/2003 | Washima |
| 2005/0036941 | A1 | 2/2005 | Bae et al. |
| 2005/0106450 | A1 | 5/2005 | Castro et al. |
| 2007/0131556 | A1 | 6/2007 | Lambie |
| 2007/0246351 | A1 | 10/2007 | Smola et al. |
| 2008/0014491 | A1* | 1/2008 | Yajima ............ H01M 8/04149 429/414 |
| 2008/0070076 | A1 | 3/2008 | Makita et al. |
| 2008/0155813 | A1 | 7/2008 | Dopp et al. |
| 2008/0311463 | A1 | 12/2008 | Park et al. |
| 2009/0078568 | A1 | 3/2009 | Ramaswami et al. |
| 2009/0101521 | A1 | 4/2009 | Bayer et al. |
| 2009/0162714 | A1 | 6/2009 | Nakanishi et al. |
| 2009/0165933 | A1 | 7/2009 | Losch et al. |
| 2009/0272648 | A1 | 11/2009 | Pratt |
| 2009/0305084 | A1 | 12/2009 | Crookes et al. |
| 2010/0314038 | A1* | 12/2010 | Tanuma ............ H01M 8/0234 156/249 |
| 2010/0314261 | A1 | 12/2010 | Perry |
| 2011/0229790 | A1 | 9/2011 | Sato et al. |
| 2011/0253526 | A1 | 10/2011 | McAlister |
| 2012/0021303 | A1 | 1/2012 | Amendola et al. |
| 2012/0149789 | A1 | 6/2012 | Greenbaum |
| 2012/0308807 | A1 | 12/2012 | Edwards |
| 2013/0017414 | A1 | 1/2013 | He |
| 2013/0092532 | A1 | 4/2013 | Monzyk et al. |
| 2013/0183591 | A1 | 7/2013 | Dickson |
| 2013/0189592 | A1 | 7/2013 | Roumi et al. |
| 2013/0209919 | A1 | 8/2013 | Amendola et al. |

FOREIGN PATENT DOCUMENTS

| EP | 1449292 | 8/2004 |
|---|---|---|
| EP | 1843415 | 10/2007 |
| EP | 1658652 | 1/2011 |
| GB | 1542690 | 3/1979 |
| JP | 2004-250736 | 9/2004 |
| WO | WO 2002/014224 | 2/2002 |
| WO | WO 2003/035939 | 5/2003 |
| WO | WO 2003/042430 | 5/2003 |
| WO | WO 2003/047011 | 6/2003 |
| WO | WO 2009/015127 | 1/2009 |
| WO | WO 2011/089904 | 7/2011 |
| WO | WO 2011/094295 | 8/2011 |
| WO | WO 2011/146558 | 11/2011 |
| WO | WO 2012/012558 | 1/2012 |
| WO | WO 2012/021550 | 2/2012 |
| WO | WO 2012/075546 | 6/2012 |
| WO | WO 2012/122600 | 9/2012 |
| WO | WO 2013/037902 | 3/2013 |
| WO | WO 2013/185170 | 12/2013 |
| WO | WO 2014/088628 | 6/2014 |

* cited by examiner (a)

(b)

(a) - Cathode (b) - Anode

MODULAR ELECTROCHEMICAL CELLS

TECHNICAL FIELD

The present invention relates to electrochemical cells, modular electrochemical cells and configurations of electrochemical cells for bringing about gas-to-liquid or liquid-to-gas transformations. For example, the electrochemical cell may be a fuel cell.

BACKGROUND

Numerous electrochemical processes involve gas-to-liquid or liquid-to-gas transformations. For example, hydrogen-oxygen fuel cells typically utilize the transformation of gaseous oxygen and hydrogen into liquid water at solid-phase, electrically-connected catalysts, like platinum metal.

Many gas-to-liquid or liquid-to-gas processes are most effectively carried out by so-called Gas Diffusion Electrodes (GDEs). At the present time, commercially available GDEs typically comprise fused, porous layers of conductive particles (usually carbon particles) of different size. The outer-most layers typically contain particles of the smallest dimensions, fused together with lesser amounts of hydrophobic PTFE (polytetrafluoroethylene, or Teflon™) binder. The inner-most layers typically contain the largest particles. There may be multiple intermediate layers of intermediary particle size.

The intention of this gradation in particle size within GDEs, from largest in the center to smallest on the outer sides, is to create and control a three-phase solid-liquid-gas boundary within the electrode. This boundary should have the largest possible surface area. The creation of such a boundary is achieved, effectively, by controlling the average pore sizes between the particles, ensuring that the smallest pore sizes are at the edges and the largest are in the center. Since the pores are typically relatively hydrophobic (due to the PTFE binder), the small pore sizes at the edges (e.g. 30 microns pore size) act to hinder and limit the ingress of liquid water into the GDE. That is, water can penetrate only a relatively short distance into the GDE, where the electrochemically active surface area per unit volume, is largest. By contrast, the larger pores in the centre of the GDE (e.g. 150 microns pore size), allow for ready gas transmission at low pressure along the length of the GDE, with the gas then forming a three-way solid-liquid-gas boundary with the liquid water at the edges of the GDE, where the electrochemically active surface area per unit volume is the largest.

Layered porous electrode structures are presently the industry standard for:
(1) conventional free-standing GDEs (for example, of the type used in hydrogen-oxygen PEM fuel cells); and
(2) hybrid GDEs, where a GDE layer has been incorporated within an electrode, typically between a current collector and the gas zone.

GDEs of this type often display significant technical problems during operation. These largely derive from the difficulty of creating a seamlessly homogeneous particulate bed, with uniform pore sizes and distributions, and uniform hydrophobicity (imparted by the hydrophobic PTFE binder within the GDE). Because of the resulting relative lack of uniformity in the GDE structure, the three-phase solid-liquid-gas boundary created within the GDE may be:

Unstable and fluctuating. The location of the boundary within the GDE may be subject to changing conditions during reaction which cause the boundary to constantly re-distribute itself to new locations within the GDE during operation.

Inhomogeneous. The boundary may be located at widely and unpredictably divergent depths within the GDE as one traverses the length of the GDE.

Inconsistent and ill-defined. At certain points within the GDE, there may be multiple and not a single solid-liquid-gas boundary.

Prone to failure. The boundary may fail at certain points within the GDE during operation, causing a halt to the desired chemical reaction. For example, a common failure mode is that the GDE becomes completely filled with the liquid phase, thereby destroying the three-phase boundary; this is known in the industry as "flooding". Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. In all cases, flooding induces a decline in the voltage output and power generation of such fuel cells.

Problems of this type are not conducive to optimum or enhanced operations and may result in uneven, low-yielding, incomplete or incorrect reactions, amongst others.

Conventional 3D Particulate Fixed-Bed Electrodes and GDEs

At the present time, 3D particulate fixed bed electrodes and gas diffusion electrodes (GDEs) are conventionally fabricated by mixing carbon black and PTFE powders and then compressing the solid mixture into a bulk, porous electrode.

The pore size of the resulting structure may be very roughly controlled by managing the particle size of the particulates used. However, it is difficult to achieve a uniform pore size throughout the electrode using this approach because particles, especially "sticky" particles like PTFE, often do not flow evenly and distribute themselves uniformly when compressed. A wide range of pore sizes are therefore typically obtained. It is, moreover, generally not possible to create structures with uniformly small pore sizes, such as 0.05 µm-0.5 µm in size.

The hydrophobicity of the structure is typically controlled by managing the relative quantity of PTFE incorporated into the structure. The PTFE holds the structure together and creates the required porosity. However, its quantity must be carefully controlled so as to impart the electrode with an appropriately intermediate hydrophobicity. An intermediate hydrophobicity is needed to ensure partial, but not complete water ingress. In the case of GDEs, this is needed to thereby create a solid-liquid-gas boundary within the carbon black matrix that makes up the electrode.

This method of constructing 3D particulate fixed bed electrodes and gas diffusion electrodes creates some significant practical problems when operating such electrodes in industrial electrochemical cells, particularly in electro-synthetic and electro-energy (e.g. fuel cell) applications. These problems include the formation of three-way solid-liquid-gas boundaries that are: ill-defined, inconsistent, unstable, fluctuating, inhomogeneous, and prone to failures like flooding.

Problems of this type largely arise from the intrinsic lack of control in the fabrication process, which attempts to create all of the inherent properties of the electrode— including porosity, hydrophobicity, and conductivity—in a single step. Moreover, the fabrication method seeks to simultaneously optimise all of these properties within a single structure. This is often not practically possible since the properties are inter-related, meaning that optimising one may degrade another.

Despite these drawbacks, the approach of combining particulate carbon black and PTFE into a compressed or sintered fixed bed remains the standard method of fabricating GDEs for industrial electrochemistry. This approach is used to fabricate, for example, free-standing GDEs of the type used in hydrogen-oxygen PEM fuel cells.

Even where only a GDE component is required within an electrode, the standard method of fabricating that GDE component is to form it as a compressed, porous layer of particulate carbon black and PTFE.

FIG. 1 (prior art) depicts in a schematic form, a conventional 3D particulate fixed bed electrode or a gas diffusion electrode (GDE) 110, as widely used in industry at present.

In a conventional 3D particulate fixed bed electrode or GDE 110, a conductive element (e.g. carbon particles) is typically combined (using compression/sintering) with a non-conductive, hydrophobic element (e.g. polytetrafluoroethylene (PTFE) Teflon™ particles) and catalyst into a single, fixed-bed structure 110. The fixed-bed structure 110 has intermediate hydrophobicity, good but not the best available conductivity, and a pore structure that is non-uniform and poorly defined over a single region 113. When the 3D particulate fixed bed electrode or GDE 110 is then contacted on one side by a liquid electrolyte and on the other side by a gaseous substance, these physical features bring about the formation of an irregularly-distributed three-phase solid-liquid-gas boundary within the body of the electrode 110, below its outer surface 112 and within single region 113, as illustrated in the magnified view presented in FIG. 1. At the three-phase boundary, electrically connected catalyst (solid phase) is in simultaneous contact with the reactants (in either the liquid or the gas phase) and the products (in the other one of the liquid or gas phase). The solid-liquid-gas boundary within the GDE 110 therefore provides a boundary at which electrochemical liquid-to-gas or gas-to-liquid reactions may be facilitated by, for example, the application of a particular electrical voltage. The macroscopic width of the three-phase solid-liquid-gas boundary is comparable or similar in dimension to the width of the conventional GDE. The thickness of the three-phase solid-liquid-gas boundary in a conventional GDE is typically in the range of from 0.4 mm to 0.8 mm in fuel cell GDEs up to, higher thicknesses, such as several millimeters, in industrial electrochemical GDEs.

These problems generally originate in the physical properties of conventional GDEs and typically render the use of GDEs unviable in most common industrial electrochemical processes. We can illustrate this by considering, as a representative example, the phenomena of flooding described above.

Most modern-day, conventional GDEs have exceedingly low "wetting pressures" that are typically less than 0.1 bar. If a 0.1 bar or greater pressure were applied to the electrolyte, the GDE will then flood in part or completely, resulting in electrolyte leaking out of the cell. This is a significant problem in industrial electrochemistry because many cells, for example, employ water electrolyte with a depth greater than 1 meter in the cell. Water, however, experiences a pressure of 0.1 bar at a depth of 1 meter below the surface, meaning that the electrolyte chamber in the cell would leak if a conventional GDE is used as one of the cell's electrodes without additional means applied to balance the trans-GDE pressure differential along the depth of the GDE.

In other industrial electrochemical cells, electrolyte is routinely pumped around the cell. Unless expensive pressure-compensation equipment is installed, such pumping actions would readily generate a pressure of 0.1 bar or more, thereby causing the cell to leak if a GDE were used as one of the electrodes.

Many industrial electrochemical cells furthermore operate most effectively when the liquid electrolyte is pressurised to, for example, several bars of pressure. If a GDE were used as an electrode, then the gases within the GDE would have to be pressurised to within 0.1 bar of the liquid pressure at all times to avoid flooding and consequential leaking. This is generally not technically or economically feasible.

Many industrial electrochemical processes moreover operate optimally only under higher temperatures (e.g. over 80° C.). However, flooding in GDEs may also be caused by a build-up of water vapour in the gas phase, which may then progressively condense in the GDE until the GDE is filled, in part or completely, with water. This is typically facilitated by the relatively ready wettability of conventional gas diffusion electrodes and occurs under conditions of higher temperature and humidity.

The technical problems associated with currently-available GDEs, along with their high cost and other factors, therefore mean that it is generally commercially and technically unviable to use GDEs in many present-day industrial electrochemical gas-to-liquid or liquid-to-gas processes. The effect of this is two-fold:

(1) Potential industrial efficiencies in production are not realised. A key problem with avoiding the use of GDEs is that the technical and other efficiencies associated with their use are not realised. This is true even for processes that should, theoretically, be dramatically improved by the use of GDEs as electrodes. For example, the chlor-alkali process, which is estimated to consume 2% of the world's electricity and is one of the most widely used industrial electro-synthetic processes, does not generally employ GDEs due to at least some of the above discussed problems, even though their use could otherwise dramatically cut energy consumption. Instead, conventional electrodes, with all of their attendant inefficiencies are still routinely employed.

(2) Small-scale, decentralized, "on-site" production is disfavoured despite its potential efficiencies. Many industrial electrochemical gas-to-liquid or liquid-to-gas processes cannot be feasibly carried out in small-scale "on-site" generators at the point where they are needed by an industrial user. Instead, such industrial electrochemical processes are limited to very large-scale installations in centralised facilities, whose products (which are often toxic or hazardous) must then be transported to the point at which they are needed by industrial users. For example, the chlor-alkali process is still mostly carried out in exceedingly large, centralized plants, with the chlorine distributed in cylinders, pipelines or other means to users.

A key problem in the example case of the chlor-alkali process is that conventional GDEs leak when used in the chlor-alkali process. Numerous patent specifications have described approaches to overcoming this problem. For example, WO 2003035939, WO 2003042430, and, more recently, WO 2013037902, have described fabrication techniques to create Gas Diffusion Electrodes capable of withstanding 0.1 bar pressure and thereby avoiding leaking when the trans-GDE pressure is appropriately managed.

In summary, there exists a need for new or improved electrochemical cells and/or configurations of electrochemical cells. For example, there is a need for a GDE that overcomes or ameliorates at least some of the technical and/or cost difficulties associated with currently available conventional GDEs, and thereby allows for the development of new or improved electrochemical cells and/or configurations of electrochemical cells. For example, which may be small-scale, "on-site" gas-to-liquid or liquid-to-gas electrochemical cells, devices or reactors. In another aspect, there is a need for electrochemical cells that can better or maximally realise the energy and other efficiencies that may be generally conferred by gas diffusion electrodes upon such processes.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

This Summary is provided to introduce a selection of concepts in a simplified form that are further described below in the Examples. This Summary is not intended to identify all of the key features or essential features of the claimed subject matter, nor is it intended to be used to limit the scope of the claimed subject matter.

In one example aspect, there is provided an electrode, preferably a Gas Diffusion Electrode (GDE), which can be used as part of an electro-synthetic, electrochemical or electro-energy cell, device or reactor. Preferably, the Gas Diffusion Electrode is relatively inexpensive, robust and/or mechanically strong. Also preferably, the Gas Diffusion Electrode has a relatively high wetting pressure and relatively high electrochemical activity. Embodiments of the Gas Diffusion Electrodes can, consequently, be readily, generally and/or beneficially deployed as gas diffusion and/or gas depolarized electrodes in a variety of industrial electrochemical, electro-energy and/or electro-synthetic processes, cells, devices and/or reactors.

In another example aspect, there is provided a gas diffusion electrode for an electro-synthetic or electro-energy cell, comprising: one or more gas permeable layers; a first conductive layer provided on a first side of the gas diffusion electrode; wherein the one or more gas permeable layers provide a gas channel. Preferably, the first conductive layer comprises a porous conductive material. In another example, a second layer is provided on a second side of the gas diffusion electrode. Preferably, the one or more gas permeable layers are positioned between the first conductive layer and the second layer. In another example, the second layer provides a second conductive layer.

In one example form, example 3D electrodes or GDEs of the current embodiments are distinguished from conventional particulate fixed-bed GDEs in that they separate the key features of a 3D electrode or GDE into two, or at least two, distinct regions, each of whose properties improve upon and may be more fully controlled than is possible within the single body of a conventional GDE. An example embodiment of such a 3D electrode or GDE may comprise a liquid-and-gas-porous conductive material, which can optionally also include a catalyst which is enhanced or optimized for its catalytic capabilities and conductivity. The conductive material is attached to, coupled to, touching, positioned adjacent to, or abuts, a gas permeable material that is non-conductive and liquid electrolyte impermeable during normal operational use of the electrode, e.g. which may be hydrophobic, for which the pore structure is selected, enhanced or optimised for gas transport properties. Normal operational use is, for example, when the electrode is functioning as intended and not flooded. In an example, a surface of the gas permeable material is facing the porous conductive material. The surface of the gas permeable material may, but need not necessarily, touch or contact the porous conductive material, for example there may be an intermediary binder material or layer that can include one or more catalysts. At or near the surface of the gas permeable material is an interface or boundary region of the gas permeable material and the porous conductive material. When the electrode is in use, a three-phase solid-liquid-gas boundary is able to form at or near the surface of the gas permeable material facing the porous conductive material. In this context, "at or near" the surface is intended to mean within a distance being the thickness of a binder material (if present, and as discussed herein), or within a distance being the macroscopic width of the three-phase solid-liquid-gas boundary itself, or within a distance of any overlap of the gas permeable material and the porous conductive material, or within a distance being the width of the porous conductive material. The three-phase solid-liquid-gas boundary need not form precisely 'at' the surface, but can form 'near' the surface in the sense of being close, neighboring, adjoining, immediately next to or within, or proximate. The three-phase solid-liquid-gas boundary can further move in response to the application of an excess gas or liquid pressure, however the boundary will remain 'near' to the surface as described during normal operational use.

The two regions (being a first region including the porous conductive material and a second region including the non-conductive gas permeable material) are substantially distinct, demarcated or separated, although they are positioned adjacent, abut, touch or adjoin each other, so that there is an interface or a boundary region, or possibly an overlap.

In such an example embodiment, the non-conductive, liquid electrolyte impermeable or hydrophobic, gas permeable material has pores that are better defined, more uniform, and of smaller average size, than can be achieved in a conventional GDE. The liquid-and-gas-porous conductor, preferably provided with a catalyst, may be more conductive than a conventional GDE, while its low hydrophobicity may see the porous conductor completely or substantially completely filled with liquid electrolyte under normal operating conditions, thereby enhancing or maximally facilitating catalysis. In contrast, in a preferred form, the high hydrophobicity of the non-conductive, hydrophobic, gas permeable material will typically see the gas permeable material completely empty or substantially empty of liquid electrolyte at atmospheric pressure, thereby enhancing or maximally facilitating gas transport into and out of the GDE.

When such an example embodiment 3D electrode or GDE is contacted on the conductive side by a liquid electrolyte and on the non-conductive side by a gaseous material, then the above physical features cause the formation of a three-phase solid-liquid-gas boundary at or near a surface of the gas permeable material facing the porous conductive material, which also can be at the interface between the two distinct regions. This boundary is quite different to the three-phase solid-liquid-gas boundary in a conventional GDE. It differs in that it is better defined, narrower, more stable and/or more robust than can be achieved in a conventional GDE. Thus, in operation of a preferred embodiment, a three-phase solid-liquid-gas boundary forms at or near a surface of the gas permeable material facing the porous conductive material (which may also be at the interface, or a boundary region, of the porous conductive material, which can include a catalyst, and the non-conductive gas permeable material). This provides a three-phase solid-liquid-gas boundary with a relatively narrow macroscopic width, for example in comparison to the width or thickness of the electrode.

These features are important because the inventors have found that example embodiment 3D electrodes or GDEs can provide, at or near the interface of the two regions, an enhanced or optimum pore structure, for example hydrophobic pore structure, that facilitates improved or maximum gas transport, with an enhanced or optimally conductive, improved or maximally catalytic structure. In effect, at the three-phase solid-liquid-gas boundary in example embodiment 3D electrodes or GDEs, each of the critical properties of a gas diffusion electrode may be made ideal, or, at least, nearer to ideal than is otherwise possible.

The inventors have further found that the effect of this enhancement or optimisation yields surprising and remarkable electrochemical performance. Despite the three-phase solid-liquid-gas boundary being narrower and confined to what appears to be a two dimensional (2D), or substantially 2D, macroscopic geometry, the electrochemical capabilities of the three-phase solid-liquid-gas boundary in example embodiment 3D electrodes or GDEs substantially improves upon and, in fact, far exceed those of conventional GDEs.

These enhancements provide unexpected improvements over conventional GDEs. They appear to arise because the fabrication of conventional particulate fixed-bed GDEs as currently employed in the art, is predicated on creating all of the important physical properties at the same time within a single material. Such an approach effectively ignores the fact that the key properties of GDEs (namely: pore structure, hydrophobicity, gas transport, liquid transport, conductivity and catalytic activity) are typically inter-dependent and are therefore not open to ready, concurrent enhancement or optimisation within a single material. Example embodiment GDEs as described herein take account of this limitation and separately optimise one or more of the key properties, to thereby achieve more ideal overall properties at the interface of the two distinct regions.

As used herein, a three-dimensional (3D) electrode is a solid, gas permeable or liquid flow-through electrode whose effective surface area is greater than the geometric 2D surface area of the electrode. 3D electrodes are non-planar electrodes that typically improve the transport of one or more reactant species to the 3D electrode's surface (by utilising the increased effective surface area). Reference to 3D electrodes should be read as also including flow-through electrodes or porous electrodes.

Reference to a gas permeable material should be read as a general reference including any form or type of gas permeable medium, article, layer, membrane, barrier, matrix, element or structure, or combination thereof.

Reference to a gas permeable material should also be read as including any medium, article, layer, membrane, barrier, matrix, element or structure that is penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material may be porous, may be a composite of at least one non-porous material and one porous material, or may be completely non-porous. The gas permeable material can also be referred to as a "breathable" material. By way of clarifying example only, without imposing any limitation, an example of a gas permeable material is a porous matrix, and an example of a substance from which the gas permeable material is made or formed is PTFE.

Reference to a porous conductive material should be read as including any medium, article, layer, membrane, barrier, matrix, element or structure that is penetrable to allow movement, transfer, penetration or transport of one or more gases and/or liquids through or across at least part of the material, medium, article, layer, membrane, barrier, matrix, element or structure (i.e. the porous conductive material). That is, a substance of which the porous conductive material is made may or may not be gas and/or liquid permeable itself, but the material, medium, article, layer, membrane, barrier, matrix, element or structure formed or made of, or at least partially formed or made of, the substance is gas and/or liquid permeable. The porous conductive material may be a composite material, for example composed of more than one type of conductive material, metallic material, or of a conductive or metallic material(s) and non-metallic material(s). By way of clarifying examples only, without imposing any limitation, examples of porous conductive materials include porous or permeable metals, conductors, meshes, grids, lattices, cloths, woven or non-woven structures, webs or perforated sheets. The porous conductive material may also be a material that has "metal-like" properties of conduction. For example, a porous carbon cloth may be considered a porous conductive material since its conductive properties are similar to those of a metal.

The porous conductive material may be a composite material, for example composed of more than one type of conductive material, metallic material, or of a conductive or metallic material(s) and non-metallic material(s). Furthermore, the porous conductive material may be one or more metallic materials coated onto at least part of the gas permeable material, for example sputter coated, or coated or deposited onto at least part of a separate gas permeable material that is used in association with the gas permeable material. By way of clarifying examples only, without imposing any limitation, examples of porous conductive materials include porous or permeable metals, conductors, meshes, grids, lattices, cloths, woven or non-woven structures, webs or perforated sheets. The porous conductive material may be a separate material/layer attached to the gas permeable material, or may be formed on and/or as part of the gas permeable material (e.g. by coating or deposition). The porous conductive material may also be a material that has "metal-like" properties of conduction. For example, a porous carbon cloth may be considered a 'porous conductive material' since its conductive properties are similar to those of a metal.

A desirable feature of example GDEs of the current embodiments is their ability to contain electrolytes, for example water, acid, or caustic, within electrochemical cells and devices even at relatively high applied pressures on the liquid electrolyte, whilst simultaneously bringing gases, for example oxygen or hydrogen, to the electrode interface without any need for bubble formation or substantial bubble formation. Moreover, example GDEs of the current embodiments may be significantly less expensive than conventional GDEs.

In a further example aspect, there is provided a gas permeable 3D electrode comprising: a gas permeable material; and a porous conductive material attached to or positioned adjacent to the gas permeable material. In a preferred aspect, the gas permeable material is non-conductive and liquid electrolyte impermeable, e.g. hydrophobic, during normal operational use of the electrode. Preferably, a three-phase solid-liquid-gas boundary is able to form at or near a surface of the gas permeable material facing the porous conductive material. In another example aspect, there is provided a gas permeable 3D electrode comprising: a gas permeable material, preferably that is non-conductive and liquid electrolyte impermeable; a porous conductive material attached to or positioned adjacent to the gas permeable material; and a catalyst in electrical communication with the porous conductive material, where the catalyst may be located on the porous conductive material or on the gas permeable material, or the catalyst may be located on both the porous conductive material and the gas permeable material. In other example aspects, the porous conductive material can be attached to, fixed to, positioned adjacent, or positioned near with some degree of separation, the gas permeable material. In another example aspect, the porous conductive material is preferably attached to the gas permeable material by using a binder material, which may also be provided with one or more catalysts. The gas permeable 3D electrode can also be termed a gas permeable composite 3D electrode.

In a preferred example, the gas permeable material is non-conducting and impermeable to a liquid electrolyte, during normal operational use of the electrode, and the porous conductive material is permeable to the liquid electrolyte. Preferably the gas permeable material is a different material to the porous conductive material, which are provided as sheets or layers and laminated together.

Further aspects, details and applications of example 3D electrodes and GDEs that can be utilised can be found in the Applicant's concurrently filed PCT patent applications "Composite Three-Dimensional Electrodes and Methods of Fabrication" filed on 30 Jul. 2014, "Method and Electrochemical Cell for Managing Electrochemical Reactions" filed on 30 Jul. 2014, and "Electro-Synthetic or Electro-Energy Cell with Gas Diffusion Electrode(s)" filed on 30 Jul. 2014, which are all incorporated herein by reference.

The combination of the above properties means that example GDEs of the present embodiments can provide an inexpensive, robust, and/or mechanically-strong GDE that has a relatively high wetting pressure and unusually high electrochemical activity. GDEs of this class or type can, consequently, be readily, generally, and beneficially deployed as gas electrodes in a variety of industrial electrochemical processes and devices. This additionally provides the ability to manage electrochemical reactions using the example GDEs.

It has further been realised by the inventors that the unique qualities of the developed electrodes or GDEs, along with other physical properties, are indicative of a powerful proclivity by electrodes and GDEs of this class or type, to facilitate gas depolarization reactions at electrodes, for example the counter electrode, in industrial electrochemical, electro-synthetic and/or electro-energy processes, cells and/or devices. These advantageous properties are believed to arise from the unique features of distinctive 3D electrodes and GDEs.

The porous conductive material can be attached to the gas permeable material by being adhered to or laminated to the gas permeable material. Alternatively, the porous conductive material can be provided on the gas permeable material by being coated on or deposited on at least part of the gas permeable material. Alternatively, the gas permeable material can be provided on the porous conductive material by being coated on or deposited on at least part of the porous conductive material.

A feature of GDEs of this type or class is that they can display substantially high, high or even extraordinarily high wetting pressures. For example, when an ePTFE membrane with about 0.2 µm sized pores are used for the liquid impermeable and gas permeable material of GDEs, then the resulting GDEs typically display wetting pressures that are very similar to the wetting pressures of the membranes themselves; namely, about 3.4 bar. The addition of a barrier layer or film that permits transport of the reactant/product gas but excludes water vapour would typically elevate this wetting pressure still further. The result is very substantially greater wetting pressures than displayed by conventional GDEs, which do not appear to exceed 0.2 bar (see, for example, recent International Application Publication No. WO 2013037902, which describes the fabrication of a novel GDE with a "record" wetting pressure of 0.2 bar).

In another example aspect there is provided:
an electrochemical cell, device or reactor (formed from one or more cells) for electro-synthetic, electrochemical or electro-energy gas-to-liquid or liquid-to-gas transformations, which includes at least one gas diffusion electrode; wherein the gas diffusion electrode comprises:
at least one gas-permeable and substantially electrolyte-impermeable non-conductive region (e.g. provided by the one or more gas permeable layers), and
wherein the at least one gas-permeable and substantially electrolyte-impermeable non-conductive region has located on one or both of its outer, electrolyte-facing surfaces, a porous electrolyte-permeable conducting region (e.g. provided by the first or second conductive layers), that may also include at least one catalyst.

Preferably, but not exclusively, an example reactor is small-scale, modular, and/or on-site and able to operate at the point or location where the reactor's products are required by a user.

Preferably, but not exclusively, an example reactor is a fuel cell, including but not limited to: (a) an alkaline fuel cell (AFC), or (b) an acid fuel cell, including but not limited to a phosphoric acid fuel cell (PAFC).

Preferably, but not exclusively, an example reactor is a reversible fuel cell that also facilitates the reverse reaction. For example, the reactor may be an alkaline water electrolyser which uses electricity to convert water into hydrogen and oxygen, as well as an alkaline fuel cell which converts hydrogen and oxygen into water to thereby generate electricity.

Preferably, but not exclusively, an example reversible fuel cell of this type has a high "round-trip" energy efficiency. For example, a 90% (HHV) electrical efficiency in the electrolysis reaction in an alkaline electrolyser may be combined with a 90% (LI-V) electrical efficiency in the fuel cell reaction to give an overall "round-trip" electrical efficiency of about $(0.9\times33\text{ kWh (LHV)})/(39\text{ kWh (HHV)}/0.9)\times100=68.5\%$.

In an alternative embodiment, an example reactor is a "half fuel cell", in which an electrode, either the anode or cathode, functions as the electrode may in a fuel cell, whereas a second electrode is a conventional electrode. The first "fuel cell" electrode may act in the same way the electrode would in devices, including but not limited to: (a) an alkaline fuel cell (AFC), (b) an acid fuel cell, including but not limited to a phosphoric acid fuel cell (PAFC). The second, conventional electrode may be a solid electrode.

In further alternative embodiments, an example reactor is capable of facilitating the electrochemical manufacture of, or is used to produce: (a) chlorine, (b) hydrogen peroxide, (c) fuels from $CO_2$, (d) ozone, (e) caustic, (f) potassium permanganate, (g) chlorate, (h) perchlorate, (i) fluorine, (j) bromine, (k) persulfate, and others.

In still further alternative embodiments, an example reactor is capable of facilitating the following electrochemical processes in the pulp and paper industry: (a) "black liquor" electrolysis, (b) "Tall Oil recovery" and (c) chloride removal electrolysis. In other alternative embodiments, an example reactor is capable of facilitating electrometallurgical processes, such as metal electrowinning in narrow-gap chambers, in undivided electrolysis cells of the type that are widely used in electrometallurgical processes.

Preferably, but not exclusively, an example electrochemical reactor comprises multiple replications of the gas diffusion electrode interleaved with electrolyte-permeable, non-conductive electrolyte spacers and other electrodes, to thereby produce a multi-layered electrochemical reactor or module. The other electrodes may comprise: gas-permeable electrodes according to present embodiments, and/or conventional electrodes, including conventional gas diffusion electrodes. For example, the other electrodes may be gas diffusion electrodes of similar design that serve as counter electrodes (anodes or cathodes) in the reactor cell. Alternatively, the other electrodes may be conventional electrodes, such as iron, zinc or titanium foil electrodes. The advantage of this cell arrangement is that it provides for a high density of construction and may thereby provide an inexpensive way of deploying gas diffusion electrodes in an electrochemical cell.

Optionally, electrolyte-permeable non-conductive spacers (e.g. the electrolyte spacers) are provided and are electrically insulating polymer nets of the type used as "feed-channel" spacers in the membrane industry. That is, the electrolyte spacers or layers can be an electrically insulating polymer net. For example, the electrolyte-permeable spacers may be polymer nets of the type supplied by Delstar Inc. for the reverse osmosis industry. Such electrolyte spacers allow liquid ingress to the anodes and cathodes whilst simultaneously preventing short circuits from forming between the anodes and cathodes. Such electrolyte spacers are suitably robust to allow the transit of liquids but prevent the anodes and cathodes from collapsing on themselves, even under high applied pressures.

Example electrochemical reactor construction using GDEs of the current embodiments may be made in any format, including a plate and frame, or layered, format. Preferably, but not exclusively, a single-layered or multi-layered electrochemical reactor is flexible. Preferably, but not exclusively, a single-layered or multi-layered electrochemical reactor is spiral-wound or rolled. The multi-layer spiral-wound arrangement or structure may comprise one or more cathodelanode electrode assembly pairs. The advantage of this reactor or cell arrangement is that it provides for improved or maximum density of construction and may thereby provide an inexpensive way of deploying gas diffusion electrodes in an electrochemical cell.

In further examples, the spiral-wound arrangement or structure is a practical way to reduce the footprint as well as the electrical and gas handling infrastructure. Spiral-wound devices permit the electrolyte to permeate through electrolyte layers along the device. The gases can be extracted or introduced laterally or perpendicularly in gas channels, for example that are substantially parallel to the electrolyte channels within the spiral-wound arrangement. Optionally, one gas may be extracted or introduced in one direction via a dedicated gas channel while, where applicable, a second gas may be extracted or introduced in the other direction via another parallel gas channel. Electrolyte may be introduced or removed via dedicated, parallel channels that are kept physically separate from the gas channels.

BRIEF DESCRIPTION OF THE DRAWINGS

Illustrative embodiments will now be described solely by way of non-limiting examples and with reference to the accompanying figures. Various example embodiments will be apparent from the following description, given by way of example only, of at least one preferred but non-limiting embodiment, described in connection with the accompanying figures.

EXAMPLES

The following modes, features or aspects, given by way of example only, are described in order to provide a more precise understanding of the subject matter of a preferred embodiment or embodiments.

A New Approach to Making 3D Electrodes and Gas Diffusion Electrodes (GDEs)

Figure 2A:
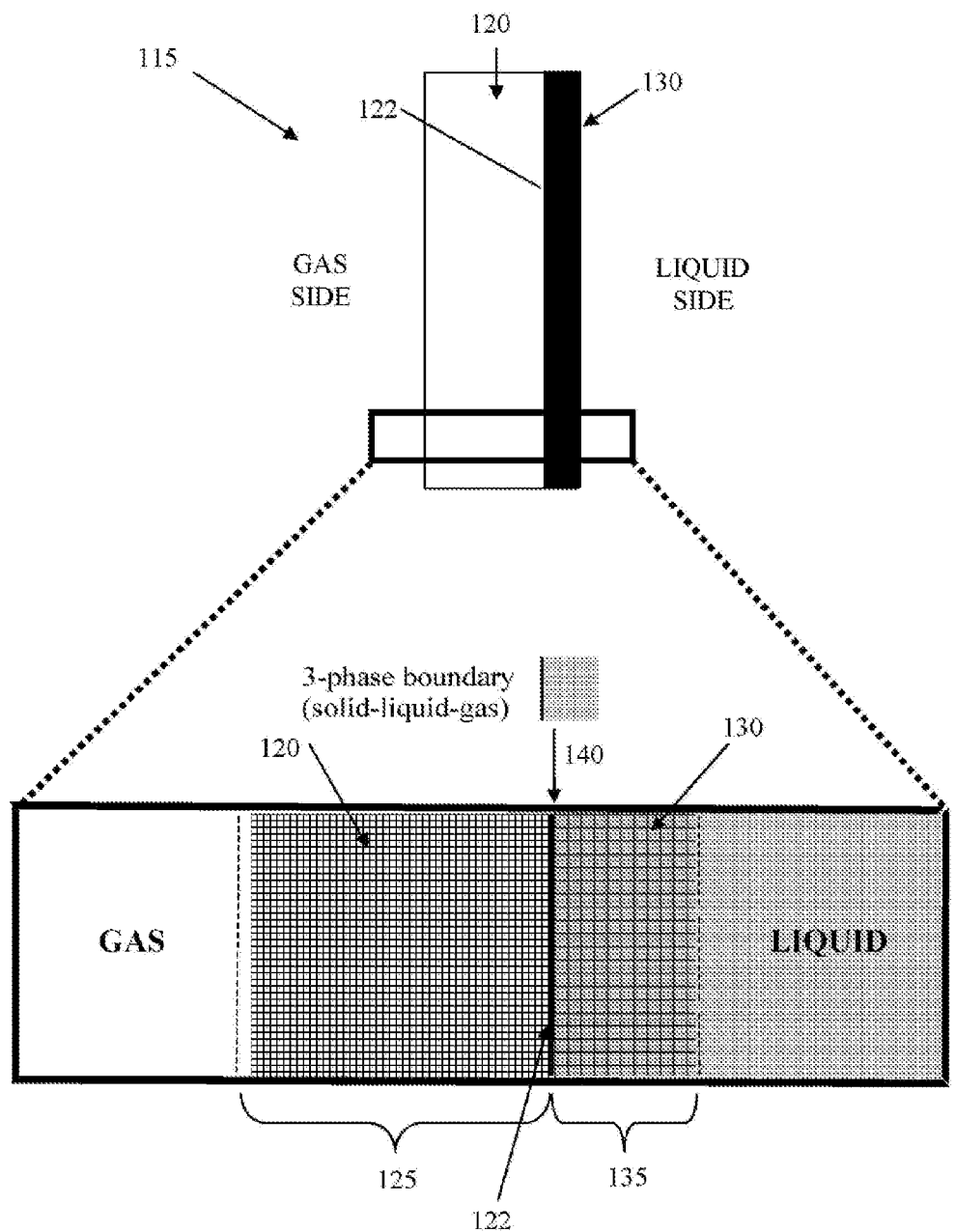
FIG. 2(a) depicts in schematic form, an example 3D electrode, or gas diffusion electrode, according to a present embodiment (not to scale). The lower part of the figure is a magnified view of a section of the gas diffusion electrode.

FIG. 2(a) illustrates in schematic form the general structure of an example 3D electrode or GDE 115 that can be used in present embodiments. A 3D electrode or GDE 115 of the present embodiments differs from a conventional 3D particulate fixed bed electrode or GDE 110 in that it separates the features of hydrophobic pore structure and conductivity, preferably catalytic conductivity, into two distinct regions, each of whose properties improve upon and may be more fully controlled than is possible in a conventional 3D particulate fixed bed electrode or GDE. In some embodiments more than two distinct regions may be possible. Thus, an example embodiment of a 3D electrode or ODE 115 may comprise of a liquid-and-gas-porous conductor 130 (i.e. a porous conductive material), that is preferably also provided with a catalyst, coupled with, attached to, abutting, or positioned adjacent a non-conductive gas permeable material 120, that is also preferably liquid electrolyte impermeable, e.g. strongly hydrophobic. The gas permeable material 120 and conductor 130 (i.e. porous conductive material) are substantially distinct, demarcated or separated, thereby providing a first region 135 (conductive region) and a distinct second region 125 (gas permeable region), respectively. The gas permeable material 120 and the conductor 130 are preferably positioned adjacent, abut, touch or adjoin each other, so that there can be touching or overlap of a periphery of the regions at a boundary region or interface 140. The non-conductive, hydrophobic, gas permeable material 120 may display pores that are better defined, more uniform, and potentially of smaller average size, than can be achieved in a conventional 3D electrode or GDE. The liquid-and-gas-porous conductor 130 may, similarly, be more conductive than a conventional 3D electrode or GDE. The low hydrophobicity of the liquid-and-gas-porous conductor (i.e. porous conductive material) 130 will usually also see it completely or substantially completely filled with liquid electrolyte under normal operating conditions, thereby maximally facilitating catalysis. By contrast, the liquid impermeability or high hydrophobicity of the non-conductive, gas permeable material 120 will typically see it completely empty or substantially empty of liquid electrolyte at atmospheric pressure, thereby maximally facilitating gas transport into and out of the GDE 115.

The gas permeable 3D electrode 115 thus provides a gas permeable material 120 that is non-conductive, and a porous conductive material 130 attached to the gas permeable material 120. In operation, the gas permeable material 120 faces a gas side of a cell and the porous conductive material 130 faces a liquid electrolyte side of the cell. In use, a three-phase solid-liquid-gas boundary is able to form at or near a surface 122 of the gas permeable material 120 facing the porous conductive material 130.

The porous conductive material 130 is coupled to, touching, positioned adjacent, attached to or abutting the non-conductive gas permeable material 120, which may be hydrophobic, to form or provide an interface 140 (or boundary region) of or between the porous conductive material 130 and the non-conductive gas permeable material 120. Preferably, this provides two regions (a first region 135 including the porous conductive material 130 and a second region 125 including the non-conductive gas permeable material 120) that are distinct, demarcated or separated. Preferably, the first region 135 and the second region 125 are positioned adjacent, abut, touch or adjoin each other, so that there is an interface 140 (or a boundary region) for the first region 135 and the second region 125. Thus, in operation of a preferred embodiment, a three-phase solid-liquid-gas boundary forms at or near the surface 122 of the gas permeable material 120 facing the porous conductive material 130, which may also be at or near the interface 140 (i.e. at or within a boundary region) between the first region 135 (i.e. the porous conductive material 130, which can include a catalyst) and the second region 125 (i.e. the non-conductive gas permeable material 120). In one example, the solid-liquid-gas boundary, which is formed during use of the electrode in a cell or reactor, has a macroscopic width that is substantially two-dimensional in relation to the width or thickness of the electrode 115. In another example, the solid-liquid-gas boundary is formed at the interface 140 of the gas permeable material 120 and the porous conductive material 130.

When such a 3D electrode or GDE 115 is contacted on the conductive side by a liquid electrolyte and on the non-conductive side by a gaseous material, then the above physical features cause the formation of a three-phase solid-liquid-gas boundary at or near the surface 122 (or interface 140 between the two regions). The three-phase solid-liquid-gas boundary is quite different to that formed in a conventional 3D electrode or GDE. The boundary differs in that it is far better defined, narrower, more stable and/or more robust than can be achieved in a conventional 3D electrode or GDE. For example, the three-phase solid-liquid-gas boundary formed at or near surface 122, or alternatively at or near interface 140, has a macroscopic width that is two-dimensional or substantially two-dimensional in relation to the width of the electrode 115.

These features are important because the inventors have found that example embodiment 3D electrodes or GDEs, such as GDE 115, may, when fabricated in a carefully calibrated way, combine at the interface 140 between gas permeable material 120 and conductor 130, an enhanced or optimum hydrophobic pore structure that facilitates enhanced or maximum gas transport, with an enhanced or optimally conductive, increased or maximally catalytic structure. In effect, at the three-phase solid-liquid-gas boundary in example embodiment 3D electrodes or GDEs, such as GDE 115, each of the critical properties of the electrode may be made ideal, or, at least, nearer to ideal than is otherwise possible.

The effect of this optimisation can be remarkable and unexpectedly significant. Despite being narrower and confined to what appears to be, macroscopically, a 2D geometry, the electrochemical capabilities of the three-phase solid-liquid-gas boundary in example embodiment 3D electrodes or GDEs, such as GDE 115, may substantially improve upon and, in fact, far exceed those of conventional 3D electrode or GDEs, such as GDE 110.

This is because the fabrication of conventional 3D electrodes or GDEs, as currently employed in the art, is predicated on creating all of the important physical properties at the same time within a single material. This approach effectively ignores the fact that the key properties of 3D electrodes or GDEs (namely: pore structure, hydrophobicity, gas transport, liquid transport, conductivity and catalytic activity) are typically inter-dependent and therefore not open to ready, concurrent optimisation within a single material. Example embodiment 3D electrodes or GDEs 115 take account of this limitation and separately optimise the key properties, to thereby achieve more optimum overall properties at the interface 140 between the gas permeable layer 120 and the conductive layer 130.

The inventors have further found that the three-phase solid-liquid-gas boundary may, in fact, at a microscopic level comprise a contorted 3D structure with an unexpectedly large overall surface area. This is particularly the case if the conductive region 135 overlaps somewhat with the gas permeable region 125.

These very fundamental enhancements may impart example embodiment 3D electrodes or GDEs, such as GDE 115, with a range of unexpected and novel electrochemical and physical capabilities. These include:
1. much higher wetting pressures and bubble points than can be achieved in conventional 3D electrodes or GDEs. "Wetting pressure" is defined as the lowest excess of pressure on the liquid electrolyte side of a 3D electrode or GDE relative to the gas side of the electrode, at which the liquid electrolyte penetrates and floods the electrode. The "bubble point" is defined as the lowest excess of pressure on the gas side of a 3D electrode or GDE relative to the liquid electrolyte side of the 3D electrode or GDE, at which the gas blows through the electrode and forms bubbles at the electrode surface on the liquid electrolyte side. Example embodiment 3D electrodes or GDEs, such as GDE 115, typically have wetting pressures and bubble points in excess of 0.2 bar, whereas conventional 3D electrodes or GDEs, such as GDE 110, typically have wetting pressures and bubbles points of 0.2 bar or less;
2. lower electrical resistances, higher electrocatalytic activities and reactivities, as well as more efficient utilization of catalytic materials, than can be realised in conventional 3D electrodes or GDEs, especially, but not exclusively, when operated at relatively low current densities; and
3. an apparent capacity to facilitate hitherto unachievable gas-to-liquid or liquid-to-gas electrochemical reactions, or, at least, improve upon electrochemical reactions that have not proved practically viable to date, especially, but not exclusively, when operated at relatively low current densities. Examples of such transformations include the electrochemical production of hydrogen peroxide from caustic and air oxygen, the production of pure oxygen from air oxygen, the operation of fuel cells with high energy efficiencies, and the direct generation of electrical current by the reaction of methane within a direct methane fuel cell.

Additionally, example embodiment 3D electrodes or GDEs, such as GDE 115, are flexible and may be double-sided, allowing them to be deployed in densely-structured, flexible, spiral-wound and other electrochemical cells.

Example embodiment 3D electrodes or GDEs, such as GDE 115, may also be fabricated in an exceedingly low cost manner, allowing for the practical use of: (i) relatively low current densities, which minimise electrical losses and thereby maximise electrical efficiency, and (ii) low-cost catalysts comprising of Earth-abundant elements which only operate efficiently at lower current densities. By these means, it becomes possible to manufacture practically and economically viable, large-scale electrochemical cells for use in industrial-scale electro-synthetic and electro-energy applications. Such cells may achieve energy efficiencies that have hitherto been unavailable in large-scale production and energy environments. For example, chlorine may be manufactured at scale using the chlor-alkali process with 91% energy efficiency, whereas the best available industrial chlor-alkali plants achieve 66% energy efficiency.

The higher wetting pressures that can be achieved in example embodiment 3D electrodes or GDEs, such as GDE 115, relative to conventional GDEs, such as GDE 110, allow for the direct production of pressurised gases in large-scale, industrial liquid-to-gas electro-synthetic/electro-energy cells without the risk of the electrodes becoming flooded and electrolyte leaking out of the electrolyte chamber ('flooding-free' operation). The higher bubble points that can be achieved means that reactant gases may be introduced at pressure into large-scale, industrial gas-to-liquid electro-synthetic/electro-energy cells via gas diffusion electrodes, without forming energy-sapping bubbles in the liquid electrolyte ('bubble-free' operation)

The present embodiments teach the approach of harnessing an interface between a liquid-and-gas-porous conductive layer and a gas permeable, hydrophobic layer to achieve practical and economic advantages such as those described above. Such advantages are achieved when the regions 125 and 135 are carefully designed/selected, fabricated in a calibrated way and located in close proximity to each other. That is, the three-phase solid-liquid-gas boundary should be enhanced or optimised, typically through carefully calibrated fabrication in order to improve upon conventional GDEs.

Fabrication of 3D Electrodes and GDEs

As noted above, in an example aspect, a new approach to developing 3D electrodes or GDEs involves separately enhancing or optimising one or more key features of 3D particulate fixed-bed electrodes and gas diffusion electrodes in different locations and then combining the enhanced or optimised components along an interface. Thus, for example, the properties of hydrophobicity and porosity to the liquid electrolyte may be optimised in a non-conductive layer. This layer may then be combined along or about an interface, with a separate porous conductive layer in which the conductance and catalytic properties have been optimised.

The hydrophobic material may be a commercially available expanded PTFE membrane having high hydrophobicity and a substantially uniform pore size. Such membranes are manufactured to more accurate specifications than are possible in conventional 3D particulate fixed bed electrodes or GDEs.

The conductive material may be a metallic material, such as a metal mesh or grid (decorated or coated with a catalyst-binder mixture), that is inherently more conductive than the carbon black used in conventional 3D particulate fixed bed electrodes or GDEs. The porous conductive metal may be selected based on hydrophobicity to match a liquid electrolyte.

Small amounts of PTFE and carbon black may be used in the fabrication of the 3D electrode or GDE; for example in a binder material to bind the catalyst in the conductive layer to the metallic material. A key difference from conventional 3D particulate fixed-bed electrodes and GDEs is, however, that the PTFE and carbon black do not form a superstructure within which a three-way solid-liquid-gas boundary may be formed. Instead, the solid-liquid-gas boundary is formed at or near a surface of the gas permeable material facing the porous conductive material, or in another example this could be said to be at or near the interface between the hydrophobic porous region and the conductive region.

The inventors have studied such interfaces in 3D electrodes and GDEs and discovered that they yield surprisingly and unexpectedly effective electrochemical systems. Their efficacy appears to derive from their unique architecture, which is brought about by careful and calibrated construction. For improved performance, this might be coupled with operation of the 3D electrodes at low current density (at moderate voltages), such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively.

General Example Embodiments

A new approach to developing example 3D electrodes that can be used as GDEs involves adapting existing, commonly available porous materials so that they may act as practically useful 3D electrodes and GDEs.

In a preferred example there is provided a 3D electrode which includes a gas permeable material that is liquid impermeable, during normal operational use of the electrode, a porous conductive material at least partially covering the gas permeable material (such as covering one side or part of one side of the gas permeable material) that is liquid permeable and gas permeable, and a binder material which adheres or attaches the gas permeable material and the porous conductive material to each other. The binder material (which may be a mixture of materials) penetrates the gas permeable material to a depth less than the thickness of the gas permeable material. In one example, the binder material can be present between the porous conductive material and the gas permeable material. In another example, the binder material is present at an interface or boundary region of the porous conductive material and the gas permeable material. In another example, the binder material adjoins the porous conductive material with the gas permeable material.

Thus, a porous conductive material (e.g. a conductive metallic layer) is provided at or near one surface of the 3D electrode and a gas permeable material (e.g. a non-conductive layer) is provided at or near the other, opposing, surface of the 3D electrode. The conductivity of the resulting composite 3D electrode thus varies along the thickness of the 3D electrode. The porous conductive material (e.g. conductive metallic layer) is gas permeable and at least partially, preferably fully, liquid permeable, whereas the gas permeable material (e.g. non-conductive layer) is gas permeable and liquid impermeable, during normal operational use of the electrode. The porous conductive material (e.g. conductive metallic layer) can be in one example part of an outer surface of the 3D electrode and is relatively less hydrophobic than the gas permeable material, whereas the bulk 3D electrode is gas breathable and liquid impermeable.

When the 3D electrode is in use, for example as a GDE, a three-phase solid-liquid-gas boundary is formed within the 3D electrode, preferably at or near the surface of the gas permeable material that faces the porous conductive material. The solid-liquid-gas boundary is narrow in macroscopic width compared to the thickness of the electrode or of the gas permeable material. Preferably, the maximum width of the solid-liquid-gas boundary is two-dimensional or substantially two-dimensional in relation to the width (or thickness) of the 3D electrode, or in relation to the width (or thickness) of the gas permeable material. In another example, the maximum width of the solid-liquid-gas boundary is less than or equal to the thickness of the applied binder material in the boundary region or interface between the gas permeable material and the porous conductive material.

The solid-liquid-gas boundary is narrow compared to the width of the electrode. This can depend on the width of the electrode materials used and the application. In one example the solid-liquid-gas boundary can have a maximum (or macroscopic) width of less than 400 µm. In other examples, the solid-liquid-gas boundary can have a maximum (or macroscopic) width of less than about 300 µm; or less than about 200 µm; or less than about 100 µm; or less than about 50 µm; or less than about 10 µm; or less than about 1 µm; or less than about 0.1 µm; or less than about 10 nm. By contrast, conventional gas diffusion electrodes typically have their solid-liquid-gas boundaries distributed over thicknesses of from 0.4 mm to 0.8 mm in the case of fuel cell gas diffusion electrodes, or even greater, such as several millimeters in industrial electrochemical gas diffusional electrodes.

In other examples, the maximum width of the solid-liquid-gas boundary can be defined in relation to the width of the electrode, or in relation to the width of one of the constituting materials or layers. In one example the solid-liquid-gas boundary can have a maximum width of less than about 30% of the width of the electrode. In other examples, the solid-liquid-gas boundary can have a maximum width of less than about 20% of the width of the electrode; or less than about 15% of the width of the electrode; or less than about 10% of the width of the electrode; or less than about 5% of the width of the electrode; or less than about 1% of the width of the electrode; or less than about 0.1% of the width of the electrode; or less than about 0.01% of the width of the electrode.

Preferably, though not necessarily, the porous conductive material is a pure or highly purified metal. For example, the porous conductive material can be, but is not limited to pure or purified nickel or Stainless Steel. Alternatively, the porous conductive material can be a metal such as Ti, Cr, Pt, Cu, Pb, Sn, Co, Mn, Au or Ag, or mixtures or alloys thereof. Alternatively, the porous conductive material could be a metal coated with another metal. For example, the porous conductive material could be stainless steel coated with nickel. Alternatively, the porous conductive material could be stainless steel coated with Ti, Cr, Pt, Cu, Pb, Sn, Co, Mn, Au or Ag. In further examples, the porous conductive material may be a polymer coated with a conductive layer or a metallic layer, such as a polymer fabric coated with a metallic layer. In still other examples, the porous conductive material may be formally non-metallic in character but display properties of electrical conduction which are similar to those of metals, for example, carbon fibre or carbon cloth materials.

In some examples, the conductive region or portion (which can include the porous conductive material and a binder material if used) of the 3D electrode comprises less than or equal to about 10% carbon atoms, or less than or equal to about 20% carbon atoms, or less than or equal to about 30% carbon atoms. The carbon atoms can be provided as part of, or attached to, the porous conductive material, and/or included as a component of the binder material, in which case the conductive region or portion is provided by the porous conductive material and the binder material. This can provide a significant benefit, as carbon is less expensive than metals and also lighter. In another example, the conductive region or portion of the 3D electrode can comprise activated carbon. In these examples, the conductive region or portion is not simply a continuous metal or continuous metal coating, such as would be obtained from metallic sputter coating. A benefit of using activated carbon is that some catalysts, such as nano-catalysts, can better associate with or bind to the activated carbon than compared to metals.

In one example, the porous conductive material is stainless steel mesh, for example 100 lines per inch (LPI) stainless steel mesh (thickness about 60-80 micron), which is applied by lamination at, for example, a temperature of 50° C. and a pressure of 500 kPa to a polymer membrane of expanded PTFE (ePTFE) that has been pre-coated by screen-printing, with a layer about 20 micron thick of a binder mixture that comprises carbon black (about 10% by weight), nickel nanoparticles (about 80% by weight), and an ionomer, such as a sulfonated tetrafluoroethylene based fluoropolymer-copolymer (e.g. Nafion™ material), (about 10% by weight).

In other examples, the layer of binder material can be from about 1 micron to about 100 microns thick, or about 10, about 30, about 40, about 50, about 60, about 70, about 80, about 90, or about 100 microns thick. The binder material may comprise:

carbon black (from about 1% to about 30% by weight, or from about 1% to about 20% by weight, or from about 1% to about 10% by weight, or from about 1% to about 5% by weight, or about 5%, or about 10%, or about 15%, or about 20%, or about 25%, or about 30% by weight), nickel particles or nanoparticles (from about 1% to about 90% by weight, or from about 1% to about 80% by weight, or from about 1% to about 70% by weight, or from about 1% to about 60% by weight, or from about 1% to about 50% by weight, or about 10%, or about 20%, or about 30%, or about 40%, or about 50%, or about 60%, or about 70%, or about 80%, or about 90% by weight), and/or an ionomer, such as a sulfonated tetrafluoroethylene based fluoropolymer-copolymer (e.g. Nafion™ material), (from about 1% to about 30% by weight, or from about 1% to about 25% by weight, or from about 1% to about 20% by weight, or from about 1% to about 10% by weight, or from about 1% to about 5% by weight, or about 5%, or about 10%, or about 15%, or about 20%, or about 25%, or about 30% by weight).

In another example, the gas permeable material is a porous polymer membrane or structure. In another example the gas permeable material can be made or formed of one or more substances selected from, but not limited to the group of PTFE, polypropylene, polyethylene or polysulfone. The gas permeable material can be any medium, article, layer, membrane, barrier, matrix, element or structure that is sufficiently porous or penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material can also be referred to as a "breathable" material. By way of example only, a gas permeable material can be a porous membrane and a substance from which the gas permeable material is made or formed can be a polymer, such as PTFE. In one example the 3D electrode is a Gas Diffusion Electrode.

Preferably, the gas permeable material has substantially uniform pore size. Between the porous conductive material (e.g. conductive metallic layer) and the gas permeable material (e.g. non-conductive polymer layer) is a binder material providing a binder layer in a boundary region, and on both sides of the boundary region the pores are substantially uniform in size and distribution. For example, the average pore size can be between about 10 nm to about 500 nm, or preferably between about 50 nm to about 500 nm, or preferably between about 100 nm to about 500 nm, or in more specific examples about 0.1, 0.2, 0.3, 0.4 or 0.5 microns in size. In a most preferred example, the gas permeable material has an average pore size of about 50 nm to about 500 nm and is formed of PTFE.

For example, a commonly available and relatively inexpensive non-conductive porous material is made or formed of "expanded PTFE", also known as ePTFE (where PTFE=polytetrafluoroethylene). ePTFE comprises a highly porous (typically 60-80% porosity) fibrous network of microscopically small, hydrophobic PTFE. An important property of ePTFE is that it is highly porous but also highly hydrophobic. Other widely-available, commodity-type porous polymer membranes, are made or formed from, but are not limited to, polypropylene, polyethylene, polysulfone, and other polymers of similar ilk.

It should be noted that, while the brand name Goretex® polymer material can be used, the inventors have found that use of Goretex® polymer material is not preferred or optimum in the applications described below. In fact, the inventors have found that ePTFE membranes manufactured by the General Electric Company, having some different properties, offer the best and most optimum utility in most electrochemical devices.

In one example, the depth to which the binder material penetrates the gas permeable material (e.g. polymer layer) is in the range of about 1 nm to about 10 µm, or about 50 nm to about 1 µm, or about 50 nm to about 500 nm. In a specific example, the porous conductive material is a nickel mesh of 100 LPI (LPI=lines per inch), the gas permeable material is a 0.2 micron PTFE membrane and the binder material is a combination of carbon black (about 10% by weight), nickel nanoparticles (about 80% by weight), and a sulfonated tetrafluoroethylene based fluoropolymer-copolymer (e.g. Nafion™ material) (about 10% by weight), and the binder material penetrates the gas permeable material to a depth greater than 0 but less than the thickness of the gas permeable material, for example less than about 850 nm.

In another example form there is provided a method of fabricating a 3D electrode. The steps include selecting a gas permeable material, for example with a substantially uniform pore size, and then applying, under suitable ('calibrated') heat and pressure for lamination, a porous conductive material to partially coat the gas permeable material, with use of a binder material as an adhesive. The binder material preferably penetrates the gas permeable material to a depth less than the thickness of the gas permeable material.

The ('calibrated') lamination step can include: a particular heat or range of heats of application; a particular pressure or range of pressures of application; a particular time or period of application; and/or a particular circumstance or range of circumstances of application.

Attachment of one or more porous conductive materials, for example as one or more porous conductive layers or meshes, to the gas permeable material, for example a porous polymer membrane, using controllable lamination techniques are employed to produce 3D electrodes. When formed in this way, 3D electrodes with unexpected and improved electrochemical performance may be realised, especially relative to other 3D electrodes and to the cost of manufacture. Further, unrelated materials, for example including catalytic or other materials, can be conveniently added to, or formed upon or in-between the one or more porous conductive materials, layers or meshes, and the gas permeable material to produce 3D electrodes that are practical and useful in electro-energy or electro-synthetic applications. The availability of such 3D electrodes makes viable or improves the practicality of a range of electro-energy and electro-synthetic applications. Such applications are typically unviable or relatively less practical using conventional particulate fixed-bed or gas diffusion electrode technologies.

The porous conductive materials, for example provided as meshes, membranes or layers, can be applied to one or more gas permeable materials, for example provided as meshes, membranes or layers, having a specific, and preferably narrow, range of pore sizes, such as the widely available and relatively low cost polymer membranes used in the water purification industry. Such membranes are manufactured to contain very specific and narrow ranges of pore sizes. By adapting or modifying such membranes or other gas permeable materials to be 3D electrodes, one may conveniently impart upon the 3D electrode highly desirable and otherwise unobtainable pore properties. For example, 3D electrodes may be conveniently and reliably fabricated with tiny (for example less than 500 nm in size) and reasonably or substantially uniform pores that are not easily, reliably, or inexpensively achieved in conventional 3D electrodes. Additionally, the desired pore size can be readily varied by selecting a different gas permeable material, for example provided as a membrane or mesh, for adaption or modification into a 3D electrode. Gas permeable materials with a wide variety of pore sizes are readily available.

A porous conductive material, for example a conductive metallic material, mesh or layer, can be applied such that the produced 3D electrodes, which can be used as GDEs, display unusually high electrochemical activities as a function of the electrochemical surface area present.

General Example Embodiments—Gas Diffusion Electrode (GDE)

When intended to be used in a Gas Diffusion Electrode (GDE) type application, the porous conductive material (e.g. metallic material or layer) is preferably, but not exclusively, applied such that the produced 3D electrodes create uniquely well-defined, narrow and stable three-way solid-liquid-gas boundaries. In a particular example, the porous conductive material may have a thickness in the range of about 1 nm to about 1000 µm, or in the range of about 1 µm to about 100 µm, or in the range of about 5 µm to about 40 µm. By controlling the pore size of the gas permeable material (e.g. a polymer layer), one may also control important physical properties of the 3D electrode, for example a 3D GDE, such as the wetting pressure, the bubble point, and the permeability to gases.

In an example embodiment in the case where a GDE is manufactured using a previously formed polymer membrane as the gas permeable material, the GDE can have substantially the same wetting pressure as that of the polymer membrane (i.e. the gas permeable material) used. In the example case where a membrane having average pore size 0.2 µm is used as the gas permeable material in the GDE, the wetting pressure of both the membrane and the GDE is 3.4 bar (such an example polymer membrane is available from the General Electric Company). Thus, liquid water will only penetrate and flood the GDE upon the application of 3.4 bar of pressure on the liquid side. The addition of a dense, thin film that is, nevertheless porous to gases but not to liquid water, on top of the PTFE may increase the wetting pressure to 10 bar or greater. By contrast, to the knowledge of the inventors all other known GDEs have wetting pressures that currently do not exceed 0.2 bar. Thus, in one form the present example electrode has a wetting pressure above 0.2 bar, and preferably about 3.4 bar or greater.

In preferred examples the porous conductive material is attached to the gas permeable material (e.g. the polymer layer) by being physically (e.g. mechanically) or chemically bonded to the gas permeable material. This can be achieved by the presence of a binder material, or materials, that act to bind the porous conductive material and the gas permeable material together. The binder material may be present everywhere, substantially everywhere or almost everywhere between the porous conductive material and the gas permeable material. Alternatively, the binder material may be present at a selection of spots or regions between the porous conductive material and the gas permeable material. The binder material or materials may further be applied in a pattern to thereby securely attach the porous conductive material to the gas permeable material. The binder material may include, substantially or partially, the material which forms the gas permeable material, for example the polymer material which forms the polymer layer. Alternatively, binder material may be a mixture and comprise one or more unrelated materials which may concurrently impart one or more other desirable properties upon the binder mixture, such as also being a conductor of electricity or a catalyst.

In one example, the binder material attaches to the surface of the porous structure of the gas permeable material (e.g. polymer material or layer). In another example, the binder material penetrates the porous structure of the gas permeable material (e.g. polymer material or layer) to a depth less than the thickness of the gas permeable material (e.g. polymer material or layer).

Example gas permeable or breathable 3D electrodes can be formed by depositing a catalyst within a binder material (e.g. binder layer) on a gas permeable material, followed by attaching or laminating thereto, a porous conductive material. In one example, one could start with a gas permeable non-conductive material and then form thereupon, a binding layer using a binder material containing one or more catalysts. To this combination, a porous conductive material may be laminated using suitable heat and/or pressure.

In a preferred example the 3D electrode is flexible. The porous conductive material or layer can be made at least partially or wholly from a substance and/or in a form that is flexible. The gas permeable material can similarly be made at least partially or wholly from a substance and/or in a form that is flexible. Optionally, the gas permeable material is made at least partially or wholly from a polymer or a combination of polymers, for example PTFE, "expanded PTFE" (ePTFE), polyethylene or polypropylene. The polymer itself may or may not be gas permeable. For example, the polymer itself may not be gas permeable but a structure or membrane formed from the polymer is gas permeable.

Numerous other industrial electrochemical processes may benefit from the use of gas depolarized GDEs, if they were practically viable. These include the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, and others. Electrometallurgical applications, such as metal electrowinning, could also benefit from the energy savings associated with anode depolarization; metal electro-deposition occurs at the cathode side of such cells, while oxygen is evolved at the anode. If oxygen evolution was replaced by hydrogen oxidation on a suitable gas diffusion anode, this would generate substantial energy savings. However, the mechanical characteristics of conventional GDEs make them unsuitable for delimiting narrow-gap chambers, thereby restricting their application in the undivided electrolysis cells that are widely used in electrometallurgical processes. Moreover, conventional GDEs would leak under the hydraulic head of electrolytic solutions commonly used in industrial size electrolysers. Several industrial electrochemical processes in the pulp and paper industry may also benefit from the use of alternative GDEs that could be gas depolarized and withstand a higher pressure differential, including: (a) "black liquor" electrolysis, (b) "Tall Oil recovery" and (c) chloride removal electrolysis. Flooding of GDEs after the build-up of even very mild liquid pressures is, furthermore, a particular and well-recognized problem in fuel cells, such as hydrogen-oxygen fuel cells.

Thus, the electrochemical cell can be used in the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, (k) chlorine, (l) caustic (in general), (m) $CO_2$ from methane, and others.

In alternative examples, the electrochemical cell involves electrochemical processes unique to particular industries. Examples include:
  (i) electrometallurgical applications, such as metal electrowinning;
  (ii) pulp and paper industry applications, such as: (a) "black liquor" electrolysis, (b) "Tall Oil recovery" and (c) chloride removal electrolysis; and
  (iii) fuel cell and related device applications, such as hydrogen-oxygen fuel cells, including but not limited to alkaline fuel cells.

In another example aspect, the beneficial effect/s may be achieved by the fact that GDEs according to example embodiments make it possible and practical to carry out entirely new chemical processes, either in cells or devices. For example, hitherto unconsidered processes for the formation of fuels from carbon dioxide, or remediation of $SO_x$ and $NO_x$ pollution, are possible and practical using GDEs according to example embodiments.

In another example embodiment, one or more GDEs are used to inject or introduce a depolarizing gas not only into the depolarizing electrode but also in sufficient quantities to force the gas into the electrolyte to cause the formation of bubbles that will rise within the reactor, causing mixing within the electrolyte, and thereby increasing mass transfer and decreasing concentration polarization effects. Alternatively, one or more GDEs are used to inject an inert gas or some combination of inert gas and depolarizing gas. In this embodiment, the GDE acts like a fine bubble diffuser, and may carry out two functions: to add a gas to the cell and also to provide mixing. Thus, the depolarizing gas and/or an inert gas can be forced into the liquid electrolyte, via the at least one electrode, to cause bubble formation and/or mixing in the liquid electrolyte.

In various further examples: a porous conductive material or layer is provided attached to, positioned adjacent to, positioned or layered upon, or at least partially within the gas permeable material, the porous conductive material or layer is associated with the gas permeable material; the porous conductive material or layer is located on and/or within the gas permeable material; and/or, the gas permeable material is located on and/or within the porous conductive material or layer. In other examples, the gas permeable material is a gas permeable membrane or structure, a gas permeable polymer membrane or structure, a gas permeable porous polymer membrane or structure, or a gas permeable porous membrane or structure.

General Example Embodiments—3D Electrode and Gas Diffusion Electrode (GDE) with a Barrier Layer to Exclude Vapour from the Liquid Electrolyte An example embodiment 3D electrode or GDE may incorporate one or more barrier layers or barrier films that are highly or substantially permeable to the relevant gas stream, but relatively less permeable or impermeable to the transport of the reaction solvent in gaseous form. Several examples of such barrier layers or films exist. Examples of such barrier layers or films that are highly permeable to oxygen gas but poorly permeable or impermeable to water vapour include: polyolefins, poly(methylpentene), organo-silicon polymer films, fluorocarbon or perfluorocarbon polymers, especially hyperbranched perfluorocarbon polymers, or mixtures thereof. The incorporation of such a barrier layer in the 3D electrode, for example a 3D GDE, preserves the gas stream outside of the 3D electrode from contamination by the gaseous form of the solvent used (e.g. water vapour) and also protects the gas channels outside of the 3D electrode from being blocked, impeded, or flooded by water condensate. The unique properties of the 3D electrode in respect of avoiding flooding, may thereby be transmitted to the entire network of gas channels and plumbing within a cell in which it is employed.

Additionally, because it can be practically difficult to completely prevent the formation of larger pores in a 3D electrode or to prevent defects from forming over the course of extended use, the barrier layer or barrier film may serve as a means to mask large pores and/or defects in the porous structure that could compromise the ability of the 3D electrode to perform a desired function, for example such as to prevent flooding.

The barrier layer or barrier film may be located on the gas side of the 3D electrode. Alternatively, the barrier layer or barrier film may be located on the liquid side of the 3D electrode, between the porous conductive material (e.g. conductive metallic material) and the gas permeable material (e.g. non-conductive polymer layer).

Preferably, the barrier layer or barrier film is highly or substantially permeable to the gases that are generated (as reaction products) or added (as reactants) from the gas side of the 3D electrode, but poorly permeable or impermeable to the solid, liquid, or gaseous components of the solvent used on the liquid side of the 3D electrode, namely, the electrolyte. For example, in 3D electrodes which form an interface between liquid water and oxygen gas, the barrier layer or barrier film is highly or substantially permeable to oxygen gas, but poorly permeable or impermeable to gaseous water vapour. In a second example in which a 3D electrode forms an interface between methane/natural gas and a liquid solvent, the barrier layer or barrier film is highly or substantially permeable to methane/natural gas, but impermeable or poorly permeable to the gaseous form of the liquid solvent.

In a particular example, the 3D electrode is a composite electrode and comprises a gas permeable material provided as a non-woven layer (e.g. high-density polyethylene fibers, such as for example Tyvek™ polymer material) attached to a barrier layer comprising a polymeric dense thin film (e.g. a polymethylpentene barrier layer) on one side, and a metal mesh on the other side, where the metal mesh is adhered to the polymer layer by a binder material.

Some General Methods of Fabricating an Example 3D Electrode or GDE

In one example, one could start with a gas permeable material provided as a non-conductive material and then apply the porous conductive material by depositing a conductive metallic material on the gas permeable material. In a further example, one or more catalysts can then be deposited as part of a binding layer, with subsequent lamination of the electrode assembly into a single structure using suitable heat and/or pressure. In a still further example, one may coat a binder material to provide a binding layer containing one or more catalysts onto a gas permeable material (e.g. a polymer layer) and then laminate the gas permeable material with a metallic material or layer pre-coated with the same binder material. Several other methods exist to fabricate an example embodiment.

Some General Advantages of Example 3D Electrodes and GDEs

As noted earlier, the presence of well-defined and narrow gas-solid-liquid interfaces in 3D electrodes and GDEs of the present embodiments may eliminate many of the problems that are created in other classes of solid-liquid-gas electrodes, such as conventional gas diffusion electrodes, or trickle-bed electrodes. Examples of the problems that may be eliminated or diminished include, without limitation, instability in, inhomogeneity in, fluctuations in, and/or failure of the solid-liquid-gas boundary.

Problems of this type may result in uneven, low yielding, incomplete or incorrect reactions, amongst others.

Additionally, the 3D electrodes/GDEs can provide unexpectedly amplified electrochemical properties of the type describe earlier, including unusually high electrode activities per unit volume of deposited catalyst (included in the binder layer).

The inventors have found that unexpected and disproportionate advantages of this type may be realised when the electrode interface is fabricated in a careful, calibrated manner. For improved performance the electrode might be operated at relatively low current densities, such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively.

Thus, for example, hydrogen-oxygen fuel cells utilizing the 3D electrodes typically require smaller quantities of catalysts than is normally the case using other types of electrodes. The produced 3D electrodes also do not necessarily require pure oxygen gas or highly compressed atmospheric air oxygen as a feedstock (as is the case in PEM fuel cells). Nor do the produced 3D electrodes necessarily require humidification of the feedstock gases (as is the case in PEM fuel cells). These advantages arise because the conductive layer in 3D electrodes of the present embodiments are well-defined, narrow, and have a high electrochemical area per unit volume of 3D electrode.

Other advantageous features which may be realised include, amongst others: (i) the catalyst in the interfacial region is maximally active, (ii) the catalyst is not wasted by being deposited in other, non-interfacial regions, where catalyst cannot act, (iii) the reactants have improved or maximum access to the electrode surface and suffer fewer limitations in terms of mass transport, and (iv) in one example application, water molecule products are readily and rapidly transported away from the reactive surface of the electrodes (due to the relatively narrow conductive layer and its high electrochemical surface area).

For illustrative purposes only and without limiting the invention, we now describe a representative common problem that may arise in conventional gas diffusion or particulate fixed bed electrodes and show how it may be eliminated in a 3D electrode of the present embodiments.

"Flooding" is a phenomenon that occurs when a liquid (product or reactant) partially or completely fills a gas diffusion electrode, thereby causing a breakdown in the solid-liquid-gas boundary and blocking electrochemical contact with the gas (reactant or product). Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. Regardless of its origin, flooding always induces a decline in the voltage output and power generation of such fuel cells.

Flooding does not, however, occur under normal operating conditions in 3D electrodes of the present embodiments since the three-phase solid-liquid-gas boundary is too well-defined and too narrow. There is a very clear separation of the liquid and gas phases in such electrodes, meaning that incremental percolation through the GDL does not occur. Moreover, the narrowness of the interface ensures that any condensation of any size is readily taken up and drawn back into the liquid phase, thereby effectively eliminating the possibility of flooding.

The above advantages confer utility and low-cost upon 3D electrodes of the present embodiments, as well as high performance relative to the current density employed. These properties make the 3D electrodes practical and useful in a variety of industrial applications, including but not limited to electro-energy and electro-synthesis applications. Many such applications are not practically viable without the use of 3D electrodes of the present embodiments. The 3D electrodes also allow the fabrication of practical and viable devices for these transformations, such as spiral-wound reactors and the like.

In further illustrative example applications, the 3D electrodes may also be used to improve or make viable electrochemical devices for: (i) converting air-based oxygen into pure or purer oxygen; (ii) manufacturing hydrogen peroxide; or (iii) use as fuel cells, both hydrogen-oxygen fuel cells and direct methane fuel cells. These example electrochemical devices share a common feature in that the 3D electrodes all display unusually high electrochemical activity relative to the current density employed. This activity appears to derive at least in part, from an unexpectedly strong capacity to sequester and consume oxygen gas from out of the air; a property that is believed to result from the well-defined and narrow three-way solid-liquid-gas boundary in the 3D electrode. The interface appears to create a remarkably selective reaction by the oxygen in air. The reaction is so strongly favoured that it continues within a sealed gas chamber even after the oxygen in the air has been largely depleted, thereby causing the formation of a partial vacuum in the gas chamber. Such a partial vacuum would normally halt or, at least, dramatically slow the reaction. However, in these cells, the vacuum continues growing until effectively all of the oxygen in the air is consumed. To the best of the inventors' knowledge, such effects have not been previously observed. This was undoubtedly because in these examples, the solid-liquid-gas boundary was carefully created to have a width/thickness of the order of 850 nm. This meant that the electrode could operate highly efficiently at a relatively low current density.

Beyond the above, 3D electrodes of the present embodiments may also display the following advantages:

(1) A dramatically higher wetting pressure than is achievable in any known conventional gas diffusion electrode. Conventional gas diffusion electrodes typically flood upon the application of <0.2 bar of external pressure. By contrast, electrodes of the current embodiments contain uniform pore structures in the gas permeable, water impermeable layers, so that they may require far higher external pressures before leaking. For example, embodiment electrodes may contain relatively small/tiny and uniform pore sizes, such as from about 10 nm to about 500 nm, or in one example about 0.2 microns, which can lead to a reduction in or avoidance of flooding of the electrode up to applied pressures of 3.4 bar. This means that a substantial pressure differential can be applied across the electrode, e.g. having an electrolyte at higher pressure on one side of the electrode compared to a gas region on the other side of the electrode, for example a pressure difference of greater than or equal to about 3.4 bar, well above previously known electrodes. By this means, electrodes of the present embodiments can withstand a relatively higher pressure before leaking.

(2) Flexibility of the electrode; the materials used in the electrode can be optionally made to be flexible or bendable, and for example, able to be rolled or spiral-wound. The gas permeable material can be selected from, for example, different porous polymer materials and/or different pore sizes to achieve desired properties of the electrode. This flexibility distinguishes many previous electrodes that are rigid structures.

(3) The ability to produce electrodes of relatively large size. For example, for commercial applications, electrodes can be readily produced having a width and/or a length of greater than or equal to 0.05 m, 0.1 m, 0.2 m, 0.3 m, 0.4 m, 0.5 m, 1 m, or 2 m. In another example electrodes can be readily produced of about 0.05 m, about 0.1 m, about 0.2 m, about 0.3 m, about 0.4 m, about 0.5 m, about 1 m, about 2 m, or larger in width and/or length. In an application where an electrode is rolled or spiral-wound, the flat electrode before rolling may preferably have a width of about 0.05 m or greater, about 0.1 m or greater, about 0.2 m or greater, about 0.3 m or greater, about 0.4 m or greater, about 0.5 m or greater, about 1 m or greater, about 2 m or greater, and a length of about 0.5 m or greater, about 1 m or greater, about 2 m or greater, about 3 m or greater, about 4 m or greater, about 5 m or greater, about 10 m or greater. The rolled or wound electrode may have a diameter of about 0.05 m or greater, about 0.1 m or greater, about 0.2 m or greater, about 0.3 m or greater, about 0.4 m or greater, about 0.5 m or greater, or even larger. This relatively large size distinguishes many previous electrodes that can only be produced in a small size, for example up to the order of 0.01 m in size. The difference in size scale is not a trivial factor since many small electrodes cannot be simply scaled up in size. For example, in relatively small cells having small sized electrodes, it is not required to have or consider a high electrical conductivity in the cell/electrode, because the distances involved are small, so the associated resistances are relatively small. In contrast, in larger scale cells/electrodes, such as the present example, this issue is much more challenging and higher conductivity is required along very good conduction pathways. Hence, a small scale electrode structure cannot typically and simply be scaled up to a large scale electrode.

Further Aspects of Example Gas Diffusion Electrodes (GDEs)

For the purposes of an illustrative example, we refer to the combination of an expanded PTFE (ePTFE) membrane (General Electric Company; pore size 0.2 micron) (i.e. a gas permeable material) overlaid with a fine nickel mesh (200 lines per inch; manufactured by Precision eForming Inc.) (i.e. a porous conductive material), optionally held together by a binder material, or a binder-catalyst material, including about 5-15% Nafion in alcohol/water (supplied by Ion Power Inc.), and about 20-50% by weight of fillers and/or catalyst material.

Figure 1:
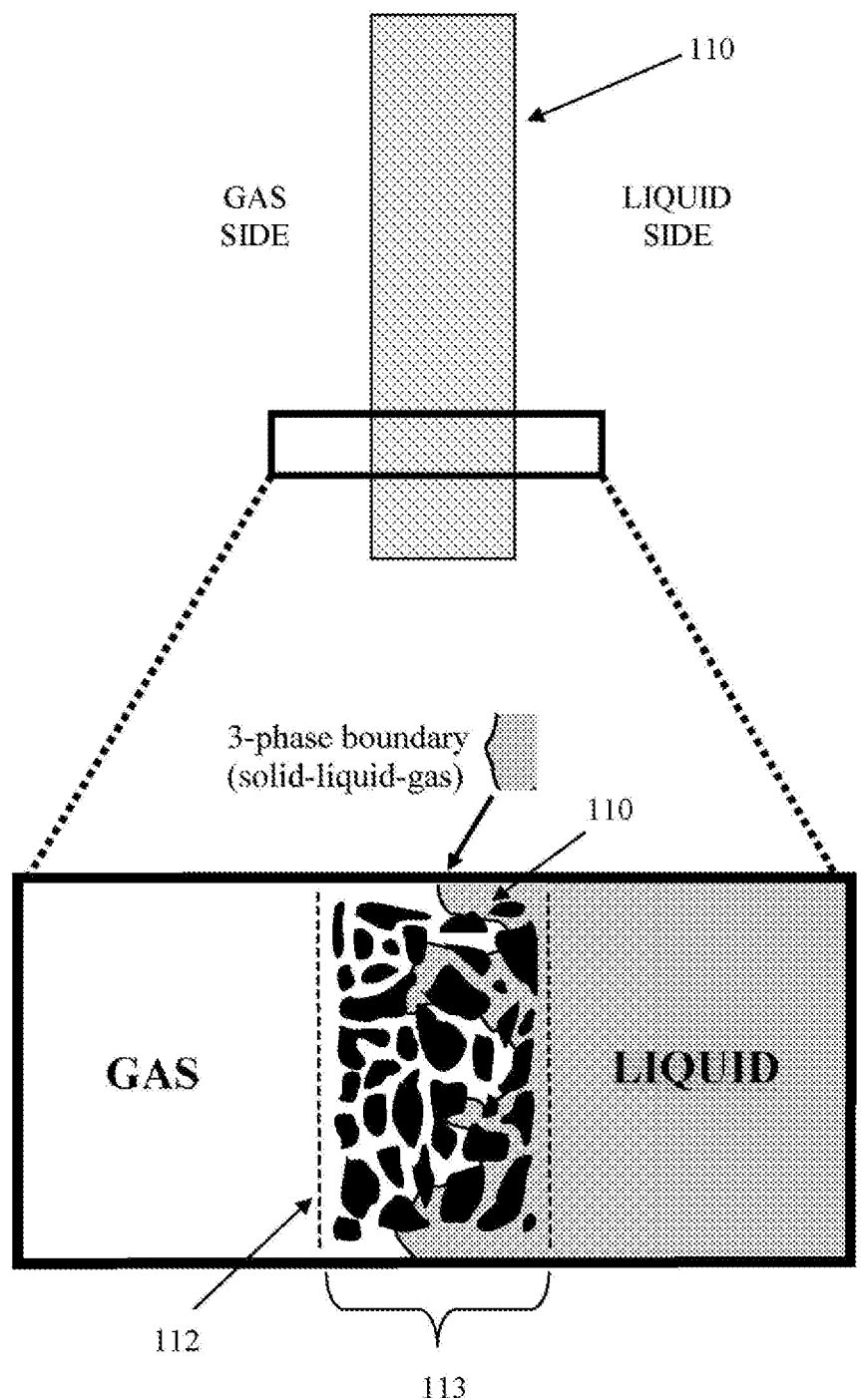
FIG. 1 (prior art) depicts in schematic form, a conventional gas diffusion electrode. The lower part of the figure is a magnified view of a section of the conventional gas diffusion electrode.

FIG. 1 depicts in a schematic form, a conventional gas diffusion electrode (GDE) 110, as widely used in industry at present (Prior Art). In cases where an electrode contains a zone or a layer that is intended to facilitate gas diffusion, FIG. 1 illustrates that gas diffusion layer or zone. FIG. 2(a) illustrates in schematic form the general structure of an example 3D electrode 115, for example as described above by way of example. In a conventional GDE 110, conductive particles (such as carbon particles) are typically mixed with non-conductive, hydrophobic Teflon particles, and then compressed and/or sintered into a single unit whose pore structure is ill-defined and non-uniform. By contrast, in an embodiment of the present GDE 115, the porous conductive material 130 and the gas permeable material 120 are substantially demarcated or separated, although there can be overlap at a boundary region. The pore structure of the gas permeable material 120, for example a non-conductive, hydrophobic material/element, is well-defined and uniform.

Figure 2B:
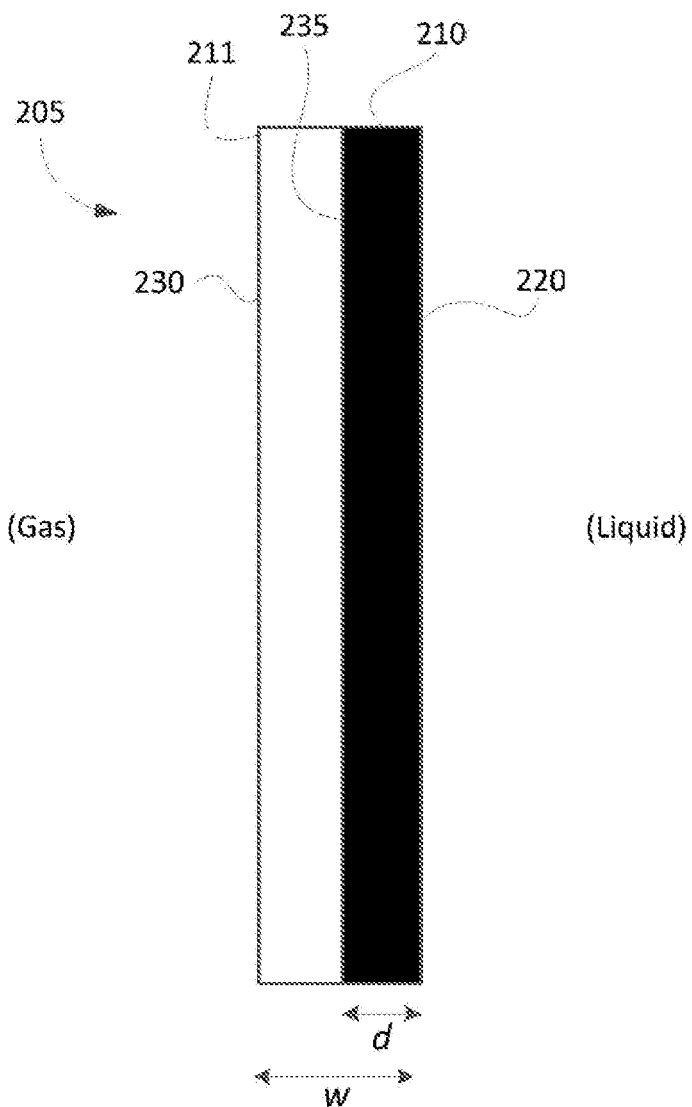
FIG. 2(b) depicts a schematic cross-sectional view of an example GDE (not to scale).

As can be seen in FIG. 2(b), the example 3D electrode (or GDE) 205 of width w includes a conductive layer or region 210 of width d with a non-conductive layer or region of width w-d. The dimensions are not accurate and are for illustration only. In the case of one particular example of a laminated electrode, the 3D conductive layer 210 (i.e. porous conductive material) comprises fine nickel mesh, which has a thickness of about 5-8 μm, while the 3D non-conductive layer 211 comprises an ePTFE membrane, which has a thickness of about 20 μm.

While the non-conductive layer or region 211 is thicker than the conductive layer or region 210 in this case, that need not be true in other cases of fabricated 3D electrodes. With other gas permeable materials and other techniques, this relative ratio may be quite different, with conductive layers or regions 210 being thicker and the non-conductive layers or regions 211 being thinner.

For example, in the case of an electrode where a binder material was applied with a paintbrush, the conductive layer comprised the fine nickel mesh and the binder material. The thickness of the binder material providing a binding layer was not easily controlled using a paintbrush, so that thicknesses of a binding layer of up to about 112 µm, for example, may be created. The binder material, moreover, penetrated the outermost portion of the ePTFE layer or membrane (to about 0.1-0.8 µm deep), so that the conductive portion may be cumulatively up to about 120 µm in thickness. The non-conductive portion would typically be about 19.2-19.8 µm thick. Thus, in such a case, the three-phase solid-liquid-gas boundary will fall within a maximum thickness of 0.8+120=120.8 µm. Such large thicknesses generally represent an extreme in the case of GDEs of the present embodiments, although thicknesses of 400-500 µm have also been achieved in the most extreme cases. Generally, but not exclusively, GDEs of the present embodiments formed by lamination of free-standing porous metallic structures to ePTFE membranes will have a three-phase solid-liquid-gas boundary that is less than about 100 µm thick.

In conventional GDEs, the entire GDE is conductive and different pore sizes and intermediate amounts of Teflon binder within the GDE, are used to create the solid-liquid-gas boundary that is formed inside the conventional GDE. However, because the pores in conventional GDEs are created by fusing layers of different particle size, there is relatively poor control on the pore size and distribution. The pores are therefore of a generally wide and non-uniform distribution. Moreover, the pores are generally large, being, at best, typically 30 microns in diameter at the outside edges of the GDE. The solid-liquid-gas boundary that is created within the GDE is therefore poorly controlled and ill-defined, with substantial variations in depth within the GDE. Small changes that occur during use of the GDE may therefore also shift the interface, causing the GDE to be prone to instability or even breakdown. Thus, a common problem in gas-liquid electrochemical transformations is flooding of the GDE. This occurs when the solid-liquid-gas boundary progressively relocates itself into the center of the GDE, until the GDE is effectively filled with liquid.

Whereas a conventional GDE relies upon the presence of larger pores in the center to provide for low-pressure ingress of gases to the interface, example GDEs of the present embodiments rely upon a substantial, large, relatively large or substantially large non-conductive layer or region 211 relative to the volume of the interface 235 with the conductive layer or region 210, to provide for low-pressure ingress of gases.

One advantage involves hitherto unavailable uniformity in how electrochemical gas-liquid reactions take place down the full length of the 3D GDE. Because the solid-liquid-gas boundary is so tightly constrained and uniform, such reactions will essentially occur in an identical way at all points of the interface along the length of the electrode. Practical problems arising from inhomogeneity and instability in the interface, as occur in many conventional GDEs, may therefore be largely eliminated. These include, without limitation, local excesses (or swamping/flooding) of reactants/products, leading to inefficient reaction, energy wastage (e.g. local hotspots), or electrode degradation. Moreover, once created, the interface is relatively stable and easily maintained—more stable and easily maintained that conventional GDEs. These properties result in 3D electrodes that may be more active per unit electrochemical area or per unit volume of catalyst than comparable conventional GDEs.

Another feature is that the solid-liquid-gas boundary is relatively delicate. By this it is meant that the solid-liquid-gas boundary can be degraded (reversibly and temporarily) by non-judicious applications of gas pressure (from the gas-facing side). For example, even relatively small over-pressures on the gas side of the GDE can push the liquid out of the conductive layer, diminishing the surface area of the boundary. This will occur at the so-called "bubble point" of the membrane polymer layer. In the extreme case, the liquid may even be pushed away from the electrode, effectively, destroying the solid-liquid-gas boundary or making it so small as to be practically useless. Moreover, in such a situation, gas bubbles may become trapped in the conductive layer or region 210, making it difficult (but not impossible) to regenerate the electrode. To avoid these possibilities, it is generally desirable or necessary to closely control external gas pressures and ensure that the conductive layer or region 210 is properly "wetted" prior to operation. Once operating GDEs of the present embodiments are generally highly stable. While the solid-liquid-gas boundaries are "delicate" in that they may be destroyed or disrupted upon the application of excesses of pressure, it should be noted that the pressures required to disrupt the three-phase boundaries are much higher than is the case in conventional GDEs. That is, the three-phase solid-liquid-gas boundaries in example GDEs are much less delicate than is the case for conventional GDEs.

Considering another aspect of example electrodes, there are various ways to measure air permeability of a material. For example, porosimietry can be used to determine the flow rate of air through membranes and coated membranes in units of liters per minute (L/min) as a function of applied pressure (in units of psi). Another way to measure air permeability is to use the 'Gurley number' scale, which is obtained with a Gurley densitometer. This measures the time (in seconds) taken to pass a particular fixed volume of air ($2.5$ cm$^3$) through a sample of fixed area ($0.645$ cm$^2$) at a fixed applied pressure (0.44 psi). The air permeability of the sample is inversely proportional to the Gurley number. That is, the larger the Gurley number, the less permeable to air is the sample.

Present example 3D electrodes/GDEs, for example using a treated or coated ePTFE membrane, have an air permeability that is very similar to that of the untreated or uncoated ePTFE membrane, at all measured applied pressures. By contrast, the air permeability of a conventional gas diffusion electrode using a Gortex™ membrane as an 'electrolyte leakage barrier' declines very substantially. For example, Gortex™ membranes used in conventional gas diffusion electrodes typically have Gurley numbers of 50-800 seconds. In one example, after they were laminated to a conventional gas diffusion electrode, their Gurley number increased to about 9,000-16,000 seconds. This means that it took 20-180 times longer to transfer the same quantity of air through such an electrode (with a Gortex™ membrane) as it took to transfer the same quantity of air through the Gortex™ membrane only.

Thus, in some particular example 3D electrodes according to present embodiments, an advantage is that the 3D electrodes have improved permeability to air, or are substantially permeable to air, whereas conventional 3D electrodes are less so. That is, in one example, the air permeability of the 3D electrode is similar to, about equal to, the same as, or is substantially similar to, substantially about equal to, or substantially the same as, the air permeability of the gas permeable material (e.g. polymer membrane).

Figure 2C:
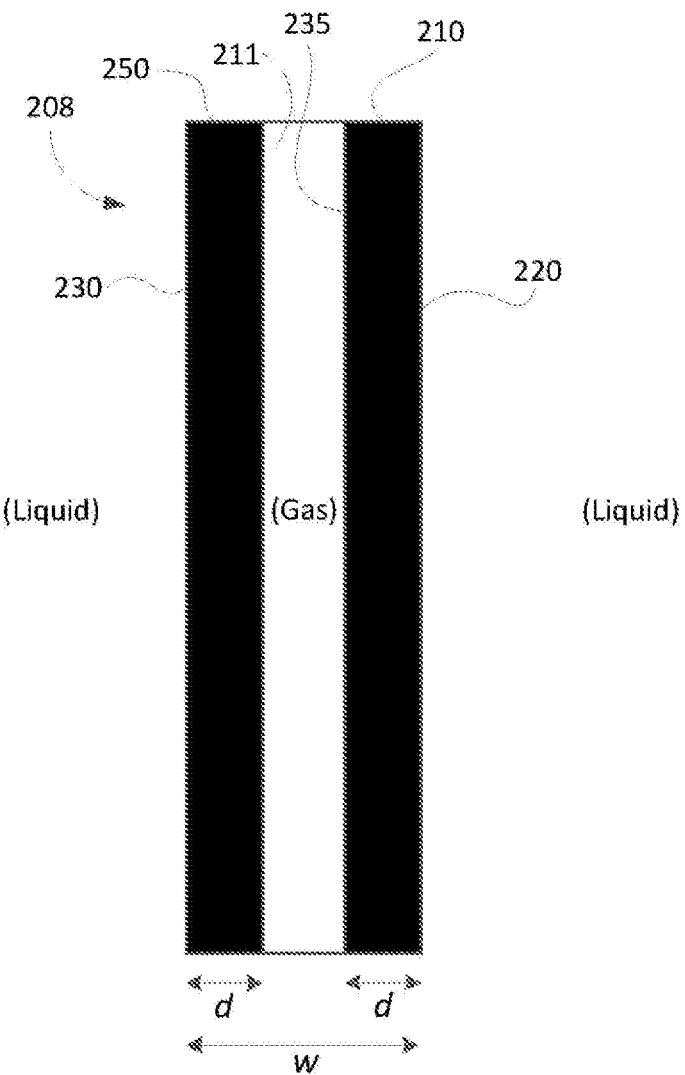
FIG. 2(c) depicts a schematic cross-sectional view of an example GDE in which the two outer surfaces are both conductive (not to scale).

FIG. 2(c) schematically illustrates a GDE 208 in which a gas permeable material, such as a gas permeable polymer layer, has been laminated with, or attached to a porous conductive material, such as a conductive metallic layer, on both of its sides. The second conductive layer 250 may be applied to the GDE 208 at the same time as the first conductive layer 220. Alternatively the second conductive layer 250 may be applied after the first conductive layer 220 is applied. The same means of fabrication described in the earlier examples, or other means, may be used to generate the double-sided GDE 208.

Regardless of its method of manufacture, the effect of having metallic layers, regions or coatings on both sides of the GDE 208 is to make the central, non-conductive core or region 211, also a channel along which gases can pass. The outer metallic layers, regions or coatings face the liquid phase (e.g. in one example water).

The resulting membranous gas channel 211 within the body of such a double-sided gas diffusion electrode 208 may be remarkably permeable to gases. That is, the resulting gas channel may be able to accommodate and carry unexpectedly large quantities of gas even at atmospheric pressure. For example, in a particular but non-limiting application, when acting as a cathode in a water electrolysis cell operating at a current density of about 10 mA/cm$^2$ (which results in the generation of 1000 liters of hydrogen per day per square meter of electrode geometric surface), such a double-sided gas diffusion electrode 208 can extend up to about 2.5 meters away from an attached hydrogen collection apparatus without the inner gas channel of the electrode 208 becoming saturated and unable to carry more hydrogen at any point along its length. Such a double-sided GDE 208 may be used by dipping into a solution of electrolyte, with gas fed to or from the non-conductive central region or core 211.

Novel Properties of Example Gas Diffusion Electrodes (GDEs)—The Effect of Pressure and Temperature on Energy Efficiency and Flooding A feature of example GDEs of the present embodiments is that they allow for the application of a higher pressure to the liquid electrolyte than is present on the gases in the GDE. High liquid pressures (relative to the corresponding pressure of the gas on the gas-facing side of the GDE) often have the effect of improving the energy efficiency of electrochemical reactions. By contrast, conventional GDEs typically can only deal with very low liquid pressures before they flood (and thereby become inoperable).

For example, GDEs containing as their polymer layer, a General Electric Company PTFE membrane with average pore size 0.2 μm (used for membrane distillation in the water purification industry), are typically able to withstand up to about 3.4 bar of liquid pressure before they flood. This is because the PTFE membrane has a wetting pressure (or "water-inlet" pressure) of 3.4 bar.

Thus, an electrochemical cell employing such GDEs may have its liquid electrolyte pressurised up to 3.4 bar higher, in this case, than the pressure of the gases in and on the gas-facing sides of the GDEs. Many electrochemical processes involving gas-to-liquid or liquid-to-gas transformations are favourably affected by differential pressures of this type. Such a large pressure differential may therefore have the effect of substantially increasing the energy efficiency of the half-reaction which occurs at the GDE electrode. That is, one may achieve a particular rate of production at a lower applied cell voltage than was otherwise needed.

By contrast, conventional GDEs have wetting pressures that are said not to exceed 0.2 bar, meaning that they readily allow electrolyte to leak even at very mild liquid pressures. The option to apply higher differential pressures above 0.2 bar to liquid electrolytes in such cases, is therefore not available.

Thus, in one example embodiment, an electrochemical cell employing a GDE can have its liquid electrolyte pressurised to at least 0.2 bar and up to about 3.4 bar higher than the pressure of the gases in and on the gas-facing sides of the GDE.

A second feature of example GDEs of the present embodiments is their unusual properties at increasing temperatures. One effect of higher temperatures is to increase the amount of water vapour within a GDE and therefore also to increase the potential for condensation of that water vapour (flooding) within the GDE. An example GDE, with a high wetting pressure of, for example, 3.4 bar, is far less easily wet (if not being, effectively un-wettable) than a conventional GDE with a wetting pressure of 0.1 bar. For this reason, the conventional GDE will be at greater risk of flooding with increasing temperature than a GDE of the present embodiments with a higher wetting pressure (e.g. 3.4 bar).

Thus, cells employing example GDEs of the present embodiments may have their liquid electrolyte heated to higher temperatures than those having conventional GDEs, without risk of flooding the GDE. For many electrochemical processes, higher temperatures have the effect of improving the energy efficiency of the half-reaction at the electrode and thereby the increasing the energy efficiency of the overall process. Moreover, most electrolytic cells are "self-heating" in that the excess energy which must be applied to drive the reaction, is released as heat.

Fabricating GDEs Using Deposition of Conductive Metals

In other examples there are provided 3D electrodes/GDEs which include a gas permeable material and a porous conductive material partially coating the gas permeable material. Referring back to FIG. 2(b) to illustrate this electrode structure, the porous conductive material penetrates the gas permeable material to a depth (d) less than the thickness (w) of the gas permeable material. For example, the depth is between about 5 nanometers to about 0.4 millimeters, dependent on sufficient thickness of the gas permeable material, e.g. gas permeable membrane. Alternatively, in another preferred form, the depth is between about $1/100,000^{th}$ to about $1/1.5^{th}$ of the thickness of the gas permeable material.

A conductive layer is formed at one surface of the 3D electrode and a non-conductive layer is provided or formed at the other, opposing, surface of the 3D electrode/GDE. The conductivity of the 3D electrode thus varies along the thickness of the 3D electrode. The conductive layer is gas permeable and at least partially liquid permeable, whereas the non-conductive layer is gas permeable and liquid impermeable, during normal operational use of the electrode. The conductive layer is part of an outer surface of the 3D electrode and is relatively less hydrophobic than the gas permeable material, whereas the bulk 3D electrode is gas breathable and liquid impermeable.

In other example forms: when used as a GDE, a three-way solid-liquid-gas boundary is formed within the 3D electrode; the solid-liquid-gas boundary is narrow in macroscopic width compared to the thickness of the 3D electrode or the gas permeable material. For example, the solid-liquid-gas boundary may be up to 850 nm wide.

Generally, for the examples discussed here, there is provided a process for preparing a 3D electrode or a GDE, comprising the steps of: a fabrication step to fabricate the 3D electrode or a GDE, including determining or setting a width of a three-phase solid-liquid-gas boundary, preferably where the width is narrow in relation to the width of the 3D electrode or a GDE; and an operation step to operate the 3D electrode or a GDE, preferably in a cell, at low current density, for example from 1 mA/cm² to 500 mA/cm², or from 1 mA/cm² to 200 mA/cm², or from 1 mA/cm² to 100 mA/cm², inclusively.

Referring back to FIG. 2(b) as a structural illustration for this alternative example, where the metallic and/or binder material has penetrated the pores of the non-conductive layer or region 211 the conductive layer or region 210 closest to the interface 235 or boundary region may also have a pore structure and other properties (e.g. hydrophobicity, wetting, and gas/liquid permeability), that are essentially identical, or, at least, very similar, to that of the non-conductive layer or region 211. In such a case, the boundary region or interface 235 between the layers or regions 210, 211 is not so much characterised by a structural change, as by an electrical change. It is, effectively, only a boundary region or interface of electrical conductivity. On one side of boundary or interface 235, layer or region 210 is conductive or somewhat conductive, whereas on the other side of boundary or interface 235, layer or region 211 is non-conductive. Moreover, on both sides of the boundary, boundary region or interface 235, the pores are uniform and small (about 0.2 micron in this case, although smaller pores can be obtained using other membranes). For this type of example 3D electrode, there is a substantially uniform or highly uniform pore structure and distribution, especially about the conductive-non-conductive boundary, which can be readily varied by merely selecting a different membrane to use as a gas permeable material. Important other properties (e.g. hydrophobicity, wetting, and gas/liquid permeability) are also unchanged on both sides of the interface 235.

The gas permeability of the conductive layer or region 210 is, moreover, either identical to or greater than that of the non-conductive layer or region 211 (except, of course, in the non-optimum case where the membrane has been blocked by an over-thick application of the conductive layer). Thus, gases may readily and uniformly pass through the electrode 205 (in this alternative example). The gas permeability of the 3D electrode 205 is, additionally, readily characterizable, being created by and being substantially the same as that of the uncoated gas permeable material, for which gas permeability data may routinely exist.

The liquid permeability of a 3D electrode depends largely or even entirely on the gas permeable material and the liquid with which it interacts. A hydrophilic polymer allows a hydrophilic liquid to pass through evenly and uniformly. The same is true for a hydrophobic polymer interacting with a hydrophobic liquid. In the case where there is a mismatch between the polymer and the liquid, an interface is created between the liquid and the 3D electrode. The extent and nature of that interface depends on the materials involved.

In further various examples, the wetting pressure for the GDEs is the same as that of the polymer layer or membrane used (for example the General Electric Company membrane of 0.2 μm average pore size), which is about 3.4 bar. Thus, only upon the application of 3.4 bar of pressure on the liquid side does liquid water penetrate and pass through the membrane, thereby flooding the membrane. By contrast, all other GDEs known to the inventors have wetting pressures that do not exceed 0.2 bar.

In various further examples: a porous conductive material or layer is provided at least partially within the gas permeable material; the porous conductive material or layer is associated with the gas permeable material; the porous conductive material or layer is located on and within the gas permeable material; and/or, the gas permeable material is located on and within the porous conductive material or layer. Preferably, though not necessarily, the conductive material is a metal, which after being applied is in the form of the porous conductive material. For example, the conductive material forming the porous conductive material can be Nickel. Alternatively, the metal could be Ti, Cr, Pt, Cu, Pb, Sn, Co, Mn, Au or Ag. Further, the porous conductive material could be formed of carbon black particles.

In further examples, the depth (d) of the conductive layer or portion is in the range of about 1 nm to about 10 μm, or about 50 nm to about 1 mun, or about 50 nm to about 500 nm. In a specific example, the porous conductive material is formed of Nickel, the gas permeable material is a 0.2 micron PTFE membrane and the depth is greater than 0 and less than about 850 nm.

In an example method of fabricating this form of 3D electrode, the steps include selecting a gas permeable material, for example with a substantially uniform pore size, and then applying, as a calibrated step, a conductive material to partially coat the gas permeable material, thereby forming a porous conductive material. The porous conductive material penetrates the gas permeable material to a depth less than the thickness of the gas permeable material. The calibrated step can include: a particular mode of application; a particular time or period of application; a particular electrical current or range of current of application; a particular temperature or range of temperature of application; and/or a particular circumstance or range of circumstances of application. The ideal conditions by which the calibrated deposition is performed, are typically determined by a program of study to realise a suitably narrow and well-defined solid-liquid-gas boundary in the desired range of widths, such as from 50 to 850 nm width. In one example, the conductive material can be Nickel and can be applied by vacuum deposition at a loading of greater than about 0.455 g/m² and less than about 3.64 g/m². Preferably, in this particular example, the Nickel is provided at a loading of about 1.82 g/m², which has the effect of imparting the electrode with unexpectedly amplified electrochemical properties when operated at a current density of 10 mA/cm² in the manufacture of: (i) pure oxygen from air oxygen, (ii) hydrogen peroxide from aqueous alkaline solution, or (iii) electrical potential and current in an alkaline fuel cell (or a direct methane fuel cell when a coating of Pt is used having 100 nm thickness).

Calibrated or careful application of one or more electrically conductive materials to gas permeable materials, for example porous polymer membranes, using controllable coating techniques can be used to produce 3D electrodes. When formed in a calibrated manner, one or more conductive layers may form part of a 3D electrode with unexpected and improved electrochemical performance, especially relative to other 3D electrodes and to the cost of manufacture. Further layers, for example including catalytic or other materials, can be conveniently added to, or formed upon the one or more conductive layers to produce more complex 3D electrodes that are practical and useful in electro-energy or electro-synthetic applications.

Example gas permeable or breathable 3D electrodes can be formed by depositing a conductive material or layer on a gas permeable material and, optionally, subsequently depositing a catalyst on the conductive material or layer. In one example, one could start with a gas permeable non-conductive material and then form the conductive material or layer on the gas permeable non-conductive material, and thereafter, deposit one or more catalysts.

In the case of an example 3D electrode manufactured in this manner, and referring back to the structure illustrated in FIG. 2(b), a gradual change in hydrophobicity exists in moving from the outside surface 220 through the conductive layer or region 210 which may penetrate the gas permeable material to depth d. The outer metal-binder surface 220 is relatively less hydrophobic, but this becomes more hydrophobic on moving into the non-conductive layer or region 211 toward the highly hydrophobic, non-conductive surface 230. The distance over which this hydrophobicity changes may be small, in one example being effectively only the depth into which the binder material penetrates the gas permeable material, for example in the case of ePTFE pore structure about 0.1-0.8 µm. This is narrower than the depth d, which defines or approximates the thickness of the conducting layer (for example about 8 µm to about 120 µm in some examples).

Thus, for this particular 3D electrode, a liquid solvent like water is likely able to partially penetrate at least some of the way into the conductive outer layer or region 210, which in one example form may be provided by applying or depositing a metallic coating. But water will be repelled and unable to penetrate into the highly hydrophobic interior. The liquid is therefore limited to, in one example the about 0.1 µm to about 0.8 µm thick outermost portion of the ePTFE, which has a high internal surface area, most of which may be conductive (after attachment of the metallic coating). The ingress of liquid water into the electrode 205 is therefore tightly controlled and a solid-liquid-gas boundary is created within, in one example, the outermost layer of about 0.1 µm to about 0.8 µm in depth. At this interface, gas from the non-conductive side 230 of the electrode 205 encounters liquid ingression from the outside of the membrane, at the conductive, metallized region.

According to various aspects provided by way of example:
(1) Carefully calibrated application of one or more conductive materials to gas permeable materials, such as porous polymer membranes, using controllable coating techniques can produce 3D conductive electrodes of remarkable and unexpected robustness, activity, and electrochemical area per unit volume, and which, when configured for gas-to-liquid and/or liquid-to-gas processes, display uniquely well-defined, narrow, and stable three-way solid-liquid-gas boundaries;
(2) When applied in a calibrated manner, conductive layers of this type constitute the formation of a 3D electrode with unexpected and amplified electrochemical performance, especially relative to other 3D electrodes and to the cost of manufacture;
(3) Additional layers including catalytic or other materials may be conveniently added to, or formed upon the conductive one or more layers to yield more complex 3D electrode structures that are practically useful in, especially, electro-energy or electro-synthetic applications;
(4) The availability of 3D electrodes, for example fabricated as described in points (1)-(3) above, makes viable or improves the practicality of a range of electro-energy and electro-synthetic applications. Such applications are typically unviable or relatively less practical using conventional fixed-bed or gas diffusion electrode technologies.

In various example forms, the coating techniques include but are not limited to metal vacuum-coating, sputter-coating, dip-coating, electroless- and electro-coating, powder-coating, and the like. In various example forms, the catalytic or other layers are applied by techniques, including but not limited to: electro- or electroless-coating, powder-coating, dip-coating, vacuum-coating, and the like. While coating techniques such as these have been previously applied to membranes which have subsequently been used to facilitate electrocatalytic transformations, the inventors have found that such metal-coating can be optimised in a different way, which provides for novel and improved catalytic properties, especially, but not exclusively, when operated at low current density. The unique mode of optimisation in such cases is directed at achieving a well-defined and narrow solid-liquid-gas boundary during operation as a GDE, such as having a macroscopic or maximum width of from about 50 to about 850 nm. Optionally, the metal-coated materials or membranes may be further coated with other particulate materials, slurries or coatings, including but not limited to materials that may comprise, wholly or in part, of electrochemically active ingredients. Such electrochemically active ingredients may include but are but not limited to: (a) electrocatalysts, (b) conductors, (c) current collectors, and the like.

Optionally, but preferably, the 3D electrode is flexible. Optionally, but preferably, the gas permeable material is made at least partially or wholly from a substance that is flexible, for example at least partially or wholly from a polymer or a combination of polymers, for example PTFE, ePTFE, polyethylene, polysulfone or polypropylene. The polymer itself may or may not be gas permeable. For example, the polymer itself may not be gas permeable but a structure or membrane formed from the polymer is gas permeable.

Fabricating GDEs Using Lamination

In another specific example, an expanded PTFE (ePTFE) membrane manufactured by General Electric Company for the water treatment industry (pore size 0.2 micron) had a fine nickel mesh (200 line per inch; manufactured by Precision eForming Inc.) laid down upon the membrane. The mesh was then carefully lifted, starting at one edge and a layer of a binder material (15% Nafion in alcohol/water; supplied by Ion Power Inc., containing 10% by weight of carbon black, supplied by Sigma-Aldrich) was applied to the membrane surface. The mesh was thereafter released and allowed to contact the coated membrane. After leaving to dry for 4 hours at 60° C., the mesh was adhered to the surface of the PTFE membrane. This fabrication method may be amended in several ways. The binder material may be applied or painted over the unconnected mesh and the membrane and then dried, causing the mesh to adhere to the membrane. Alternatively, the binder material may be separately applied to the membrane surface and the mesh, with the coated, wet membrane and mesh then married up and dried.

Further aspects and details of example electrodes that can be utilised as GDEs can be found in the Applicant's concurrently filed PCT patent application "Composite Three-Dimensional Electrodes and Methods of Fabrication" filed on 30 Jul. 2014, which is incorporated herein by reference.

Deploying Example Embodiment GDEs in Industrial Applications

The 3D electrodes being applied as GDEs allows a new type of electro-synthetic (i.e. electrochemical) or electro-energy cell, e.g. fuel cell, to be achieved. The cell includes a liquid electrolyte and at least one gas diffusion electrode as discussed above. The GDE in use can operate as a gas depolarized electrode and includes a gas permeable material that is substantially impermeable to the liquid electrolyte, during normal operational use of the electrode, as well as a porous conductive material provided on a liquid electrolyte-facing side of the at least one gas diffusion electrode. The porous conductive material can be attached to the gas permeable material by being laminated to the gas permeable material. Alternatively, the porous conductive material is attached to the gas permeable material by being coated on at least part of the gas permeable material.

The GDE and the materials or layers used to form the GDE are optionally, but preferably, flexible. This advantageously allows the GDE, and reactors or cells which include the GDE, to be bent and wound. In order to form spiral-wound devices, a multi-layered arrangement of flat-sheet membranes may be rolled up into a spiral-wound arrangement. The spiral-wound arrangement may then be encased in a casing, which holds the spiral-wound element in place within a module whilst allowing for electrolyte to transit through the module. Alternatively and optionally, the multi-layered electrochemical reactor in a flat-sheet arrangement is not wound into a spiral, but deployed in its flat-sheet arrangement; that is the electrochemical reactor is a flat layered arrangement. An advantage of this cell arrangement is that it provides for high density of construction and may thereby provide an inexpensive way of deploying gas diffusion electrodes in an electrochemical reactor or cell.

In another embodiment there is provided an electrochemical reactor, comprising a plurality of hollow fibre electrodes (as either or both of cathode or anode) and a plurality of other electrodes (as the opposite electrode). A plurality of hollow fibre cathodes comprise a hollow fibre gas permeable, but electrolyte-impermeable material having a conductive layer, that may include a catalyst. A plurality of hollow fibre anodes comprise a hollow fibre gas permeable membrane having a conductive layer that may include a catalyst.

Regardless of whether the reactor or cell arrangement is spiral-wound, flat sheet or hollow fibre, the modular reactor units may be so engineered as to be readily attached to other identical modular units, to thereby seamlessly enlarge the overall reactor to the extent required. The combined modular units may themselves be housed within a second, robust housing that contains within it all of the liquid that is passed through the modular units and which serves as a second containment chamber for the gases that are present within the interconnected modules. The individual modular units within the second, outer robust housing may be readily and easily removed and exchanged for other, identical modules, allowing easy replacement of defective or poorly operational modules.

In all of the flat-sheet, spiral-wound, or hollow fibre cell arrangements, collection tubes, channels, or pathways may be positioned to plumb the respective gases and/or electrolyte into or from the modular reactor or device. Conveniently, the collection tubes or channels may be attached to the cell or reactor with the desired gas or electrolyte channel being open to the tube for the respective gas or electrolyte.

For example, all of the gas channels for one of the gases may be open at a matching location and communicate with the tube for that gas. At that location and where applicable, the gas channels for the second gas (where applicable) or the electrolyte channels for the electrolyte are closed or sealed. At a different location on the reactor, the gas channels for the second gas (where applicable) may be open and communicate with the tube for that gas. At that location the gas channels for the first gas and the electrolyte channels for the electrolyte are closed or sealed. At a still further location on the reactor, the electrolyte channels for the electrolyte may be open and communicate with the tube for the electrolyte. At that location the gas channels for the first gas and, where applicable, for the second gas are closed or sealed Example Advantages that May be Realised by Example Embodiments One of the advantages addressed by various embodiments is that the need for a membrane diaphragm between the electrodes can be eliminated in several electrochemical processes. For example, in chlor-alkali cells, chlorine gas is generated at the anode from acidified 25% NaCl solution, while hydrogen gas is generated at the cathode from strongly caustic solution (typically 32% NaOH). Because of the different character of the electrolyte at each electrode, a highly specialised and expensive sodium exchange membrane (proton or ion exchange membrane) is required as a diaphragm to separate the two electrolyte chambers between the two electrodes. The sodium exchange membrane stops the liquids in the two electrolyte chambers from mixing, but allows for an ionic current, in the form of sodium ions transferring from one chamber to the other, to close the circuit in the cell. However, when the electrolyte in the chlor-alkali process is changed from brine to hydrochloric acid then there is no theoretical need for a sodium exchange membrane or, indeed, for any sort of membranous diaphragm between the electrodes, since the electrolyte about each electrode is then the same. However, in practice a membranous diaphragm is still required since bubbles of chlorine generated at the anode may mix with bubbles of hydrogen generated at the cathode. That is, to avoid the chlorine product being contaminated with hydrogen, an ion exchange membrane or diaphragm is needed to separate the bubbles. When GDEs according to example embodiments are used in such a chlor-alkali cell however, there are no bubbles produced at either the cathode or the anode, so that the membrane or diaphragm can be dispensed with. This improves the energy efficiency and lowers the cost of such a cell or reactor.

The inventors have also found that example cells allow the efficient use of space between the anode and cathode. Example cells permit at least 70% of the volume between the anode and the cathode to be occupied by electrolyte whilst maintaining the anode and cathode in a spaced apart relationship. In addition, example cells can allow the non-electrolyte component (the spacer layer) in the electrolyte chamber to produce less than 20% of the total resistance of the electrolyte chamber. Example cells may also permit the diffusion of both cations and anions across the electrolyte chamber without impedance such as by a proton exchange membrane or diaphragm.

High energy efficiency of the cells or reactors derives from the use of GDEs according to example embodiments, which can dramatically improve energy efficiency. For example, GDEs may eliminate the bubble overpotential at each electrode. Other ways in which GDEs may improve energy efficiency or industrial utility are described in the Applicant's concurrently filed PCT patent application "Electro-Synthetic or Electro-Energy Cell with Gas Diffusion Electrode(s)" filed on 30 Jul. 2014, which is incorporated herein by reference.

High energy efficiencies may be made still higher by: (i) the use of relatively low current densities, which minimises electrical losses and thereby maximises electrical efficiency, and (ii) the use of highly-efficient catalysts, including, but not limited to low-cost catalysts comprising of Earth-abundant elements which operate highly efficiently at lower current densities, (iii) optimizing the inter-electrode distance, (iv) using appropriately designed current distributors and collectors, and/or (v) improving mass transfer. Other means of increasing energy efficiencies may also be envisaged.

The low cost may be achieved by the combination of: (i) low-cost breathable materials as the substrate for the GDE anodes and/or cathodes, (ii) low-cost metallic elements for the conductive portion of the GDE, (iii) compact and inherently efficient cell designs, (iv) inherently inexpensive assembly techniques, (v) the use of low-cost catalysts comprising of Earth-abundant elements, as the catalysts at the anode and cathode, (vi) low-cost reactor arrangements that have electrode surface area but small external footprints, (vii) eliminating the need for a membrane or diaphragm between the electrodes, and/or (viii) optimal electrode manufacturing methods. Other means of achieving low-cost may also be envisaged. The combination of these factors allows for high overall rates of reaction even when small current densities per unit surface area are employed.

The inventors have also found that cells or reactors may be operated efficiently by managing the pressure differential across the gas-permeable electrolyte-impermeable material or layer. The management of the pressure differential can prevent wetting of the gas-permeable electrolyte-impermeable layer and thereby facilitate the reaction to improved or maximum efficiency. The selection of the pressure differential is typically dependent upon the nature of the gas-permeable electrolyte-impermeable layer and may be determined with reference to Washburn's equation. Pressurising the electrolyte may also be useful in providing a pressurised gas product in the gas collection channels or layers. Further details are described in the Applicant's concurrently filed PCT patent application "Method and Electrochemical Cell for Managing Electrochemical Reactions" filed on 30 Jul. 2014, which is incorporated herein by reference.

Structural, Electrical, And Plumbing Options In Example Embodiments

The individual electrodes within a multi-layer reactor may be configured in series or parallel, so as to improve or maximize the energy efficiency, for convenience of fabrication, or for some other quality of the electrochemical reactor. For example, the electrodes may be configured to maximise the voltage (Volts) and minimise the current (Amps) required. This may be because, in general, the cost of electrical conductors increases as the current load increases, whereas the cost of AC-DC rectification equipment per unit output decreases as the output voltage increases.

The overall configuration of the individual cells in series or parallel within the reactor may be configured so as to best match the available three-phase industrial or residential power. This may be because a close match of the overall power requirements of the electrolyser and the available three-phase power generally allows for low-cost AC to DC conversion with near 100% energy efficiency, thereby reducing or minimising electrical losses.

In one example embodiment, the multi-layered structure of anodes and cathodes comprising the electrochemical cell is housed within a tight-fitting and robust housing or casing which holds within the housing or casing all of the anodes and cathodes, as well as the gas and liquid channels. That is, the multi-layered structure of anodes and cathodes and their associated gas and liquid channels are fabricated in a modular form, which may be readily linked to other modules to form larger overall reactor structures. Moreover, in the case of failure, they may be readily removed from and replaced in such structures by other identically or similarly constructed modules.

In another example embodiment, the multi-layered structure of anodes and cathodes within a single module reactor have a relatively high internal surface area, but a relatively low external footprint. For example, a single module may have an internal structure or surface area of more than 20 square meters, but external dimensions or surface area of about 1 square meter. In another example embodiment, a single module can have an internal structure or surface area of more than 10 square meters, but external dimensions or surface area of less than 1 square meter. A single module may have an internal structure or surface area of more than 20 square meters, but external dimensions or surface area of less than 1 square meter.

In another example embodiment, the multi-layered structure of anodes within a single module reactor, may have the gas channels associated with the anode connected into a single inlet/outlet pipe. In another example embodiment, the multi-layered structure of cathodes within a single module reactor, may have the gas channels associated with the cathode connected into a single inlet/outlet pipe, which is separate from the anode inlet/outlet pipe. In another example embodiment, the multi-layered structure of anodes or cathodes within a single module reactor, may be conventional electrodes which do not have gas channels associated with them.

In an example embodiment, there is provided a gas diffusion electrode for an electro-synthetic or electro-energy cell, which includes one or more gas permeable layers. The gas diffusion electrode also includes a first conductive layer provided on a first side of the gas diffusion electrode, wherein the one or more gas permeable layers provide a gas channel.

Preferably, the first conductive layer comprises a porous conductive material. Optionally, a second layer is provided on a second side of the gas diffusion electrode. In this case, the one or more gas permeable layers can be positioned between the first conductive layer and the second layer. In one example, the second layer provides a second conductive layer, and the second conductive layer may comprise a porous conductive material. In a specific example, the porous conductive material can be a porous metallic material.

In another example embodiment, there is provided a gas diffusion electrode for an electro-synthetic or electro-energy cell, which includes one or more gas permeable layers. The gas diffusion electrode also includes a first conductive layer provided on a first side of the gas diffusion electrode, and a second conductive layer provided on a second side of the gas diffusion electrode. The one or more gas permeable layers are positioned between the first conductive layer and the second conductive layer, and the one or more gas permeable layers provide a gas channel.

In another option, the first conductive layer is a porous conductive material, and the second layer is also the porous conductive material. In use, the first side of the gas diffusion electrode and the second side of the gas diffusion electrode contact a liquid electrolyte. Preferably, the one or more gas permeable layers are gas permeable and substantially impermeable to the liquid electrolyte, and the porous conductive material is gas permeable and liquid electrolyte permeable.

In other example embodiments, there are two or more gas permeable layers. Preferably, a spacer is positioned between the first conductive layer and the second conductive layer. The spacer preferably forms at least part of the gas channel. The spacer can be a different material to the one or more gas permeable layers. The spacer may be positioned between two gas permeable layers. The gas diffusion electrode can be considered as a double-sided electrode.

The gas diffusion electrode is preferably one of a plurality of similar gas diffusion electrodes in a cell. An electrolyte spacer can be positioned between adjacent gas diffusion electrodes. A liquid electrolyte can move through the electrolyte spacer. In one form the plurality of similar gas diffusion electrodes are formed as alternating cathodes and anodes. In other examples: the first conductive layer and/or the second conductive layer are provided adjacent to or on the one or more gas permeable layers; and/or the first conductive layer and/or the second conductive layer are deposited on the one or more gas permeable layers.

In one example aspect, the gas channel is able to transport gas internally in the gas diffusion electrode. The one or more gas permeable layers are formed from a gas permeable material, and in some examples the gas permeable materials can be selected from the group of PTFE, ePTFE, polypropylene, polyethylene, polyethersulfone and polysulfone. In another example the one or more gas permeable layers and the spacer are contiguous.

In an example use a gas is extracted or introduced in the gas channel that is substantially parallel to an electrolyte channel. The gas is extracted or introduced in one direction and a second gas is extracted or introduced in another direction via a second gas channel in a second gas diffusion electrode. The electrolyte channel is separate from the gas channel and is positioned between the gas diffusion electrode and the second gas diffusion electrode. In one example two gas permeable layers and the spacer collectively define the gas channel.

In various examples, the spacer is flexible, the spacer is a non-conductive polymer, the spacer is a polypropylene mesh, the spacer is provided by embossed polymer structures, or the spacer is an electrically insulating polymer net. In other examples, the porous conductive material is attached to the gas permeable material by being laminated to the gas permeable material, or the porous conductive material is attached to the gas permeable material by being coated on at least part of the gas permeable material.

A depolarizing gas can be received by the gas diffusion electrode to gas depolarize the electrode. Advantageously, bubbles of gas are not produced or substantially produced at or by the gas diffusion electrode. In another example the gas diffusion electrode includes a barrier layer. The barrier layer limits an amount of an undesired gas permeating through the gas diffusion electrode. Preferably, the gas diffusion electrode has a wetting pressure above 0.2 bar, and the gas diffusion electrode can have a wetting pressure about 3.4 bar or greater. Also preferably, the conductivity of the gas diffusion electrode varies along the thickness of the gas diffusion electrode.

Example 1

Fabrication Of Electrochemical Cells

FIG. 3(a) schematically depicts how an electrode used in current example embodiments may be fabricated. Two Gas Diffusion Electrodes (GDEs) 10 are co-located with, positioned either side of, positioned adjacent to, attached to, etc., a so-called gas channel spacer or spacer layer 40, as depicted in FIG. 3(a). Further aspects of the GDEs are described in the Applicant's concurrently filed PCT patent application "Composite Three-Dimensional Electrodes and Methods of Fabrication" filed on 30 Jul. 2014, which is incorporated herein by reference.

Each GDE in the assembly comprises a porous conductive material (e.g. porous metallic element) 20, and a gas permeable material (e.g. gas-permeable, electrolyte-impermeable layer) 30. The porous conductive material 20 could typically be a metal mesh, such as a 100 line-per-inch (LPI) stainless steel mesh, coated with and, potentially, laminated using a catalyst-containing binder material. The gas permeable material 30, or gas-permeable, electrolyte-impermeable layer, would typically be a PTFE membrane (such as the membrane produced by General Electric Company for membrane based distillation in the water purification industry) having average pore size 0.2 μm and a wetting pressure of 3.4 bar. The "gas-channel" spacer or spacer layer 40, would typically be a permeate carrier, for example of the type used in the reverse osmosis industry and manufactured by Hornwood Inc. (an example structure of a permeate carrier is shown in FIG. 3(a)). The components in the assembly would typically be tightly pressed together, optionally with no glue or other fasteners holding them in place. Where required, a seal or glue line may be created around the edges of the combined sheets in 50 in order to hold them together in a single unit. The components form double-sided, assembled or composite electrode 50 that can be used as an anode and/or cathode in a cell. Gases may typically permeate into or out of the double-sided, assembled or composite electrode 50 via the gas-channel created by the spacer 40 and the adjacent gas-permeable, liquid-impermeable layers 30. Liquid electrolyte would typically be restricted to areas outside of and facing the porous conductive material (or porous conductive layers) 20.

FIG. 3(b) schematically depicts an alternative double-sided, assembled or composite GDE 51, where the porous conductive materials or elements 20 have been attached on either side of a gas permeable material 30, preferably a single gas-permeable, electrolyte-impermeable layer. In this example, no spacer or spacer layer 40 is used. Gases may typically permeate into or out of the electrode 51 via the gas-channel created by the gas-permeable, liquid-impermeable layer 30. Liquid electrolyte would typically be restricted to areas outside of and facing the porous conductive layers 20. The inventors have found that the membranous gas channel 30 within the body of such a double-sided gas diffusion electrode, is remarkably permeable to gases. That is, the gas channel 30 can accommodate and carry unexpectedly large quantities of gas even at atmospheric pressure. For example, as a cathode in a water electrolysis cell operating at a current density of 10 mA/cm$^2$ (which results in the generation of 1000 liters of hydrogen per day per square meter of electrode geometric surface), such a double-sided gas diffusion electrode can extend up to 2.5 meters away from its end that is attached to a hydrogen collection apparatus without the inner gas channel of the electrode becoming saturated and unable to carry more hydrogen at any point along its length.

Figure 4:
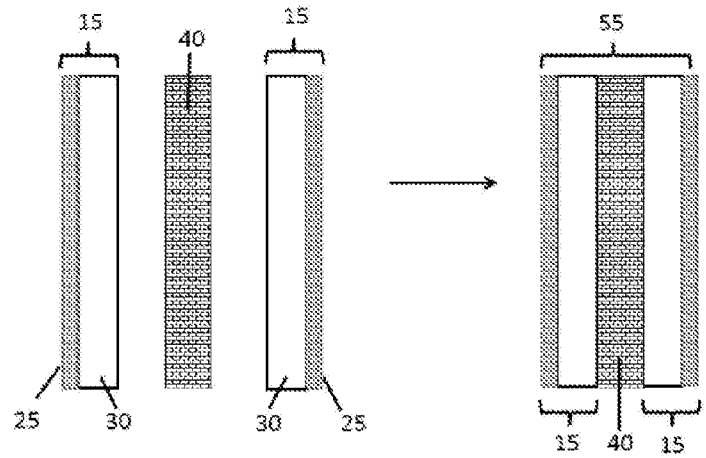
FIG. 4(a) schematically depicts the fabrication of an example cathode.
FIG. 4(b) schematically depicts the fabrication of an example anode.
Figure 4:
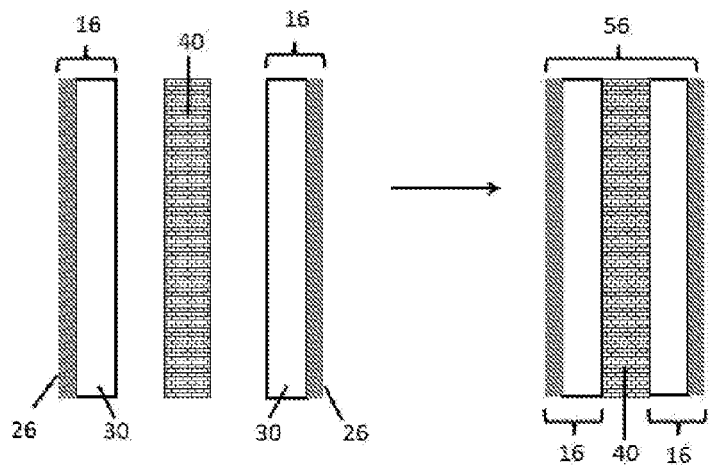

FIG. 4 schematically depicts example electrodes formed of GDEs 15 and GDEs 16, where the conductive layer has been selected to facilitate the reaction at either the cathode or the anode. This selection may involve the presence of an electrocatalyst in the anodic conductive layer 26 or the cathodic conductive layer 25. Or, it may involve a particular metal, or a particular alloy, or a particular combination of materials in the anodic conductive layer 26 or the cathodic conductive layer 25. When a cathodic conductive layer is used, the overall two-sided electrode is a cathode 55. When an anodic conductive layer is used, the overall two-sided electrode is an anode 56.

Gases may typically permeate into or out of the cathode 55 or anode 56 via the gas-channel created by the spacer 40 and the adjacent gas-permeable, liquid-impermeable layers 30. The anode gas would permeate into or out of the spacer 40 and the adjacent gas-permeable, liquid-impermeable layers 30 in the anode 56. The cathode gas would permeate into or out of the spacer 40 and the adjacent gas-permeable, liquid-impermeable layers 30 in the cathode 55. Liquid electrolyte would typically be restricted to areas outside of and facing the porous conductive layers 20.

Figure 5:
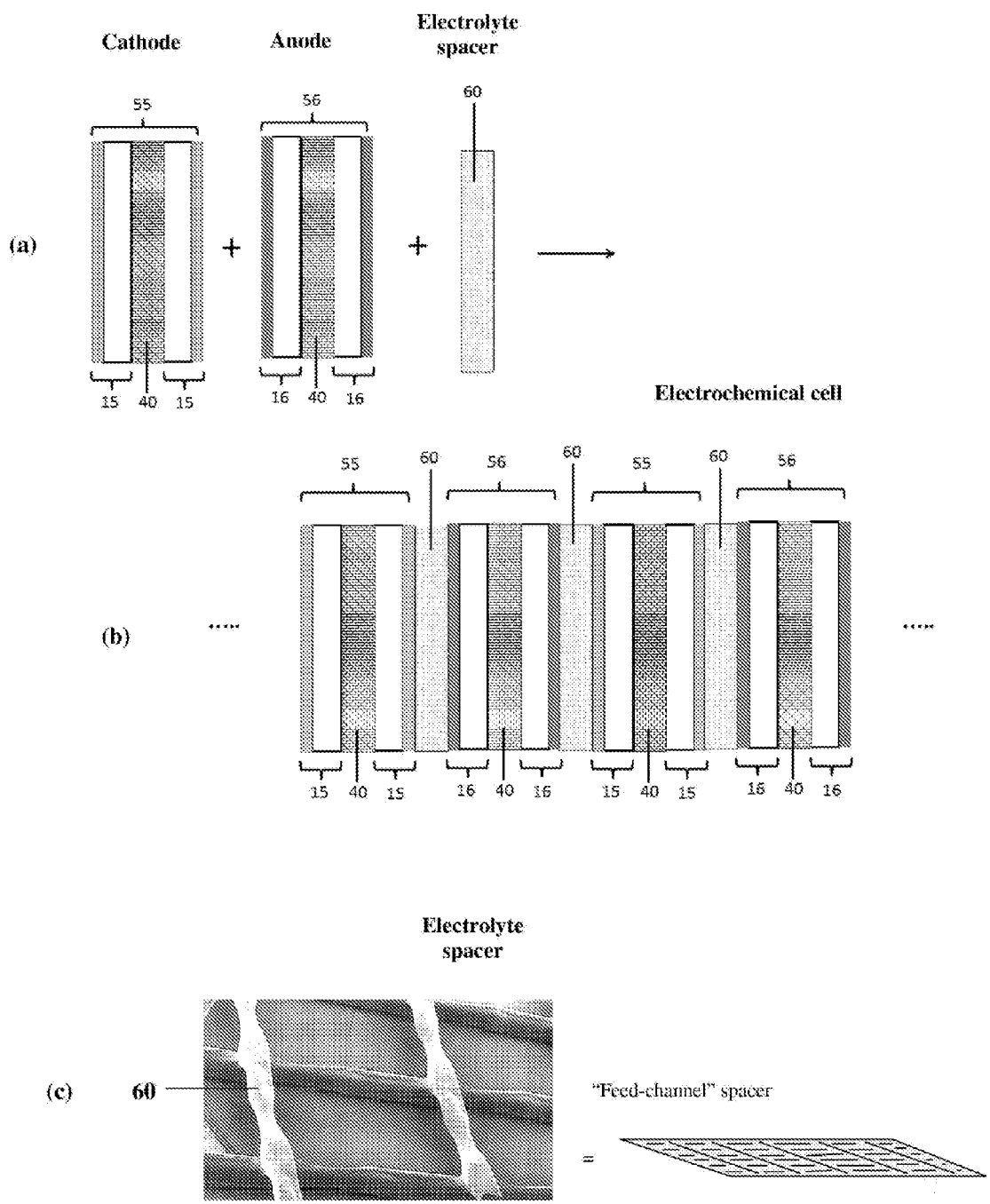
FIG. 5 schematically depicts the fabrication of an example multi-layer electrochemical cell. The scanning electron micrograph is of an example feed-channel spacer.

FIG. 5 shows how an anode 56 may, in one example, be generally combined with a cathode 55 and an electrolyte spacer or electrolyte spacer layer 60, to form a multi-layer electrochemical cell or reactor. The electrolyte spacer 60 can be, optionally, a plastic netting or mesh material. For example, the electrolyte spacer 60 can be a so-called "feed-channel" spacer of the type used in the reverse osmosis industry and sold by Delstar Inc. The photograph at the bottom of FIG. 5 depicts the structure of such an example electrolyte spacer 60.

To create an electrochemical cell or reactor, the anodes 56 and cathodes 55 can be stacked in alternating series with an electrolyte spacer 60 between each anode 56 and each cathode 55. The electrochemical cell may contain a single anode 56 and cathode 55 of substantial length. Alternatively, the cell may contain a plurality of anodes 56 and a plurality of cathodes 55 (as depicted in FIG. 5). The cell may also contain more anodes 56 than cathodes 55, or vice versa. The components in the cell assembly would typically, but not necessarily, be tightly pressed together, with no glue or other fasteners attaching them to one another. Instead, in this example, an outer casing would incorporate and hold together the whole cell assembly as a single reactor, unit or module.

Gases may typically permeate into or out of the electrochemical cell or device via the gas-channels created by the spacer 40 and the adjacent gas-permeable, liquid-impermeable layers 30 in each of the anodes and cathodes. The anode gas would typically be restricted to permeation into or out of the spacer 40 and the adjacent gas-permeable, liquid-impermeable layers 30 within the anode 56. The cathode gas would typically be restricted to permeation into or out of the spacer 40 and the adjacent gas-permeable, liquid-impermeable layers 30 in the cathode 55. The liquid electrolyte would typically or substantially be restricted to the volumes bounded by the electrolyte spacers 60, although noting a degree or level of ingress of the liquid electrolyte into the surface of the porous conductive materials or conductive layers can be desirable.

Figure 6:
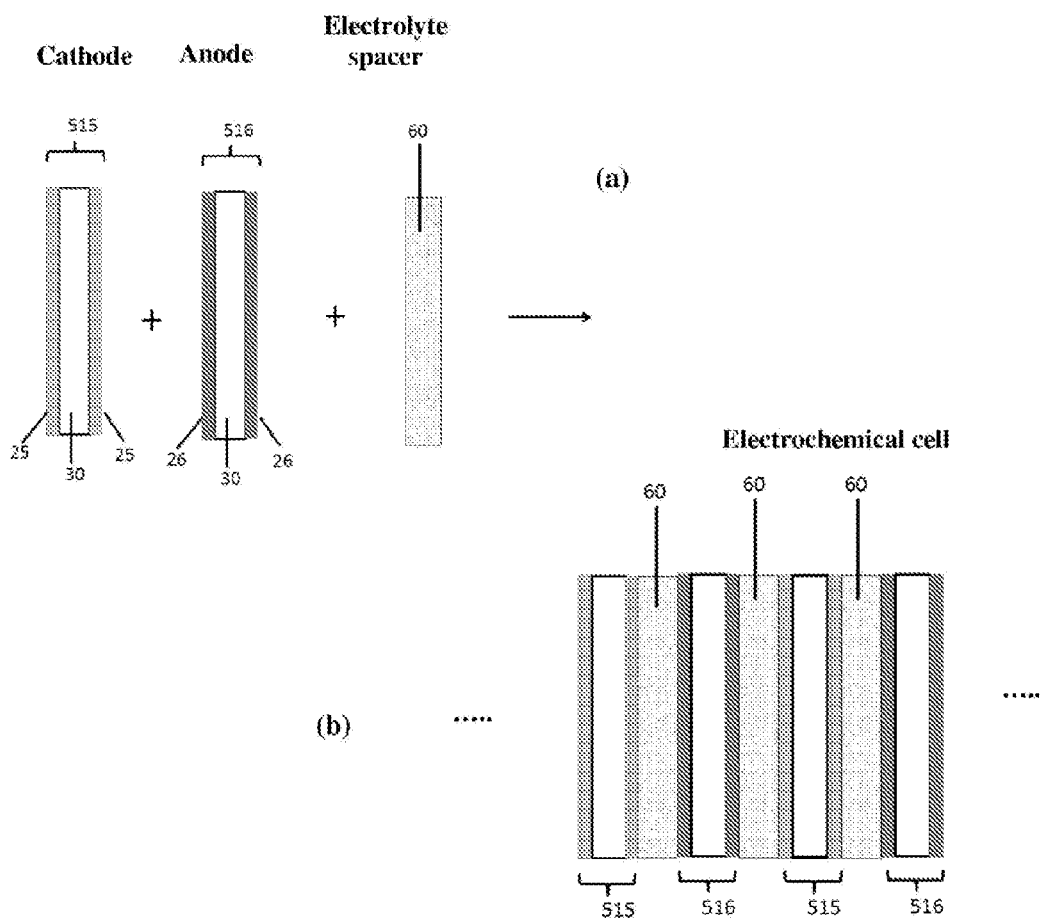
FIG. 6 schematically depicts the fabrication of an example multi-layer electrochemical cell.

FIG. 6 schematically depicts how an electrochemical cell of this type may be fabricated from a double-sided GDE 51, where the conductive layer has been selected to facilitate the reaction at either the cathode or the anode. When a cathodic conductive layer 25 is used, the overall two-sided electrode is a cathode 515. When an anodic conductive layer 26 is used, the overall two-sided electrode is an anode 516. This selection may involve the presence of an electrocatalyst in the anodic conductive layer 26 or the cathodic conductive layer 25. Or, it may involve a particular metal, or a particular alloy, or a particular combination of materials in the anodic conductive layer 26 or the cathodic conductive layer 25.

As shown in FIG. 6, to create an electrochemical cell, cathodes 515 and anodes 516 are combined with an electrolyte spacer or spacer layer 60 in stacks of alternating cathodes 515 and anodes 516, separated by electrolyte spacers or spacer layers 60. The electrochemical cell may contain a single anode 516 and cathode 515 of substantial length. Alternatively, the cell may contain a plurality of anodes 516 and a plurality of cathodes 515 (as depicted in FIG. 6). The cell may also contain more anodes 516 than cathodes 515, or vice versa. The components in the assembly would typically, but not necessarily, be tightly pressed together, with no glue or other fasteners attaching them to one another. Instead, in this example, an outer casing would incorporate and hold together the whole cell assembly as a single reactor, unit or module.

Gases may typically permeate into or out of the electrochemical cell or device in FIG. 6 via the gas-channels created by the gas-permeable, liquid-impermeable layers 30 in each of the anodes and cathodes. The anode gas would typically be restricted to permeation into or out of the gas-permeable, liquid-impermeable layer 30 within the anode 516. The cathode gas would typically be restricted to permeation into or out of the gas-permeable, liquid-impermeable layer 30 in the cathode 515. The liquid electrolyte would typically or substantially be restricted to the volumes bounded by the electrolyte spacers 60, although noting a degree or level of ingress of the liquid electrolyte into the surface of the porous conductive materials or conductive layers can be desirable.

Electrochemical cells of the above types may be fabricated into several reactor designs, including but not limited to: (i) "flat-sheet" configuration, (ii) "spiral-wound" configuration, and (iii) "hollow-fibre" configuration. Example design aspects or features and some fabrication options are provided in the following examples.

In another aspect, the gas-permeable and substantially electrolyte-impermeable non-conductive region (e.g. the one or more gas permeable layers formed from a gas permeable material) within the gas diffusion electrode, may comprise of two membranes separated by a porous spacer material positioned between them. In this embodiment, the two membranes and spacer or spacer layer collectively define a gas collection layer. More than two gas permeable layers can be used if desired. For example, the two gas-permeable and substantially electrolyte-impermeable non-conductive layers and the spacer or spacer layer may be or include in part PTFE membranes having average pore size 0.2 μm and a measured wetting pressure of about 3.4 bar, and may also optionally involve the use of a backing material. Preferably, but not exclusively, the spacer or spacer layer is flexible and a non-conductive polymer of the type used as a "permeate carrier" in the reverse osmosis industry. For example, the spacer or spacer layer may be a polyolefin mesh, a reverse-osmosis permeate carrier of the type manufactured by Hornwood Inc. or may be a polypropylene mesh of the type manufactured by Delstar. Such spacers or spacer layers are designed to maintain the structure and utility of the gas collection layer even in the face of high or extremely high applied liquid pressures (for example, up to 70 bar or higher). Alternatively, embossed polymer structures or other classes of spacer or spacer layer, may be employed as a gas diffusion spacer or spacer layer in the gas collection layer, which is the gas channel.

Example 2

Fabrication of a Simple, Single Layered, Hydrogen-Oxygen Fuel Cell

GDEs of the present embodiments may be used as the cathode and anode in a fuel cell, where oxygen gas is introduced through the gas diffusion electrode and hydrogen gas is introduced through a second gas diffusion electrode.

Figure 7:
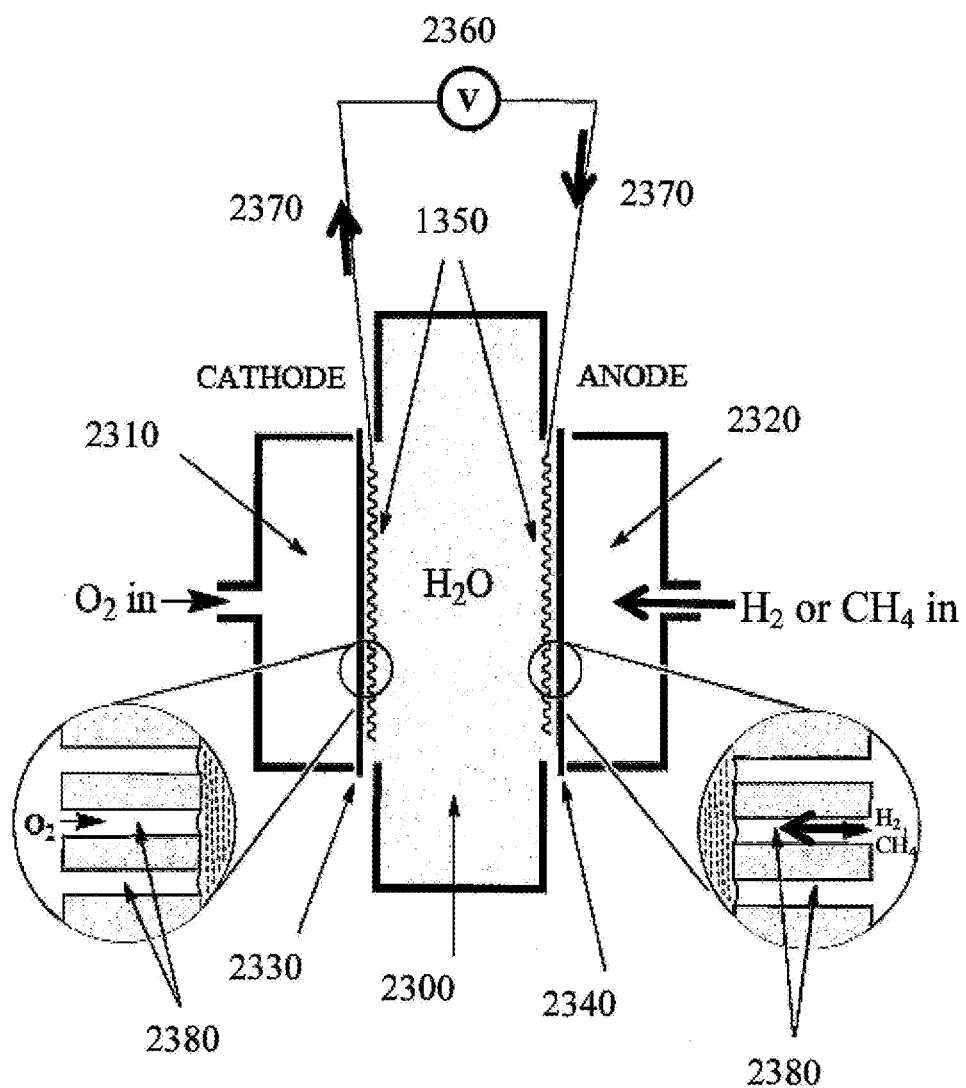
FIG. 7 schematically depicts components of a simple example hydrogen-oxygen or methane-oxygen fuel cell.

FIG. 7 depicts a simple cell construction for such an embodiment (as an alkaline fuel cell). The cell in FIG. 7 includes the following parts: a central water reservoir 2300 (containing aq. 1-6 M KOH), which has a water-free oxygen entry chamber 2310 (i.e. gas region) on the left side and a water-free hydrogen entry chamber 2320 (i.e. gas region) on the right side. Between the water reservoir 2300 and the oxygen entry chamber 2310 is the cathode GDE electrode 2330 (using an example as described above). Between the water reservoir 2300 and the hydrogen entry chamber 2320 is the anode electrode 2340. On or close to the surface of the breathable electrodes 2330 and 2340 is a conductive layer containing a suitable catalyst 2350. Suitable reactions cause electrical power output 2360 arising from flow of electrons in the outer circuit 2370.

In such an application it is generally not necessary to use pure oxygen or compressed air, as is normally the case. Instead, atmospheric oxygen at normal air pressure may be used in the oxygen gas chamber 2310 on the left side. Hydrogen must be simultaneously introduced into the gas chamber 2320 on the right side, with the result that an electrical current is generated, according to the half-reactions below:

With water-generating catalysts (basic conditions):

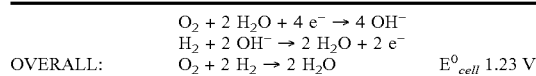

OR:
With water-generating catalysts (acidic conditions):

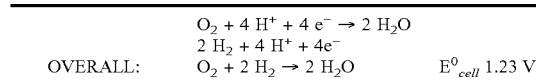

Note that such a fuel cell is, in effect, a "doubly gas depolarized" electrochemical cell. It is in principle, similar to a Proton-Exchange Membrane (PEM) fuel cell, except that the proton-exchange membrane, which is normally located between the electrodes, is replaced by a small water reservoir 2300. Water formed in the above reactions moves directly into the water reservoir 2300, thereby avoiding any possibility of flooding the gas diffusion layer and thereby maintaining a very clear and well-defined solid-liquid-gas boundary in the 3D electrodes. Protons are readily able to migrate between the electrodes through the water between the electrodes. This arrangement also eliminates the need to humidify the feed gases, which is a substantial extra cost in PEM fuel cells. Humidification of the feed gases is needed in PEM fuel cells in order to maintain the moisture content of the PEM, which ensures good proton conductivity between the electrodes.

The cathode and anode GDEs were fabricated as follows: an expanded PTFE (ePTFE) membrane (manufactured by General Electric Company; pore size 0.2 micron) was vacuum-(sputter-) deposited with a thin layer of platinum (Pt) using the vacuum-/sputter-coating techniques described in the Applicant's concurrently filed PCT patent application "Composite Three-Dimensional Electrodes and Methods of Fabrication" filed on 30 Jul. 2014, which is incorporated herein by reference. The Pt coating layer thickness on each electrode was found to optimally be about 100 nm. The resulting GDEs were combined as anode and cathode in an electrochemical cell, which was charged with a 6 M KOH solution. Pure hydrogen gas was allowed to flow through the anode gas chamber and oxygen or air through the cathode gas chamber at 1 bar. There was no ion exchange membrane between the cathode and anode in the cell.

Figure 8:
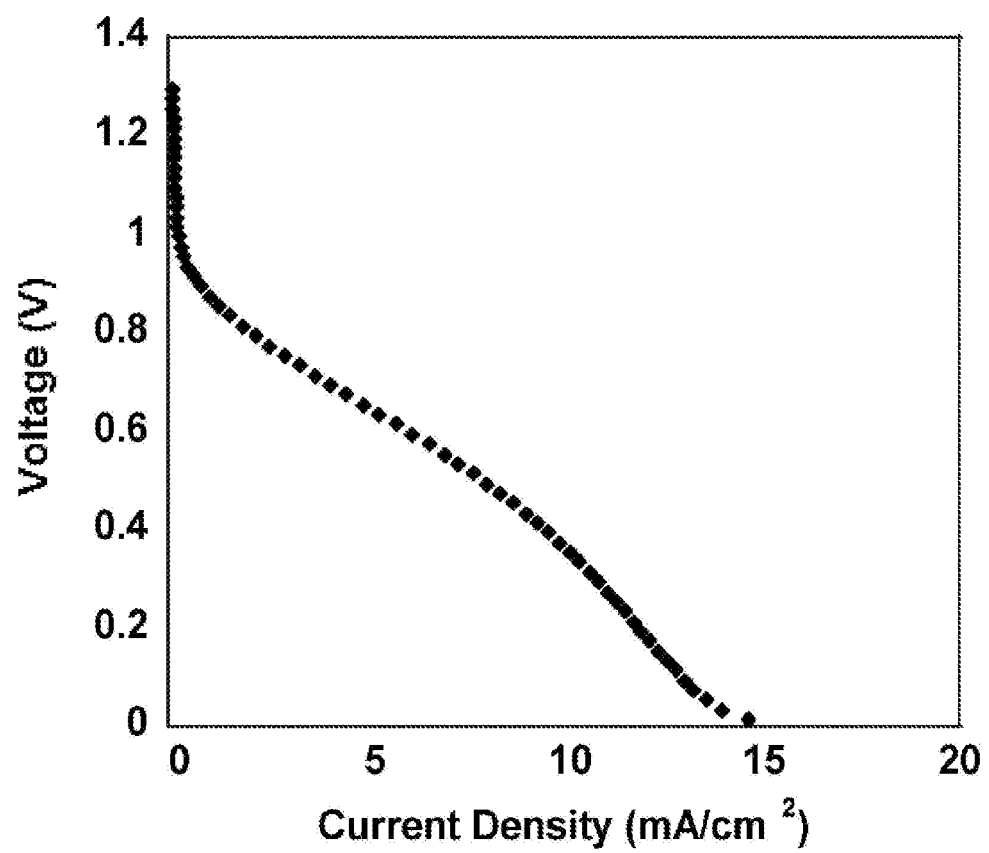
FIG. 8 depicts a polarisation curve of a simple example hydrogen-oxygen fuel cell.

In order to be practically and economically viable in small-scale, "on-site" modular cells of the type described later in this specification, the abovementioned ePTFE anode and cathode combination should achieve a minimum current density of about 10 mA/cm$^2$. Experiments showed that, with a 1 cm gap between them, the Pt-coated ePTFE electrodes achieved a steady current of 10 mA/cm$^2$ whilst generating a voltage of 0.4 V at 25° C. FIG. 8 depicts the polarization curve obtained. As can be seen, it is characteristic of classical fuel cell behaviour.

Considering that current day commercial PEM fuel cells achieve about 0.5-0.6 V at 70-80° C. with about 6 bar pressure applied, the data in FIG. 8 at 25° C., is notable. Relatively speaking, it demonstrates high electrical efficiency. Moreover, the fuel cell in FIG. 8 does not require humidified gases, nor an expensive PEM membrane, nor compressed air. It is, furthermore, not prone to flooding and is manufactured from ePTFE membranes that are inexpensively available from the water treatment industry.

Example 3

Illustrative Example of a Flat-Sheet Reactor—Fabrication of a Multi-Layered Hydrogen-Oxygen Fuel Cell "Stack"

Figure 9:
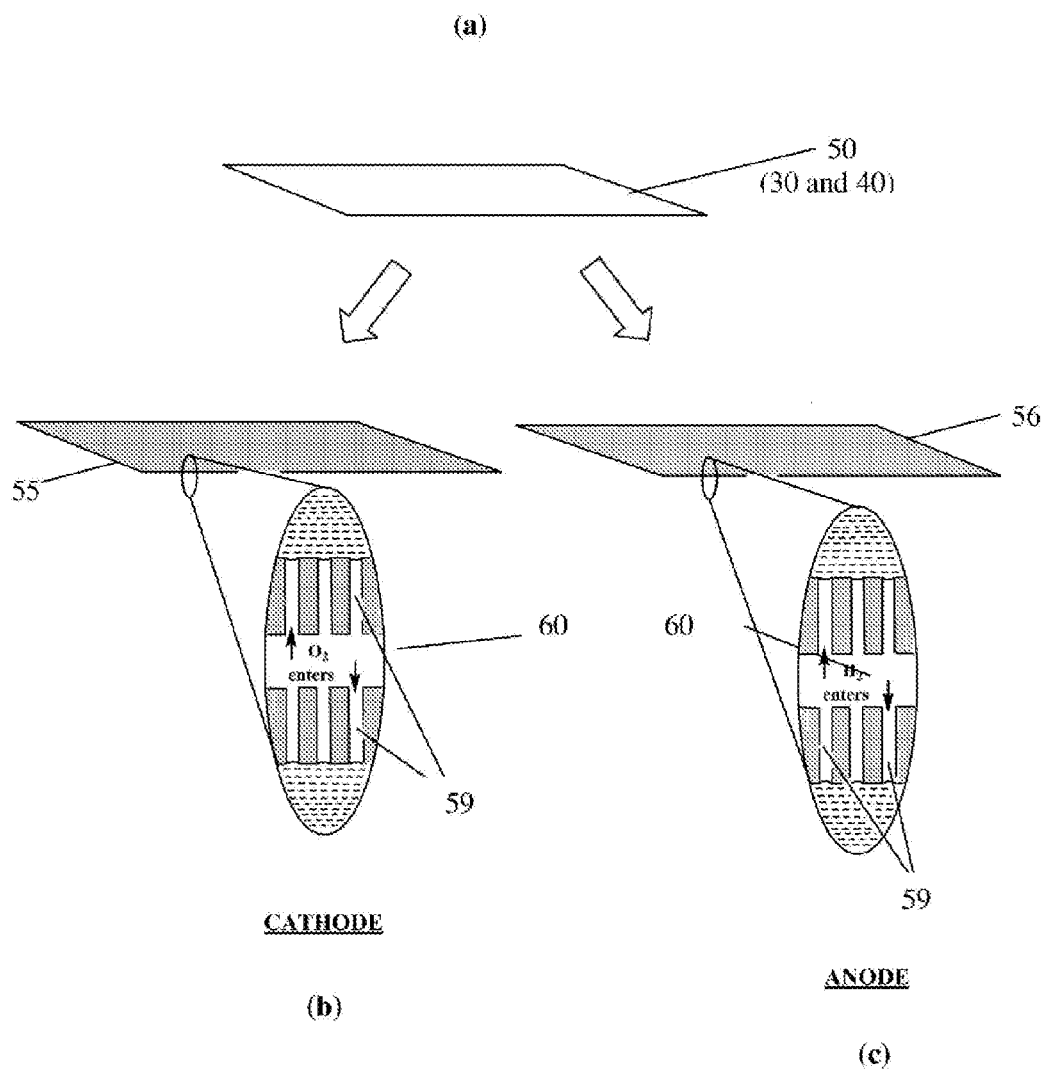
FIG. 9 schematically illustrates the anode and cathode components that may be used in an example hydrogen-oxygen fuel cell.

FIG. 9 depicts in schematic form, a double-sided, flat-sheet GDE 50. The GDE 50 comprises of an upper and a lower gas-permeable, electrolyte-impermeable hydrophobic material 30 with a porous gas-channel spacer 40 positioned between them. The gas-permeable, electrolyte-impermeable material 30 can be an expanded PTFE membrane having average pore size 0.2 μm and a wetting pressure of about 3.4 bar. The gas-channel spacer 40, can be a permeate carrier of the type used in the reverse osmosis industry and manufactured by Hornwood Inc.

The GDEs would typically be coated or laminated with a metallic conductor, to which would typically be affixed a catalyst. Alternatively, the metallic conductor would itself be a suitable catalyst. The catalyst and conductor combination would typically be either suitable for efficient electrocatalysis of hydrogen oxidation, in which case the GDE 50 would be an anode 56 within the fuel cell, or the GDE 50 would be suitable for efficient electrocatalysis of oxygen reduction, in which case it would be a cathode 55 within the fuel cell. A hydrophobic sheet membrane, which can have a built-in spacer, is coated or laminated with a conductor material and preferably an oxygen reducing catalyst (preferably on both sides) to form cathode 55. Another hydrophobic sheet membrane, which can have a built-in spacer, is coated or laminated with a conductor material and preferably a hydrogen oxidising catalyst (preferably on both sides) to form anode 56.

In an alkaline fuel cell the electrolyte would typically be an aqueous solution of KOH. The conductor and electrocatalyst for hydrogen oxidation (on anode 56) would typically be nickel metal. The conductor and catalyst for oxygen reduction (on cathode 55) would typically be a metal oxide, such as cobalt oxide or manganese oxide, on a stainless steel or nickel conductor.

Being an expanded PTFE membrane, the gas permeable material contains hydrophobic pores which permit gases, but not liquid water to pass through them unless sufficient pressure (>3.4 bar in the case of the above example membrane) is applied and/or the water surface tension is sufficiently lowered. The lower images in FIG. 9 show schematic cross-sections of the double-sided cathode 55 and anode 56, depicting the hydrophobic pores 59 in contact with the liquid electrolyte above and below the electrodes (the porous conductive materials or conductive layers are not illustrated for clarity, the liquid electrolyte can be within the porous conductive materials or conductive layers). The volume between the membranes is occupied by a porous gas-channel spacer 60 (not physically depicted in FIG. 9 for clarity), which can be of the type illustrated in FIG. 3(*a*) and manufactured by Hornwood Inc. as a permeate carrier in the reverse osmosis industry, although it should be appreciated that a variety of other example materials could be suitable.

Figure 3:
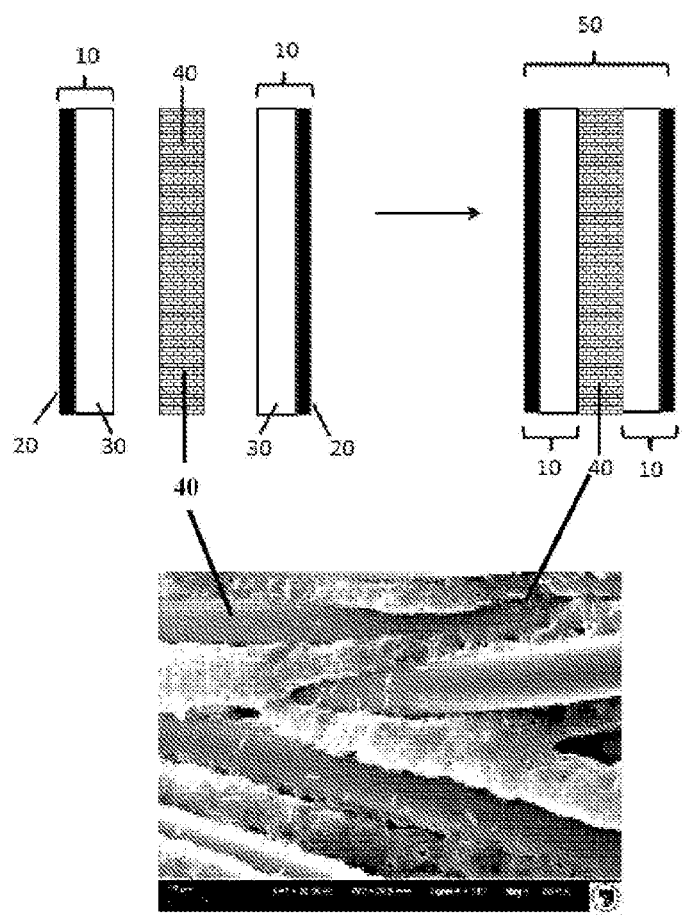
FIG. 3(a) schematically depicts a fabrication example for example GDEs. The scanning electron micrograph is of an example gas-channel spacer (a "permeate" carrier).
FIG. 3(b) schematically depicts a second example embodiment of a GDE.
Figure 3:
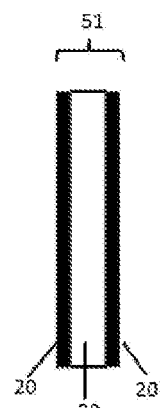

To construct a flat-sheet hydrogen-oxygen fuel cell "stack", one starts with the membrane or membrane layers 50 (which can be layers 30 sandwiching 40 from FIG. 3(*a*)) as shown in FIG. 9. Upon the outer surfaces of this assembly a conductive layer, such as conductive layer 20, is then deposited, typically using vacuum metallization. In the case of an alkaline fuel cell, the conductive layer is typically nickel (Ni). Using this technique, Ni layers of 20-50 nm may be deposited. The Ni-coated membranes may then be subjected to dip-coating using, for example, electroless nickel plating, to thicken the conducting Ni layer on their surface. After this, a mixture of cobalt oxide catalyst containing 5% of a binder such as Naftion™, is deposited upon the conducting Ni surface to create the cathode 55. The nickel coated GDE is used, as is, for the anode 56.

Figure 10:
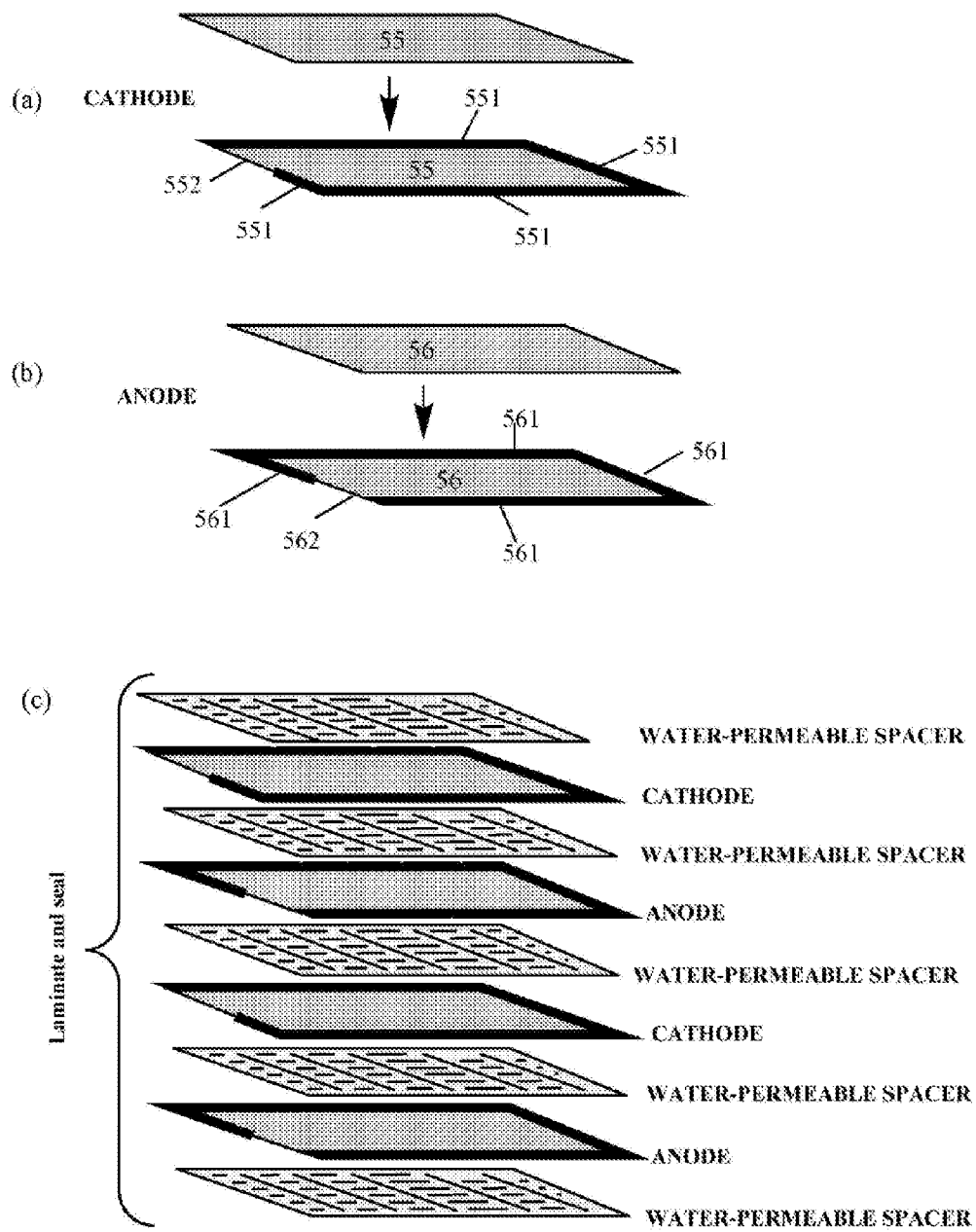
FIG. 10 schematically illustrates an example of how the anode and cathode components may be sealed and then stacked for fabrication of an example flat-sheet hydrogen-oxygen fuel cell.

The edges of the anode 56 and cathode 55 must then be sealed in order to hold the gases within and prevent electrolyte leaking into the gas channels via the edges of the membranes. There are various ways in which this may be done. FIG. 10 illustrates one option. The cathode 55 is sealed 551 at three of the four edges, with the fourth edge half sealed 551 and half left unsealed 552 as shown. FIG. 10(*a*) schematically depicts how the cathode is sealed. The anode 56 is sealed 561 at three of the four edges, with the fourth edge half sealed 561 and half left unsealed 562 as shown. FIG. 10(*b*) schematically depicts how the anode is sealed. The sealing may be carried out by heating and melting the edges of the hollow flat-sheets under pressure using, for example, an ultrasonic welder. Laser heating may also be used to seal the edges of the cathode. The sealing depicted in FIGS. 10(*a*) and 10(*b*) may be carried out before the deposition of the conductors and catalysts, or after, if this is more suitable. As shown in FIG. 10(*c*), the anodes and cathodes are then stacked with intervening feed-channel spacers of the type depicted in FIG. 5. Note that the unsealed edges of the anodes all line up with each other along the back left edge, whereas the unsealed edges of the cathodes line up with each other along the front left edge. Note that the unsealed edges of the anodes and cathodes do not overlap each other.

Figure 11:
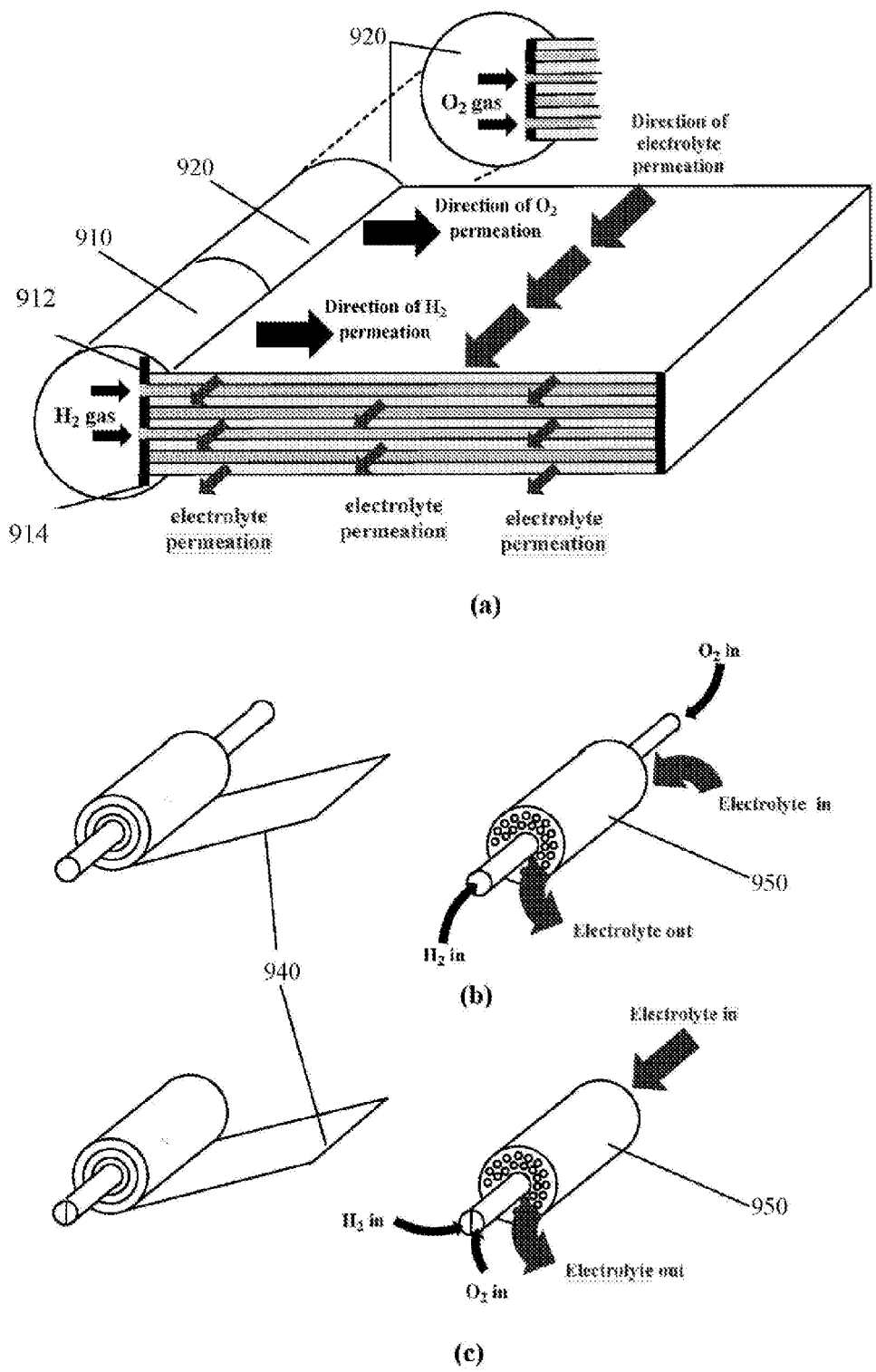
FIG. 11 schematically illustrates an example of how the stacked anode and cathode components in FIG. 10 may be combined to fabricate an example spiral-wound hydrogen-oxygen fuel cell.

FIG. 11(*a*) depicts how the assembly in FIG. 10(*c*) may be turned into a fuel cell. A hollow tube (typically comprising of an electrically insulating polymer) is attached to the assembly in FIG. 10(*c*) as shown in FIG. 11(*a*). The tube is segregated into a forward chamber 910 and a rear chamber 920 which are not connected to each other. The anodes and cathode are attached to the tube in such a way that their unsealed edges open into the internal chambers of the tube. Electrical connection 912 provides a negative pole, and electrical connection 914 provides a positive pole.

Figure 12:
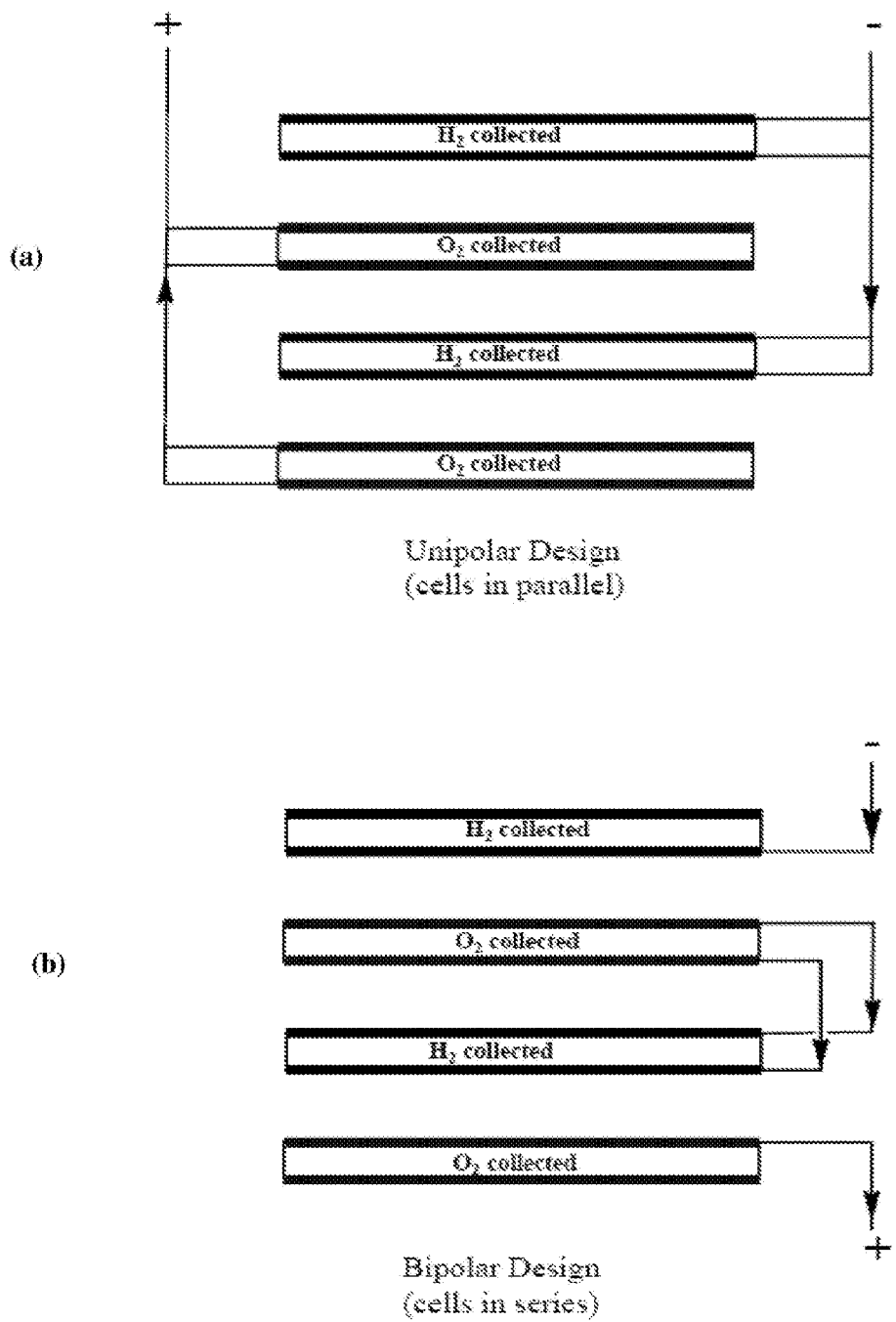
FIG. 12 schematically illustrates an example of how the stacked anode and cathode components in FIGS. 10 and 11 may be electrically connected in flat-sheet and spiral-wound embodiments of an example hydrogen-oxygen fuel cell.

The unsealed edges of the cathode open exclusively into the rear chamber of the tube 920, while the unsealed edges of the anode open exclusively into the forward chamber of the tube 910. The anodes and cathodes may be electrically connected in series (bipolar design) or parallel (unipolar design), with a single external electrical connection for the positive pole and another single external electrical connection for the negative pole (as shown in FIG. 11(*a*)). FIG. 12 depicts possible, non-limiting connection pathways for a unipolar design and a bipolar design. Other connection pathways are possible, incorporating combinations of series and parallel arrangements.

For the purposes of the current example, we will consider that the series arrangement shown at the bottom of FIG. 12 is present. The schematic in FIG. 11(*a*) illustrates a "flat-sheet" design for a hydrogen-oxygen fuel cell stack. During operation of the fuel cell, electrolyte is allowed to permeate through the flow-channel spacers in the direction (out of the page) shown in FIG. (11(*a*)). Thus, during operation, aqueous electrolyte is present at and fills the space between the anodes and cathodes which is otherwise unoccupied by the feed-channel spacers 40.

When hydrogen gas is now introduced into the anodes via pipe 910, and oxygen is introduced into the cathodes via pipe 920, then these gases permeate along their respective gas-channel spacers 60 throughout the length of each of the electrodes. As shown in the schematic cross-sections at the bottom of FIG. 9, the gases go through the hydrophobic pores of their respective membranes and form a three-way, solid-liquid-gas interface at the conductor-catalyst layers on the outer surface of each of the cathode 55 and anode 56.

In so doing, a voltage is created between the anodes and cathodes in accordance with the half-reactions (for an alkaline fuel cell):

| At the anode: | $H_2 + 2\ OH^- \rightarrow 2H_2O + 2e^-$ | $E^0_{ox} = 0.83$ V |
|---|---|---|
| At the cathode: | $O_2 + 2H_2O + 4e^- \rightarrow 4\ OH^-$ | $E^0_{red} = 0.40$ V |
| Overall reaction: | $2\ H_2 + O_2 \rightarrow 2\ H_2O$ | $E^0_{cell} = 1.23$ V |

Note that the overall cell voltage is positive, meaning that a voltage is created. Further note that these reactions consume oxygen and hydrogen and generate water at the three-way liquid-solid-gas interfaces at each electrode. Unlike other types of fuel cell, the water directly enters the liquid electrolyte phase and thereby increases the volume of liquid electrolyte present. To cater for this increase in volume, a tank must be available to accept the added volume of water and thereby avoid a build-up of pressure in the liquid phase. Tanks must also be available to supply the hydrogen and oxygen gases.

Whereas the level of the water tank will increase during operation of the fuel cell, the level of gases in the gas tanks will decline during operation. As will be apparent to the person skilled in the art, it is also possible to use the same approaches to fabricate an equivalent spiral-wound design using double-sided membrane GDEs 51 in FIG. 3. Such GDEs may be combined as anodes 516 and cathodes 515 with an electrolyte spacer 60 (as shown in FIG. 6), and using the approaches discussed in this example (and illustrated in FIGS. 10 and 11) to provide for the plumbing of the various components.

Example 4

Illustrative Example of a Spiral-Wound Reactor—Fabrication of a Hydrogen-Oxygen Fuel Cell To minimise the overall footprint of the fuel cell, the multi-layered arrangement of flat-sheet membranes depicted in FIG. 11(*a*), may be rolled up into a spiral-wound arrangement 940 (as shown in FIG. 11(*b*)). The spiral-wound arrangement 940 may then be encased in a polymer casing 950, which holds the spiral-wound element in place within the casing or module 950 whilst nevertheless allowing for electrolyte to transit through the module 950 as shown in FIG. 11(*b*). When hydrogen and oxygen gas is introduced into such a module, a voltage is created in accordance with the above reactions.

An alternative arrangement is depicted in FIG. 11(*c*). In this arrangement, the collection tube is not segmented into a forward and a rear gas chamber. Rather the tube is segmented down its length into two separate chambers. The flat-sheet anodes and cathodes are attached to the tube in such a way that the unsealed edges of the anodes empty into one of these chamber and the unsealed edges of the cathodes empty into the other of these chambers. Then, when spiral-wound arrangement 940 as shown in FIG. 9(*c*), is modularised by encasing the arrangement in a polymer case or module 950, the module 950 allows for electrolyte to transit through as shown in FIG. 11(*c*). When hydrogen and oxygen gas is introduced into such a module, a voltage is created in accordance with the above reactions.

Fuel cell modules of the type depicted in 950 typically display a high internal surface area but a relatively small overall footprint. As such, they can be operated at relatively low overall current densities. A typical current density would be 10 mA/cm$^2$, which is at least an order of magnitude smaller than the current densities currently employed in most commercial fuel cells. At so low a current density, it is possible to operate with near to or greater than 90% energy efficiency.

As will be apparent to the person skilled in the art, it is also possible to use the same approaches to fabricate an equivalent spiral-wound design using double-sided membrane GDEs 51 in FIG. 3. Such GDEs may be combined as anodes 516 and cathodes 515 with an electrolyte spacer 60 (as shown in FIG. 6), and using the approaches discussed in this example (and illustrated in FIGS. 10 and 11) to provide for the plumbing of the various components.

Example 5

Figure 13:
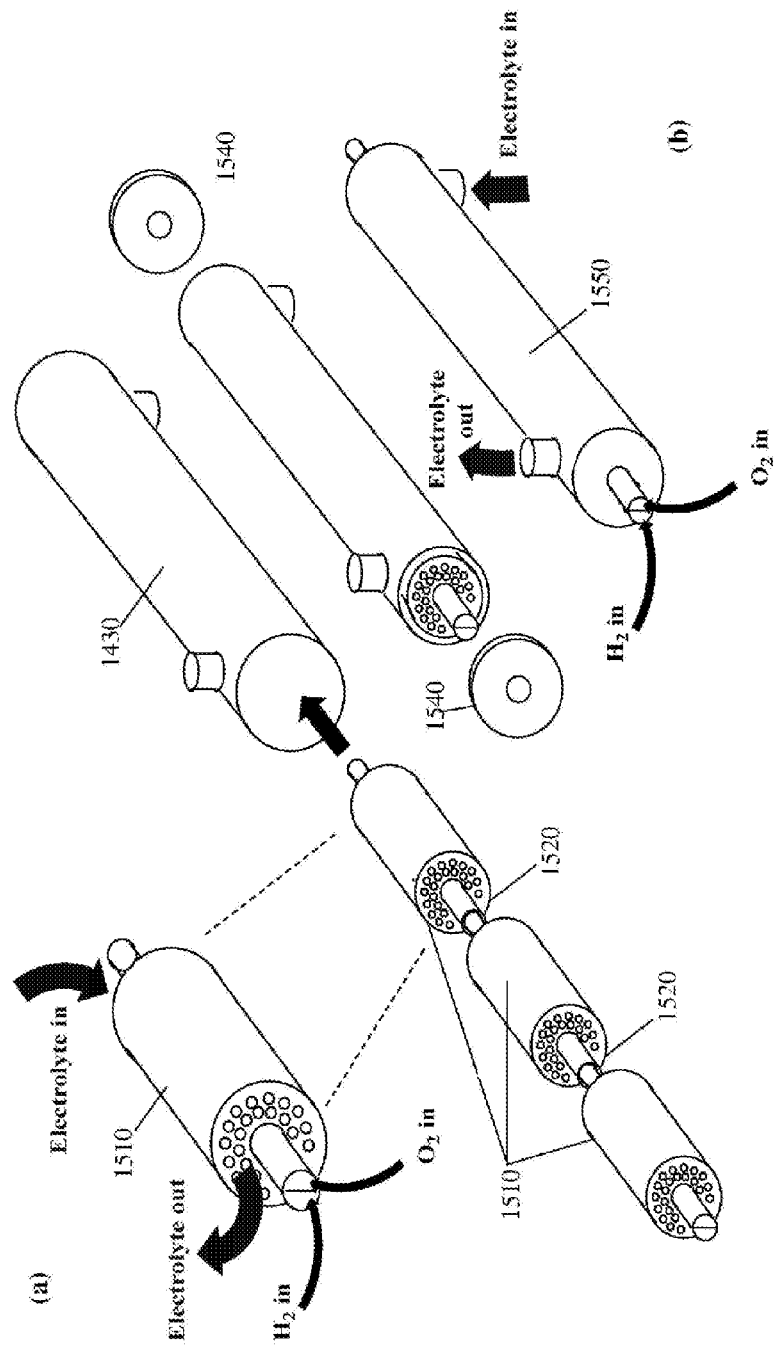
FIG. 13 schematically illustrates an example of how spiral-wound modules of a hydrogen-oxygen fuel cell may be combined into an example fuel cell reactor or plant.
Figure 14:
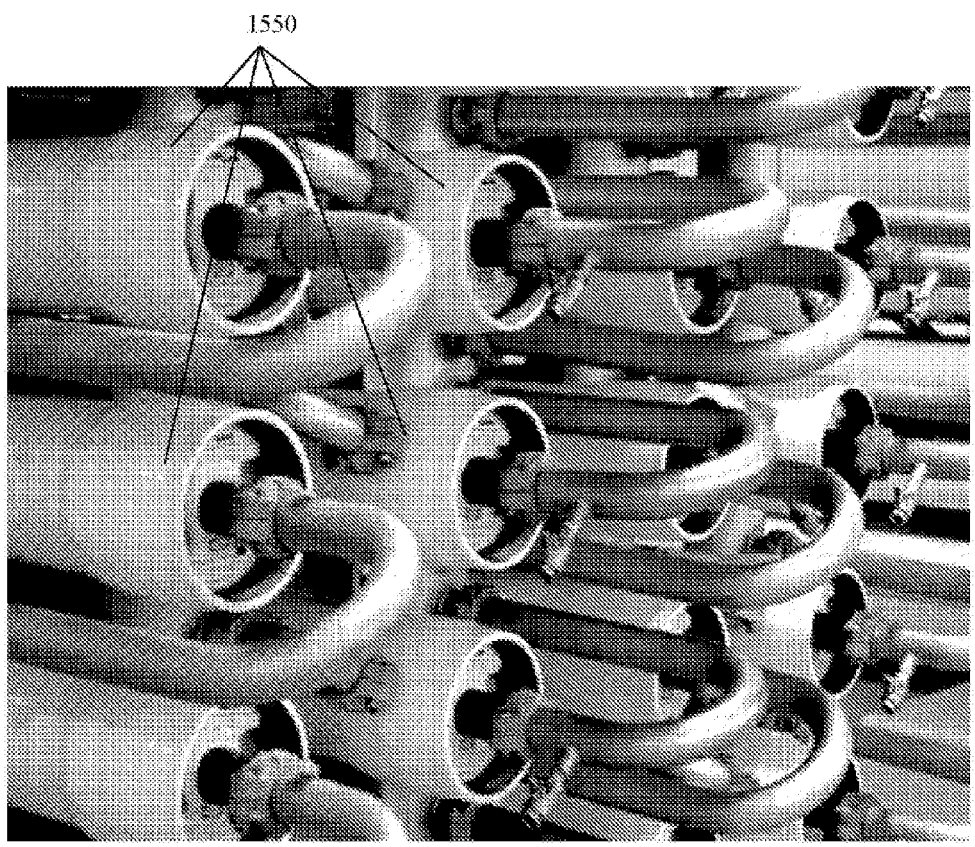
FIG. 14 illustrates comparable housings in a plant-type arrangement or configuration.

Assembling Spiral-Wound Fuel Cell Modules into Larger-Scale Fuel Cell Reactors or Plants FIG. 13 depicts schematically how example electrochemical or fuel cell modules may be assembled into larger reactors or units. For illustrative purposes, three modules 1510 (of the same type of module 950 in FIG. 11(*c*)) are attached to each other via robust "quick-fit" fittings 1520, that correctly connect the separate hydrogen and oxygen gas channels together in a secure way. Any number of modules 1510 can be combined in this manner. The combined modules are then pushed into a thick metal tube 1430 which is sealed with a thick metal cover plate 1540 at each end. The cover plates 1540 allow for the transportation of electrolyte through the tube and permit the gas inlets to protrude outside of the tube. Electrolyte is then passed through the sealed tube 1550, while the gases are introduced as shown in FIG. 13. A voltage is thereby created from the combined fuel cell modules. The voltage and current will depend on the way in which the electrodes have been connected in each module, as well as the number of modules present. The tube 1550 acts as a second containment vessel for the hydrogen and oxygen that is introduced and thereby carries out a safety function for the fuel cell. In such a reactor or plant, multiple tubes can be used to combine or connect modules as shown in FIG. 14.

As will be apparent to persons skilled in the art, all of the characteristics described in this example may also be realised by the use of spiral-wound devices utilizing double-sided membrane GDEs 51 from FIG. 3. Such GDEs may be fabricated by combining anodes 516 and cathodes 515 with an electrolyte spacer 60 (as shown in FIG. 6), and using the approaches discussed in Examples 3 and 4 (and illustrated in FIGS. 10 and 11) to provide plumbing for the various components.

Example 6

Illustrative Example—Reversible Flat-Sheet and Spiral-Wound Fuel Cell-Electrolyzers The flat-sheet and spiral-wound fuel cells described in the previous examples and depicted in FIGS. 11 and 13, may be designed to also operate in the reverse direction as water electrolyzers if suitable electrocatalysts are used at each electrode. The inventors have found that the catalysts and conductors described above are capable of facilitating both the forward reaction (during operation as a fuel cell) and the reverse reaction (during operation as a water electrolyser).

During the reverse reaction (i.e. during operation as a water electrolyser), the half reactions are:

At the electrodes designated as anodes in FIGS. 9-11 (although they will now be cathodes):

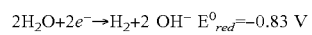

$2H_2O + 2e^- \rightarrow H_2 + 2\ OH^-\quad E^0_{red} = -0.83\ V$

At the electrodes designated as cathodes in FIGS. 9-11 (although they will now be anodes):

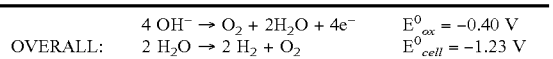

| | | |
|---|---|---|
| | $4\ OH^- \rightarrow O_2 + 2H_2O + 4e^-$ | $E^0_{ox} = -0.40\ V$ |
| OVERALL: | $2\ H_2O \rightarrow 2\ H_2 + O_2$ | $E^0_{cell} = -1.23\ V$ |

Note that the overall cell voltage is negative, meaning that an external voltage must be applied to drive the reaction. Further note that these reactions consume water and produce hydrogen and oxygen at the three-way liquid-solid-gas interfaces at each electrode. The produced hydrogen and oxygen gases permeate in precisely the opposite directions to that shown in FIGS. 9-11. To avoid a pressure build-up in the gas phases, a hydrogen tank and an oxygen tank must be available to accept the newly created volumes of gas. A separate tank must similarly be available to feed fresh water into the cell, since water in the electrolyte is consumed during operation.

Whereas the level of the water tank will decrease during reverse operation (as a water electrolyser), the level of gases in the gas tanks will increase during this operation. This is the exact opposite of the situation that pertains when the device operates as a fuel cell. In that case, the level of the water in the water tank increases during operation while the level of gases in the gas tanks decline.

Thus, by simply regulating the voltage, from negative to positive and back, spiral-wound or flat-sheet modules of this type may be induced to either:

(1) Consume hydrogen and oxygen (from hydrogen and oxygen tanks) and produce water (into a water tank), to thereby generate electricity; or (2) Produce hydrogen and oxygen (into hydrogen and oxygen tanks) and consume water (from a water tank), to thereby consume electricity.

Thus, a device of this type may act as a means of storing electrical energy for later regeneration. For example, low-cost, off-peak electricity may be used to generate hydrogen and oxygen and consume water. Then, at a later time, during peak electrical pricing, hydrogen and oxygen may be consumed to generate electricity. The resulting arbitrage in the differential pricing of electricity may offer a compelling commercial proposition. Because such modules have a high internal surface area but a relatively small overall footprint, they can be operated at relatively low overall current densities.

A typical current density would be 10 mA/cm$^2$, which is at least an order of magnitude smaller than the current densities currently employed in most commercial fuel cells. At so low a current density, it is possible to operate with near to or greater than 90% energy efficiency.

The theoretical minimum electrical energy created by the consumption of 1 kg of hydrogen in a fuel cell is 33 kWh (according to the "Lower Heating Value", or LHV). A fuel cell operating at 90% electrical efficiency will therefore generate 33×0.9=29.7 kWh of electricity. By contrast, the theoretical minimum electrical energy required to produce 1 kg of hydrogen is 39 kWh (according to the "Higher Heating Value", or HHV) An electrolyzer operating at 90% electrical efficiency will therefore consume 39/0.9=43.3 kWh of electricity.

Thus, a device of the above type that operates with 90% electrical efficiency in each direction will achieve a "round-trip" efficiency of: 29.7/43.3×100=68.6%. This means that 68.6% of the electricity consumed during the off-peak time will be regenerated during the peak time. This result compares well with other techniques for storing electricity, such as "pumped hydro", which generally displays a "round-trip" energy efficiency of 65-75%.

As will be apparent to persons skilled in the art, all of the characteristics described in this example may also be realised by the use of spiral-wound devices utilizing double-sided membrane GDEs 51 in FIG. 3. Such GDEs may be fabricated by combining anodes 516 and cathodes 515 with an electrolyte spacer 60 (as shown in FIG. 6), and using the approaches discussed in the examples (and illustrated in FIGS. 10 and 11) to provide plumbing for the various components.

Other Electrochemical Processes

The reactor architectures described above for the case of water-formation (H$_2$/O$_2$ fuel cell) or water-splitting (water electrolyser), may be adapted to facilitate a variety of other electrochemical reactions, some of which cannot be facilitated in any other known way. These include:

(i) fuel cells of other types (for example, direct methanol fuel cells, other alkaliane and acid fuel cells, and the like);

(ii) electrolyzers of other types (for example, electrolyzers that generate chlorine gas from NaCl or HCl solutions);

(iii) electrochemical processes and devices which involve elements of a fuel cell or electrolyser, but cannot be considered to be fuel cells or electrolyzers per se.

The following sections provide non-limiting examples of such applications.

Example 7

Illustrative Example of Another Class of Fuel Cell—Fabrication of a Room-Temperature, Direct Methane Fuel Cell As noted previously, GDEs of the present embodiments may allow the construction of reactors that facilitate hitherto unknown electrochemical reactions. An example of that is the construction of a direct methane fuel cell that operates at room temperature using GDEs of the present embodiments as the cathode and anode in the fuel cell, where oxygen gas is introduced through the gas diffusion electrode and methane gas is introduced through a second gas diffusion electrode.

Referring again to FIG. 7 by way of illustrative example, in this alternative embodiment FIG. 7 is used to depict a simple cell construction for such an embodiment. In this example the cell in FIG. 7 includes the following parts: a central water reservoir 2300 (containing aq. 1-4 M H$_2$SO$_4$), which has a water-free oxygen entry chamber 2310 (i.e. gas region) on the left side and a water-free methane entry chamber 2320 (i.e. gas region) on the right side. Between the water reservoir 2300 and the oxygen entry chamber 2310 is the cathode GDE electrode 2330. Between the water reservoir 2300 and the methane entry chamber 2320 is the anode electrode 2340. On or close to the surface of the breathable electrodes 2330 and 2340 is a conductive layer containing a suitable catalyst 2350.

In such an application it is necessary to introduce oxygen, in the form of pure oxygen or as air oxygen into the oxygen gas chamber 2310 on the left side. Methane must be simultaneously introduced into the gas chamber 2320 on the right side, with the result that an electrical current is generated, according to the half-reactions below:

| At the Anode: | $CH_4 + 2 H_2O \rightarrow CO_2 + 8 H^+ + 8 e^-$ | $E^0_{ox} = -0.31$ V |
|---|---|---|
| At the Cathode: | $O_2 + 4 H^+ + 4 e^- \rightarrow 2 H_2O$ | $E^0_{red} = 1.23$ V |
| | $CH_4 + 2 O_2 \rightarrow CO_2 + 2 H_2O$ | $E^0_{cell} = 0.92$ V |

*unconfirmed, but $E^0_{red}$ is believed to be about −0.31V.

Note that the $E^0_{cell}$ is positive, meaning that the system should generate a voltage and a current. However, to date, no direct methane fuel cell has been demonstrated that operates at room temperature. This is because a suitable cell arrangement and catalyst for methane oxidation have not been identified. The inventors have found however, that a direct methane fuel cell of this type, that operates at room temperature, may be fabricated using GDEs of an example embodiment. The GDEs were based on an expanded PTFE (ePTFE) membrane.

The cathode and anode GDEs were fabricated as follows: an expanded PTFE (ePTFE) membrane (manufactured by General Electric Company; pore size 0.2 micron) was vacuum-(sputter-) deposited with a thin layer of platinum (Pt). The Pt coating layer thickness on each electrode was about 100 nm. The resulting GDEs were combined as anode and cathode in an electrochemical cell of the type shown in FIG. 7, which was charged with a 1-4 M H$_2$SO$_4$ solution. Pure methane gas was allowed to flow through the anode gas chamber and oxygen or air through the cathode gas chamber at atmospheric pressure. There was no ion exchange membrane between the cathode and anode in the cell.

Figure 15:
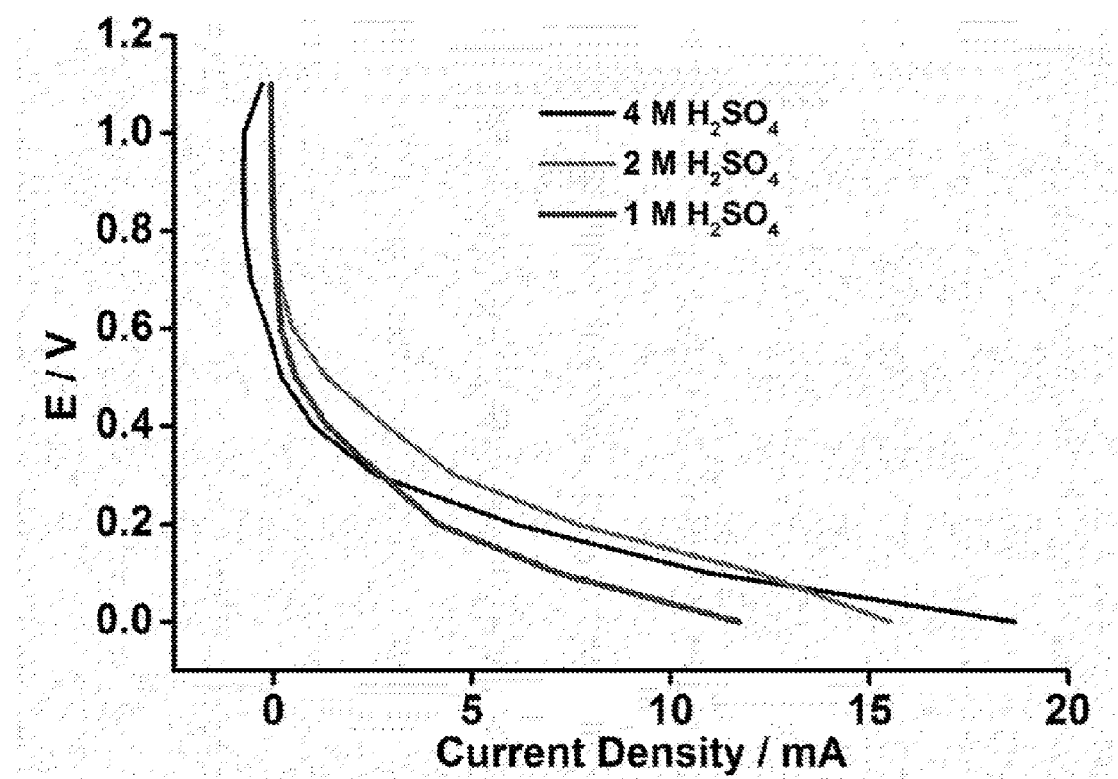
FIG. 15 depicts polarisation curves of a direct methane fuel cell at room temperature and with all gases at 1 bar.

FIG. 15 depicts the polarization curves obtained when a 1 cm gap existed between the Pt-coated ePTFE electrodes in the cell and the cell was allowed to stand for >20 min with the gases passing through their respective chambers, before the curve was recorded. As can be seen, the resulting curve depicts classical fuel cell behaviour. As can also be seen, the cell achieved a practically useful 10 mA/cm$^2$ at about 0.15 V when using 4 M H$_2$SO$_4$.

To the best of the inventors' knowledge, this is the first example ever reported of a direct methane fuel cell that operates with potentially useful currents at room temperature. The reactor architecture, involving the use of "breathable" electrodes based on ePTFE, clearly made this result possible.

It should be noted that the cell did display anomalous behaviour in that the currents below about 0.4 V were only obtained if the cell was allowed to stand for some time with the gases passing through their respective chambers, before the curve was recorded. A second scan immediately after a first scan, showed the same currents at voltages above 0.4 V, but only small currents below 0.4 V.

To try to explain this behaviour, further studies were carried out on the cell. These suggested that at about 0.4 V, there may have been a change in the electrochemical behaviour of the cell. This may have been caused by: (1) the formation of a methanic polymer over the face of the methane electrode (in analogy with methanol fuel cells where a methanolic polymer is known to form over the face of the methanol electrode; this polymer must be periodically ejected by reverse biasing the cell), (2) a kinetic effect in which the methane displayed a low affinity for the platinum catalyst below 0.4V, so that once all of the Pt-bound methane was consumed, it took some time for more methane to bind and react on the platinum at voltages below 0.4 V; or, alternatively, (3) an additional reaction taking place intermittently below about 0.4 V.

Example 8

Illustrative Example of an Alternative, "Reverse-Plumbed" Spiral-Wound Reactor—Fabrication of a "Half-Fuel Cell"

The flat-sheet and spiral-wound reactor arrangements may also be utilized in electrochemical cells that have only one of the anode or cathode as a GDE according to example embodiments. For the purposes of this example, we discuss the construction of such a device where a double-sided membrane-type cathode GDE 515 (of the type illustrated in FIG. 6) is used as the fuel-cell-type electrode, with a conventional, solid-state electrode as the anode. To construct a flat-sheet "half fuel cell" of this type, one starts with a gas-permeable, electrolyte-impermeable membrane 30 as shown in FIG. 3(*b*). The gas-permeable, electrolyte-impermeable membrane 30 can be an expanded PTFE membrane (made by General Electric Company for membrane distillation in the water purification industry) having average pore size 0.2 µm and a wetting pressure of about 3.4 bar. In order to fabricate GDE cathode 515 (depicted in FIG. 6), a conductive layer is then deposited upon both of the opposing surfaces of this membrane 30, typically using vacuum metallization. For the case of an alkaline "half fuel cell" the conductive layer is typically nickel (Ni) for the cathode. Using this technique, Ni layers of 20-50 nm may be deposited. The Ni-coated membranes may then be subjected to dip-coating using, for example, electroless nickel plating, to thicken the conducting Ni layer on their surface. The resulting cathodes 515 are exceedingly thin, being typically 10-20 microns in thickness only.

Figure 16:
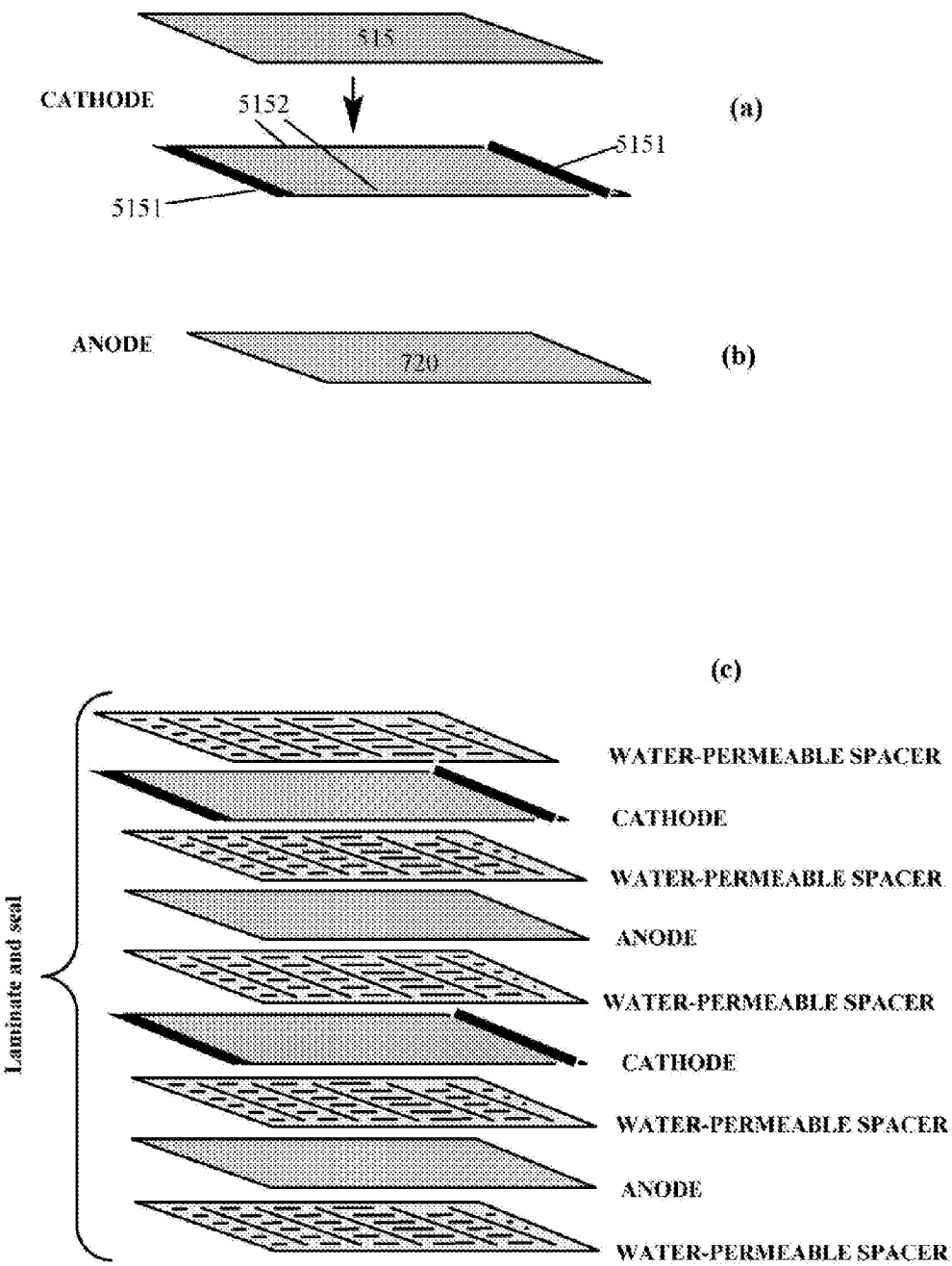
FIG. 16 schematically illustrates an example of how the anode and cathode components may be sealed and then stacked for fabrication of an example "reverse-plumbed" flat-sheet "half-fuel cell".

FIG. 16 illustrates in schematic form how to make such a "half fuel cell", where only the cathode 515 comprises of a GDE and the anode 720 is a conventional electrode, such as, for example, an iron or zinc foil of thickness 2 mm. The edges of the cathode 515 must first be sealed in order to hold the gases within. There are various ways in which this may be done. For example, the sealing may be carried out by heating and melting the edges of the GDEs under pressure using, for example, an ultrasonic welder. Laser heating may also be used to seal the edges of the cathode.

FIG. 16(*a*) illustrates one option for this sealing. The cathode 515 in FIG. 13(*a*) is sealed 5151 at two of the four edges, with the other edges left unsealed 5152 as shown. The anode 720 in FIG. 16(*b*) is a conventional electrode, such as an iron or zinc foil. As shown in FIG. 16(*c*), the anodes and cathodes are then stacked with intervening feed-channel spacers of the type depicted in FIG. 5. Note that the sealed edges of the cathodes all line up with each other along the left and right edges, whereas the unsealed edges of the cathodes line up with each other along the front and rear edge.

Figure 17:
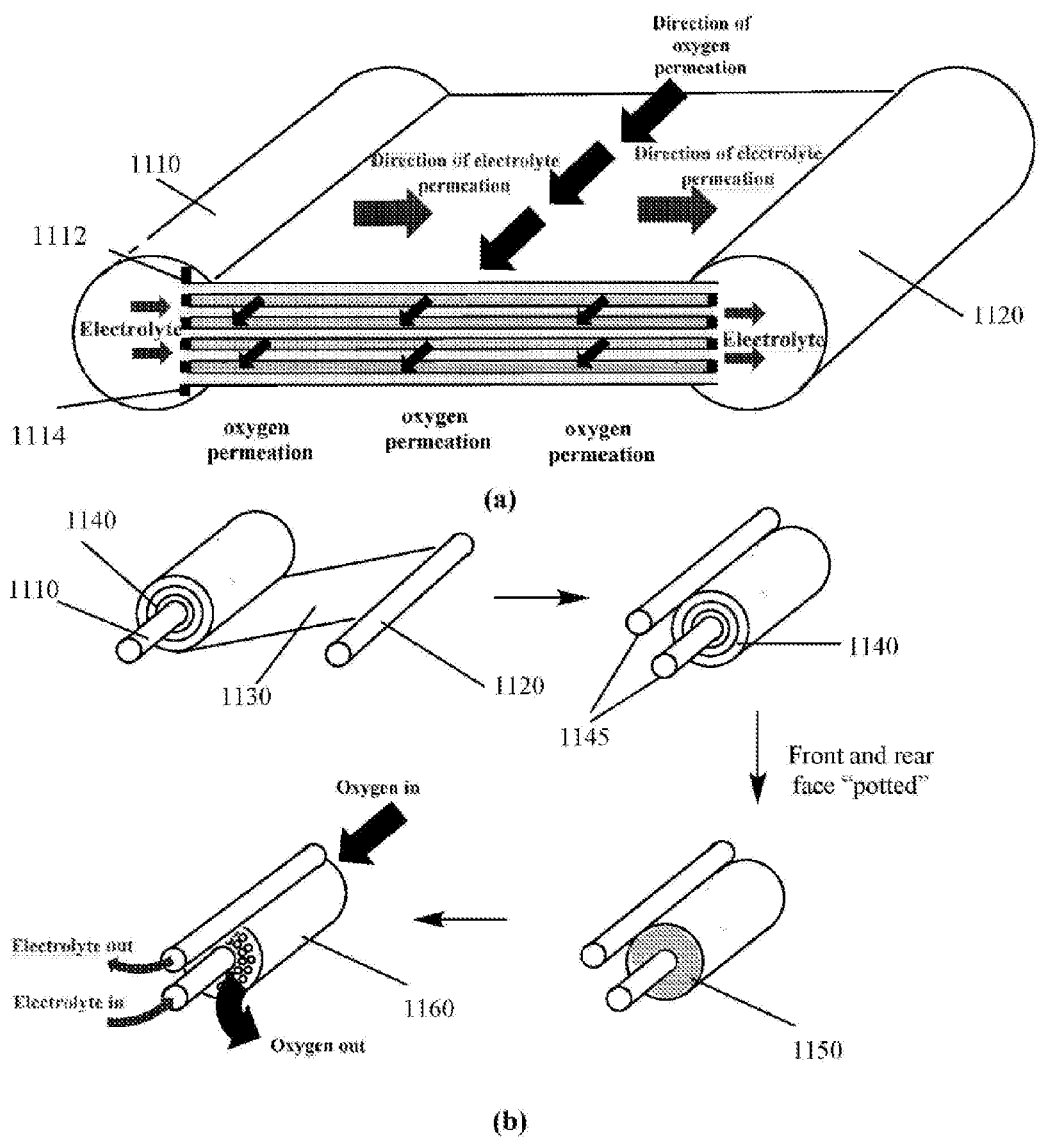
FIG. 17 schematically illustrates an example of how the stacked anode and cathode components in FIG. 16 may be combined to fabricate an example "reverse-plumbed" spiral-wound "half-fuel cell".

FIG. 17(*a*) depicts how the assembly in FIG. 16(*c*) may be turned into a half-fuel cell. A hollow tube 1110 is attached to the left side of the assembly in FIG. 16(*c*) as shown in FIG. 17(*a*). The tube has periodically spaced holes down it length. The anodes 720 and cathodes 515 are attached (glued) to the tube 1110 in such a way that liquid electrolyte within the tube 1110 would be in fluid communication with the inter-electrode vacancies in the stack that are occupied by the electrolyte-permeable feed-channel spacers 60. Electrical connection 1112 provides a negative pole, and electrical connection 1114 provides a positive pole.

Another tube 1120 is attached to the right side of the assembly. The tube has periodically spaced holes down it length. The cathodes 515 and the anodes 720 are attached to the tube 1120 in such a way that liquid electrolyte within the tube 1120 would be in fluid communication with the inter-electrode vacancies occupied by the electrolyte-permeable feed-channel spacers 60. The anodes 720 and cathodes 515 are further attached to tube 1110 in such a way that they are in electrical connection with the cathodes 515 in accordance with an electrical connection diagram of the type depicted in FIG. 10, or variants thereof. Coming out of tube 1110 are therefore two external electrical connections—a negative and a positive pole. The cell is electrically connected using these poles.

The stack 1130 is then rolled up, as shown in FIG. 17(*b*), into a spiral-wound arrangement. Once rolled up, the exposed face of the roll 1140, is "potted" using a gas-permeable, liquid-impermeable resin to seal all of the front edges of the stack. "Potting" is a process by which a gas-permeable, liquid-impermeable resin is cast upon the exposed face of the roll 1140, without blocking the outlet 1145 of the tubes 1110 and 1120. After allowing the resin to set, a saw or other suitable cutting device is used to carefully cut through the resin up to the surface of the tubes 1110 and 1120, to thereby expose the edges 5152 of cathode 515 to the atmosphere, whilst simultaneously sealing the edges of the electrolyte-permeable spacers 60 to any leakage of electrolyte. The roll 1150 is now sealed to electrolyte leakage on its front face 1150, using a resin which is permeable to gases.

The roll is similarly potted on its back face, whereafter it is incorporated into a tight-fitting polymer housing 1160 (FIG. 17(*b*)). In a module of this type, electrolyte may be circulated without leakage from the entry to tube 1110, through the spiral winding arrangement, between the layers of anodes 720 and cathodes 515, to the tube 1120, and out via the outlet to tube 1120. In other words, the spiral-winding arrangement allows for electrolyte to circulate through the stack in a controlled manner. Because the potting resin is gas-permeable, gases like pure oxygen or oxygen from air, are able to permeate in a perpendicular direction (into and out of the page) through the module. The gas-channels along which the oxygen permeate are the membrane units 30 in the cathodes 515.

The reactions in such a system, using, for example, iron as the anode are:

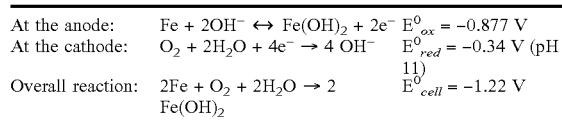

As can be seen, the cathode is effectively that of a fuel cell, however the anode metal is, effectively, a sacrificial material. The cell has a negative cell voltage meaning that it will spontaneously generate a voltage, with associated current, until such time as the anode reactant is depleted by conversion to ions in the electrolyte. At that stage, the cell will cease to operate. The cell is potentially reversible in that it can be regenerated by applying a voltage of greater than 1.22 V to cause the reverse of the above reactions to occur. The anode metal will then plate out from the electrolyte solution, regenerating the anode. Not all anode materials will be capable of reversible operation. For example, if aluminium were used as an anode, it would not operate reversibly since aluminium would not plate out of the electrolyte upon the application of a driving voltage. Other metals such as zinc or lithium (shielded from contact with water) may be used, both of which should be capable of reversible operation.

Because the cathodes are very thin—typically from about 10 to about 20 microns in thickness—they may be stacked in exceedingly high density within the spiral-wound unit. When combined with an anode of about 2 mm and an electrolyte spacer of about 2 mm, then it is clear that a very large multiplicity of electrode pairs in fluid communication with electrolyte may be created within the module. The resulting high surface area offers significant advantages in respect of the overall rate of electrochemical reaction that may be achieved. That is, very high energy densities may be achieved.

Additionally, because such modules have a very high internal surface area but a relatively small overall footprint, they can be operated at relatively low overall current densities. A typical current density would be about 10 mA/cm$^2$, which is at least one order of magnitude smaller than the current densities currently employed in most fuel cells. At so low a current density, it is potentially possible to routinely operate with near to or greater than 90% energy efficiency.

Moreover, a key problem associated with the use of metal anodes in reversible systems is the formation of metallic outgrowths from the anode after multiple cycles of forward and reverse reaction Repeated deposition of the metal from solution results in the gradual formation of surface contours on the metal anode. These outgrowths may ultimately reach the cathode and cause a short circuit in the cell, permanently disabling the cell. The use of low current densities results in slower re-deposition of metal onto the anode surface during the reverse reaction, which, in turn, minimises the development of outgrowths, thereby extending the lifetime of the cell for reversible operation.

As will be apparent to persons skilled in the art, all of the characteristics described in this example may also be realised by the use of spiral-wound devices utilizing GDEs 50 in FIG. 3. Such GDEs may be employed as the cathodes 55 in this example, with equivalent use of the approaches described. Comparable cells with the anode(s) being of the fuel cell type and the cathode(s) being a solid-state, sacrificial material, may also be conceived.

Example 9

Illustrative Example of an "Inter-Digitated" Hollow-Fibre Reactor—Fabrication of a Modular Chlor-Alkali Electrolyzer for the on-Site Production of Chlorine without Caustic, from a Non-Conventional Feedstock (Hydrochloric Acid)

Figure 18:
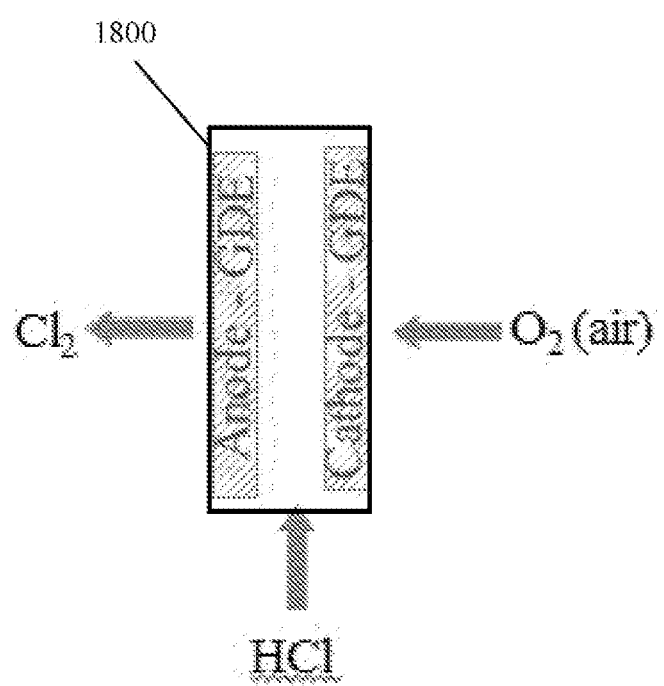
FIG. 18 schematically depicts an example cell arrangement for a variant of the chlor-alkali process.

FIG. 18 schematically depicts the key components of a cell 1800 in which the chlor-alkali electrolysis process may be adapted for the production of chlorine, without caustic, in a highly energy and cost efficient manner, that is amenable to small-scale, on-site, modular production. The cell utilizes hydrochloric acid (HCl) as the reactant. Upon the application of a suitable voltage, chlorine gas is generated in a bubble-fee manner, at the cathode, which employs an example GDE. The depolarising gas, oxygen is introduced via a GDE at the cathode.

The half-reactions that then occur are as follows:

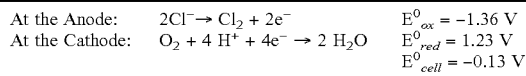

As can be seen, the cell voltage is a mere −0.13 V, which is very substantially less than the conventional chlor-alkali process that has a cell voltage of −2.19 V. Thus, such a cell is substantially cheaper to operate and more energy efficient than a cell of the conventional chlor-alkali process. Moreover, this design eliminates many of the costs and complexities of conventional chlor-alkali cells and is conducive to being used in a small-scale, modular unit for on-site production of chlorine at the point at which the chlorine is required by the user. Further details of this particular process are available in the Applicant's concurrently filed PCT patent application "Electro-Synthetic or Electro-Energy Cell with Gas Diffusion Electrode(s)" filed on 30 Jul. 2014, which is incorporated herein by reference.

Moreover, and perhaps more importantly, there is no caustic generated; chlorine is the only product. This is more practical than the conventional chlor-alkali process for users who want and need only chlorine and have no use for caustic. Additionally, the very low pH of the hydrochloric acid electrolyte suppresses chlorine dissolution in solution and avoids the formation of sodium hypochlorite in the electrolyte, since sodium hypochlorite reacts with acid to form gaseous chlorine.

Figure 19:
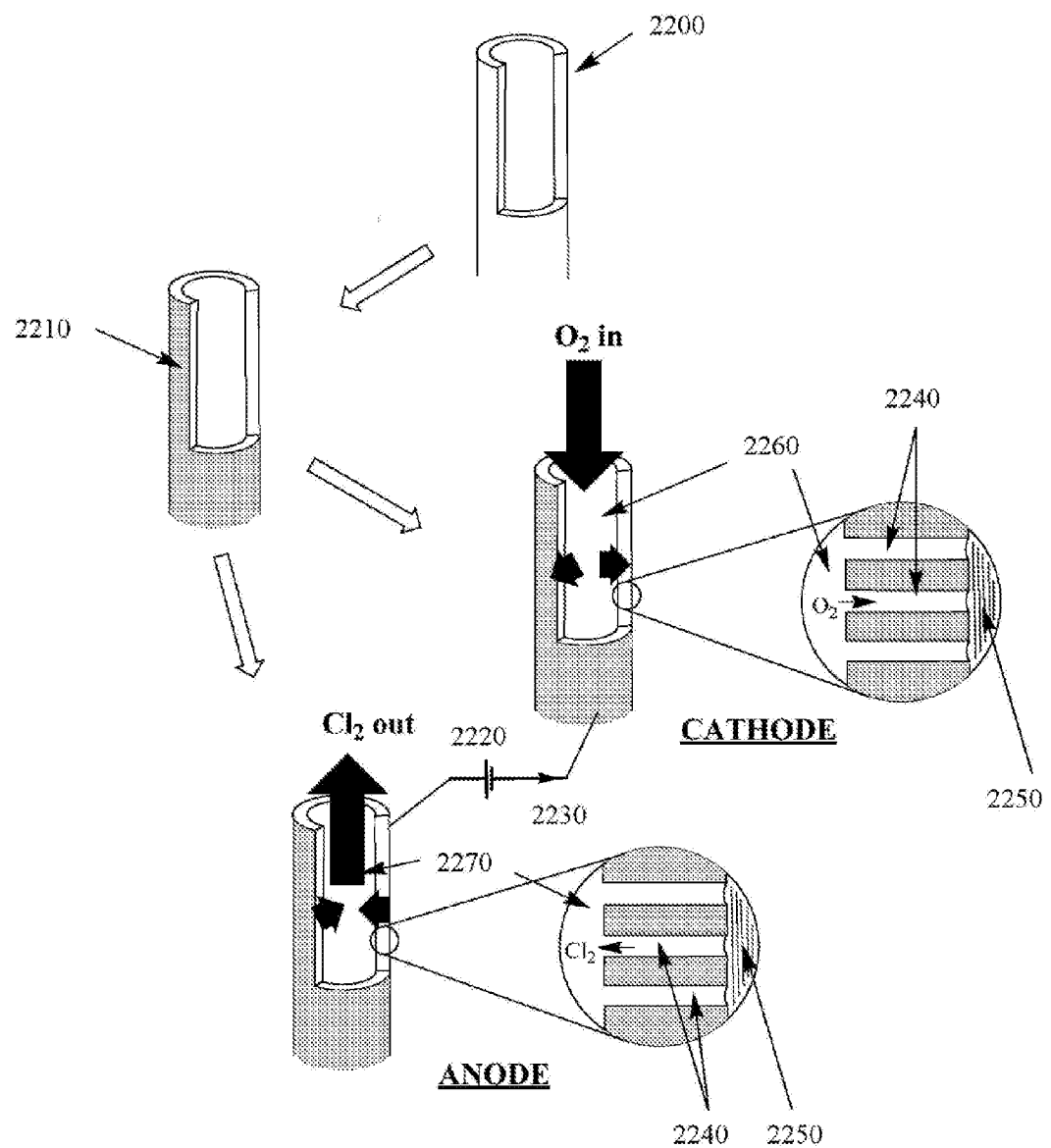
FIG. 19 schematically depicts the processes that occur in an example hollow-fibre reactor.
Figure 20:
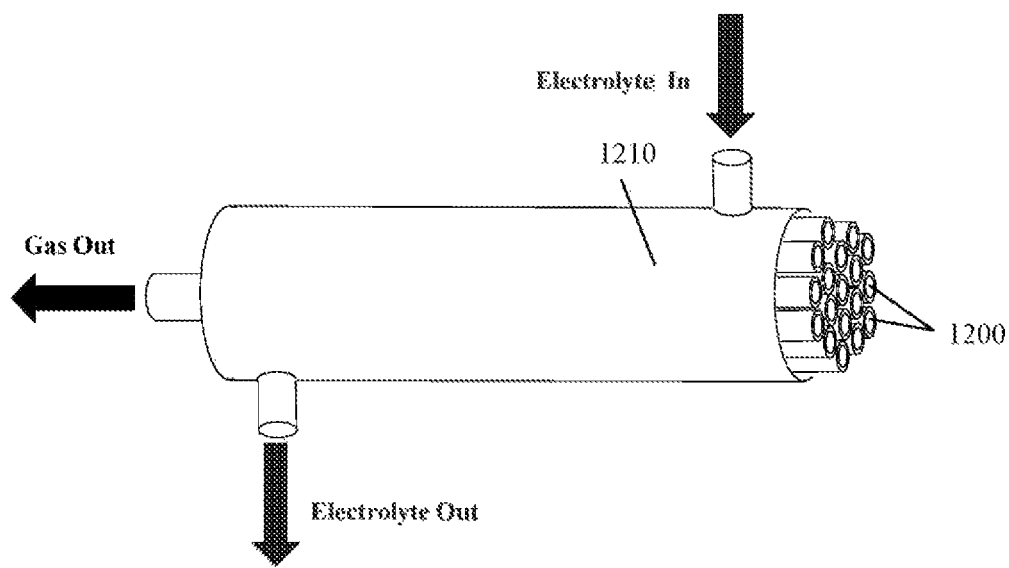
FIG. 20 schematically depicts an example hollow-fibre reactor.

For the purposes of this example, we describe an illustrative cell for chlorine production using the above process. The cell is a hollow-fibre cell. Hollow-fibre cells employ many microscopically small, hollow polymer fibres. The polymer fibres are typically gas-permeable but liquid-impermeable. FIG. 19 depicts schematically and in principle how a set of hollow-fibre anode and cathode electrodes may be configured for chlorine production as described above. FIG. 20 depicts how a set of conductive catalytic hollow-fibre membranes 1200 may be aligned and housed within a casing 1200 that allows for water to be transported around the array of hollow-fibre membranes.

To fabricate a hollow-fibre reactor, one starts with the hydrophobic hollow-fibre membrane with built-in gas spacer 2200 depicted in enlarged, schematic form in FIG. 19. Upon the surface of this membrane a conductive and catalytic layer is deposited 2210. In the case of an anode for a chlor-alkali cell using the above cell design, this layer may comprise of vacuum-coated titanium. In the case of a cathode for a chlor-alkali cell using the above cell design, this layer may comprise of nickel, optionally coated with carbon black and a binder (5%) such as Nafion. To ensure that the hollow fibre anodes or cathodes thus prepared are electrically isolated from other electrodes when in operation, they may be further coated with a thin layer of porous polymer, such as a fluoropolymer-copolymer (e.g. Nafion™) or sulfonated fluorinated polymer using standard dip-coating procedures well-known in the art. By means such as these, the hollow-fibre anode 1320 and hollow-fibre cathode 1310 depicted schematically in FIG. 21 may be prepared.

Figure 21:
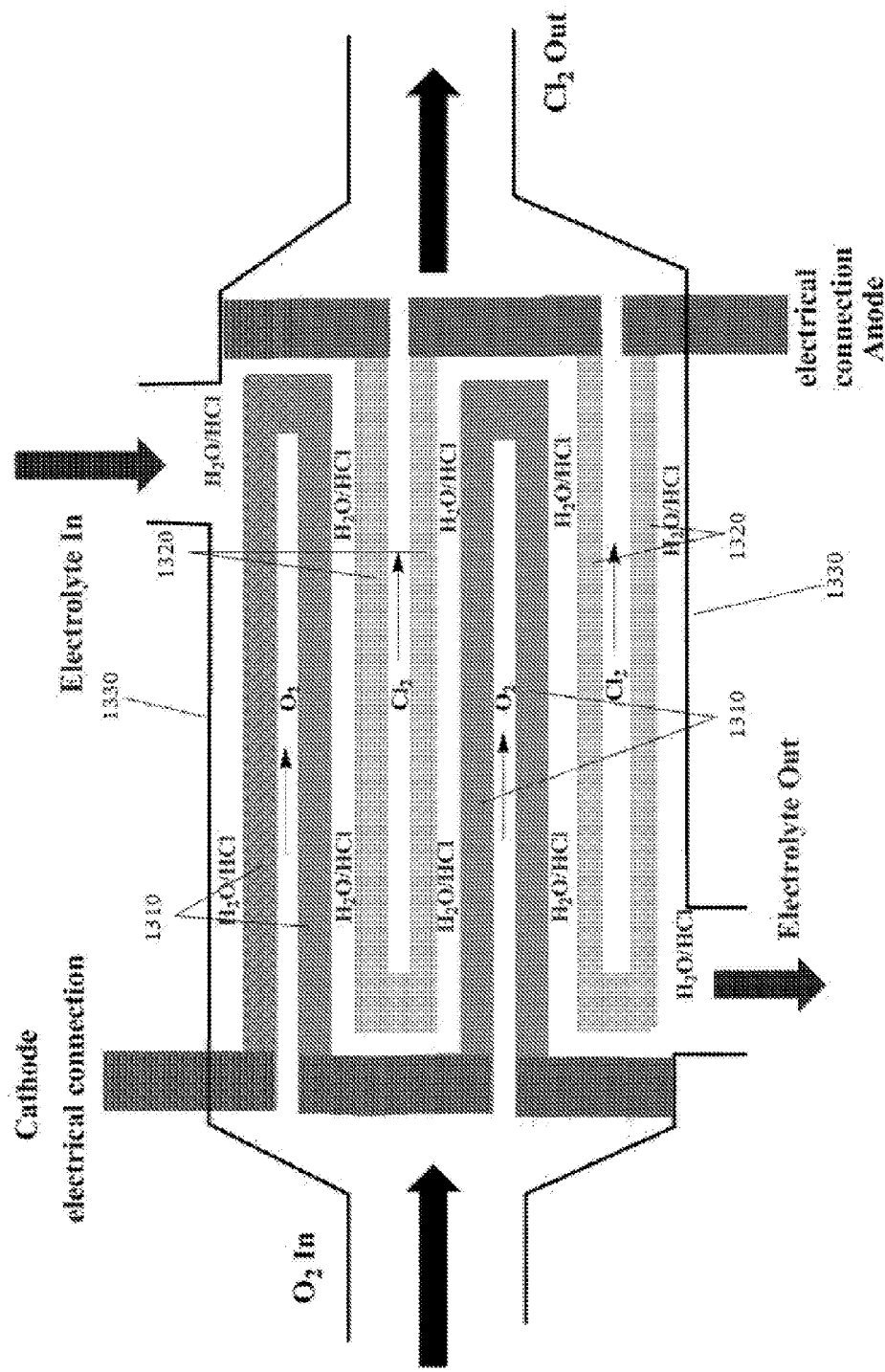
FIG. 21 schematically depicts the components and processes that occur in an example hollow-fibre reactor.

The cathodes and anodes thus prepared, are then sealed at their both ends using simple heat sealing or a laser sealing process. If necessary, the hollow-fibre membranes may be sealed prior to the deposition of the conductive and catalytic layers upon their surface. The cathode and anode hollow fibres are then interdigitated as shown schematically in FIG. 21, with their ends lying in a non-interdigitated fashion on opposite sides. In FIG. 21, the anode hollow fibres 1320 have their non-interdigitated ends on the right and the cathode hollow fibres 1310 have their non-interdigitated ends on the left.

Using a process known as "potting", conductive resin is then cast about the non-interdigitated ends of the anode hollow-fibres 1320. The adhesive is allowed to set, whereafter a conductive resin is cast about the non-interdigitated ends of the cathode hollow-fibres 1310. After the two adhesives are set, each is separately sawn through with a fine bandsaw, opening up each end of the sealed hollow fibres. The anode hollow fibres 1320 are now open on the right-hand side of the interdigitated assembly (as shown in FIG. 21), while the cathode hollow fibres 1310 are open at the left hand side of the interdigitated assembly (as shown in FIG. 21). The interdigitated assembly is now encased in a polymer case 1330 which allows water to pass between the interdigitated hollow-fibres but not into their internal gas collection channels, as shown in FIG. 21.

The anodes and cathodes will now typically be electrically connected in parallel with each other (unipolar design), with the negative external pole connected to the left-hand (cathode) conducting adhesive plug and the positive external pole connected to the right-hand (anode) conducting adhesive plug. (Bipolar designs are also conceivable in which individual fibres, or bundles of fibres are connected in series with each other so that hydrogen is generated in the hollow-fibres open at the left-hand side of the electrolyser and oxygen in the hollow-fibres open at the right-hand side of the electrolyser).

Upon applying an electrical voltage to the two conducting adhesive plugs at either end of the interdigitated arrangement, in the presence of hydrochloric acid as electrolyte, chlorine gas is formed at the surface of the anode hollow-fibres. As shown in FIG. 19, the chlorine passes through the hydrophobic pores 2240 of the hollow fibre into the internal gas collection channel 2270, without forming bubbles at the surface of the anode 2250. The chlorine is then channelled as shown in FIG. 21 into the chlorine outlet at the right of the reactor in FIG. 21. At the same time, oxygen is introduced into the cathode hollow-fibres. As shown in FIG. 19, the oxygen passes down the internal cavity 2260 of the hollow-fibres and then through the hydrophobic pores 2240 of the hollow fibre to their outer surface, without forming bubbles at the surface of the cathode 2250. The oxygen is channelled as shown in FIG. 21 into the cell via the oxygen inlet at the left of the reactor 1800 in FIG. 18. Thus, the module depicted in FIG. 21 generates pure chlorine gas upon application of a suitable voltage and input of oxygen, when electrolyte is passed through the module.

Example 10

Figure 22:
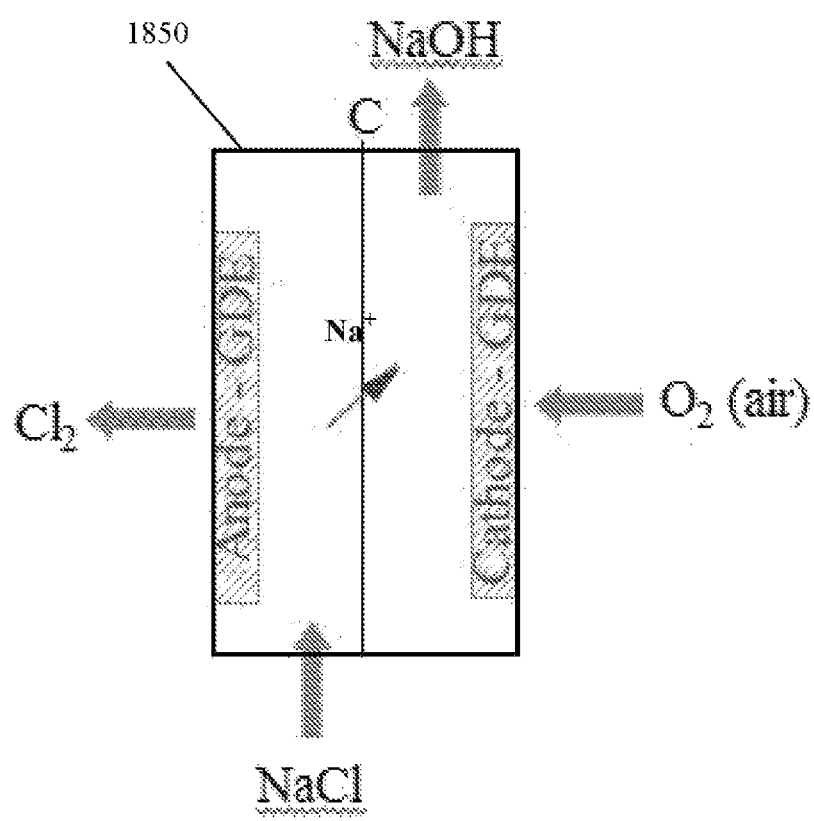
FIG. 22 schematically depicts an example cell arrangement for a second variant of the chlor-alkali process.

Illustrative Example of a "Non-Interdigitated" Hollow-Fibre Reactor—Fabrication of a Modular Chlor-Alkali Electrolysis Reactor for the on-Site Production of Chlorine with Caustic, Using a Conventional Feed Solution A range of other options exist to fabricate a hollow-fibre water electrolysis module. In order to demonstrate another, non-limiting option, reference is made to FIG. 22, which depicts a more conventional variant of cell design for the chlor-alkali process. In this modification, two GDEs are used for the anode and cathode, but the cell 1850 is divided by the presence of a sodium exchange membrane (marked "C") between the electrodes. Additionally, the electrolyte is the conventional electrolyte of brine (25% NaCl). The anode generates chlorine gas as it does in the conventional chlor-alkali process, while the cathode facilitates the introduction of the depolarising gas oxygen into the cell The reactions occurring in the cell are:

| At the Anode: | $2\ Cl^- \rightarrow Cl_2 + 2e-$ | $E^0_{ox} = -1.36\ V$ |
|---|---|---|
| At the Cathode: | $O_2 + 2\ H_2O + 4e- \rightarrow 4OH^-$ | $E^0_{red} = -0.40\ V$ |
| | | $E^0_{cell} = -0.96\ V$ |

As can be seen, the theoretical cell voltage for this arrangement is substantially lower than that of the conventional chlor-alkali process, which is 2.19 V. In fact, despite using the same electrolytes as the conventional chlor-alkali process, this particular cell arrangement diminishes the cell voltage by more than half to 0.96 V. This is estimated to decrease the operating cost (Opex) of a standard chlor-alkali cell from about $0.15/kg $Cl_2$ to $0.10/kg $Cl_2$. Moreover, due to the low cost of GDEs, of the current embodiments, capital expense (Capex) is also likely to also fall by at least 20% or more. By this means, a very substantial cost and energy saving may be realised.

Figure 23:
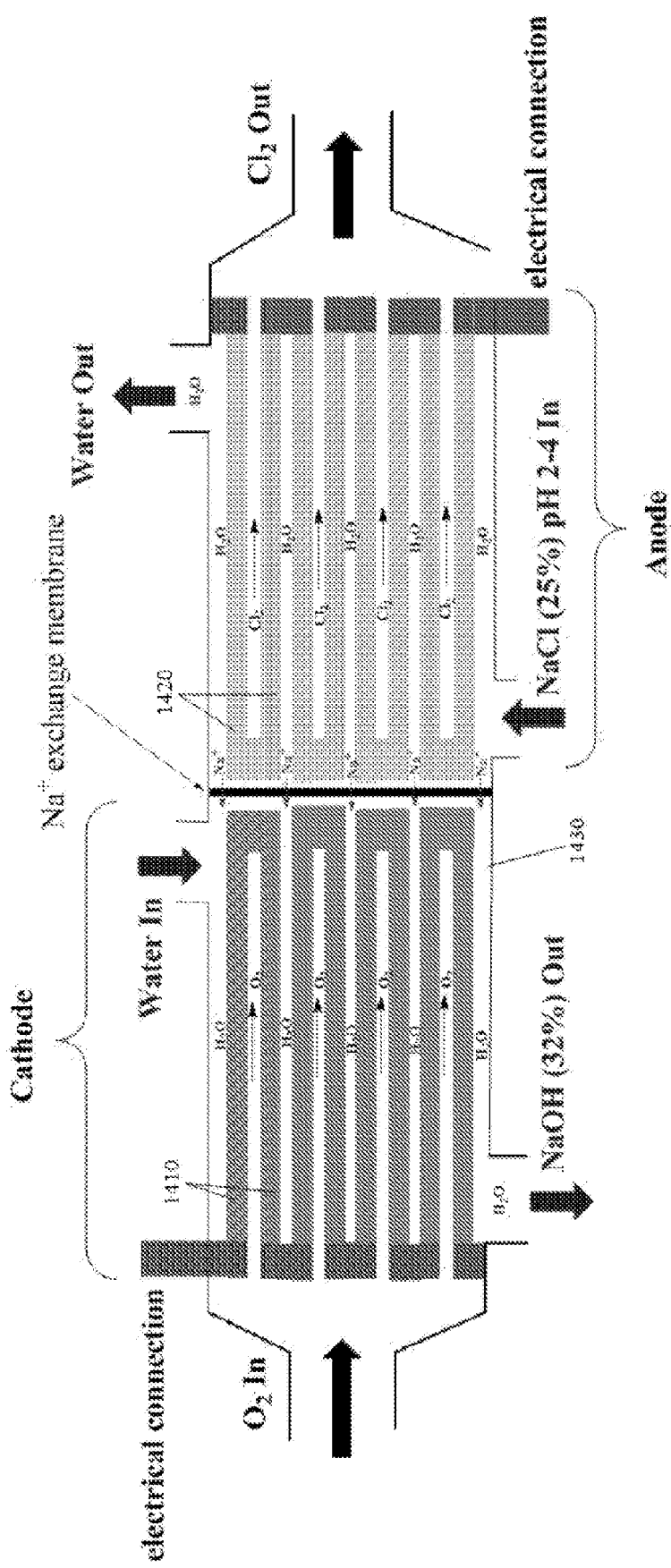
FIG. 23 schematically depicts the components and processes that occur in a second example hollow-fibre reactor.

FIG. 23 depicts a modular, hollow-fibre cell, which is capable of carrying out this process in small-scale, in a unit suitable for on-site generation of chlorine with caustic. The anode and cathode hollow fibres have not been interdigitated, but have instead been incorporated in two separate multi-layer arrangements that face each other.

On the left hand side, a set of parallel hollow-fibre cathodes 1410 have been located together within the module housing 1430, while on the right hand side, a set of parallel hollow-fibre anodes 1420 have been located together in the module housing 1430. A porous sodium exchange membrane of the type widely used in conventional chlor-alkai cells, is present between the cathode and the anode hollow-fibres. This allows for two electrolyte chambers, as is found in conventional chlor-alkali cells.

The electrolyte chamber around the anode contains acidified brine (NaCl). The electrolyte chamber around the cathode contains caustic (32% NaOH). The sodium exchange membrane facilitates the transport of $Na^+$ ions from the anode electrolyte chamber to the cathode electrolyte chamber. Upon applying an electrical voltage to the two conducting adhesive plugs at either end of the module, chlorine gas is formed at the surface of the anode hollow-fibres 1420 and is transported to the chlorine exit via the pores of the membranes and their hollow interiors. Oxygen gas is similarly introduced at the surface of the anode hollow-fibres 1410 and is transported from the oxygen inlet to the pores of the membranes via their hollow interiors. Caustic exits the cell at the cathode chamber. Brine enters at the anode chamber. Thus, the module depicted in FIG. 23 generates chlorine and caustic upon application of a suitable voltage.

Because such hollow-fibre based water electrolysis modules have a high internal surface area but a relatively small overall footprint, they can be operated at relatively low overall current densities. A typical current density would be about 10 mA/cm$^2$, which is at least an order of magnitude smaller than the current densities currently employed in most commercial water electrolysers. At so low a current density, it is possible to operate near to 90% energy efficiency.

Example 11

Fabricating Reactors Capable of Using or Producing Pressurised Gases

In many applications, it is desirable to produce or introduce gases at a pressure greater than atmospheric. In any of the reactor designs described above, it is possible to do so. A limiting factor is that, preferably at all times, the liquid electrolyte must be pressurised to a higher pressure than the gases and the differential in liquid and gas pressure (AP) must be less than the wetting pressure of the GDE used. Further details of this aspect can be found in the Applicant's concurrently filed PCT patent application "Method and Electrochemical Cell for Managing Electrochemical Reactions" filed on 30 Jul. 2014, which is incorporated herein by reference.

Example 12

Other Examples of Electrochemical Cells

It will be apparent to persons skilled in the art that the examples provided above are intended only to illustrate the many and varied cell designs and the many and varied ways in which they may be employed to carry out electro-synthetic and electro-energy processes. The examples above are not intended to be limiting. Thus, for example, the two variants of the chlor-alkali process described above in hollow-fibre reactors, may equally well be carried out in flat-sheet or spiral-wound formats. Similarly, the fuel-cell and half-fuel cell examples described above in flat-sheet and spiral-wound cells, may equally well be carried out in hollow-fibre cells.

Similarly, numerous other gas-to-liquid or liquid-to-gas transformations may be carried out in any of the above type cells, with or without modification. For example, cells or reactors may be used for other types of fuel cells including but not limited to: (a) alkaline fuel cells (AFC) containing an anion exchange membrane or having a different fundamental arrangement that that described above, or (b) acid fuel cells having a different fundamental arrangement that that described above, including but not limited to phosphoric acid fuel cells (PAFC) and Proton Exchange Membrane (PEM) fuel cells. In such cases, the reactor is capable of acting as a reversible fuel cell (i.e. one that also facilitates the reverse, electrolysis reaction). For example, the reactor may be capable of acting as a water electrolyser which uses electricity to convert water into hydrogen and oxygen, as well as a fuel cell which converts hydrogen and oxygen into water to thereby generate electricity.

The same is true for a range of variants of "half fuel cell" processes, in which one electrode, either the anode or cathode, functions as it may in a fuel cell, whereas the second electrode is a conventional solid-state electrode. The "fuel cell" electrode may act in the same way the fuel cell would in other fuel cell devices, including but not limited to: (a) alkaline fuel cells (AFC), including alkaline fuel cells containing an anion exchange membrane or having a different fundamental arrangement that that described above, or (b) acid fuel cells including acid fuel cells having a different fundamental arrangement that that described above, including but not limited to phosphoric acid fuel cells (PAFC) and Proton Exchange Membrane (PEM) fuel cells. The second, conventional electrode may be a solid material.

In further alternative embodiments, example cells or reactors may be used to facilitate a range of other the electrochemical processes, including but not limited to the manufacture of: (a) chlorine, (b) hydrogen peroxide, (c) fuels from $CO_2$, (d) ozone, (e) caustic, (f) potassium permanganate, (g) chlorate, (h) perchlorate, (i) fluorine, (j) bromine, (k) persulfate, and others. In still further alternative embodiments, example cells or reactors may be used to facilitate electrochemical processes in the pulp and paper industry, including but not limited to: (a) "black liquor" electrolysis, (b) "Tall Oil recovery" and (c) chloride removal electrolysis. In other alternative embodiments, example cells or reactors may be used to facilitate electrometallurgical processes, such as metal electrowinning in narrow-gap chambers, in undivided electrolysis cells of the type that are widely used in electrometallurgical processes.

Example 13

Examples Illustrating Means to Optimise Power Engineering in Reactors that Require Electrical Power The optimum overall electrical configuration for an example electrolysis unit may be determined by aiming to match its power requirement to the industrial or residential three-phase power that is available. If this can be achieved, then the power loss in going from AC to DC can be limited to essentially zero, since only diodes and capacitors are required for the rectifier, and not a transformer.

For example, in Australia three-phase mains power provides 600 Volts DC, with a maximum current load of 120 Amps. If the individual cells in the electrolysis unit operate optimally at 1.6 V DC and a current density of 10 mA/cm$^2$, and contain one GDE anode and one GDE cathode of 1 m$^2$ each, then the electrolysis unit would need 375 cells in series in order to draw 600 Volts DC. Each individual cell will then experience a voltage of 1.6 Volt DC. The overall current drawn by such an electrolyser would be 100 Amps, giving an overall power of 60 kW.

Figure 24:
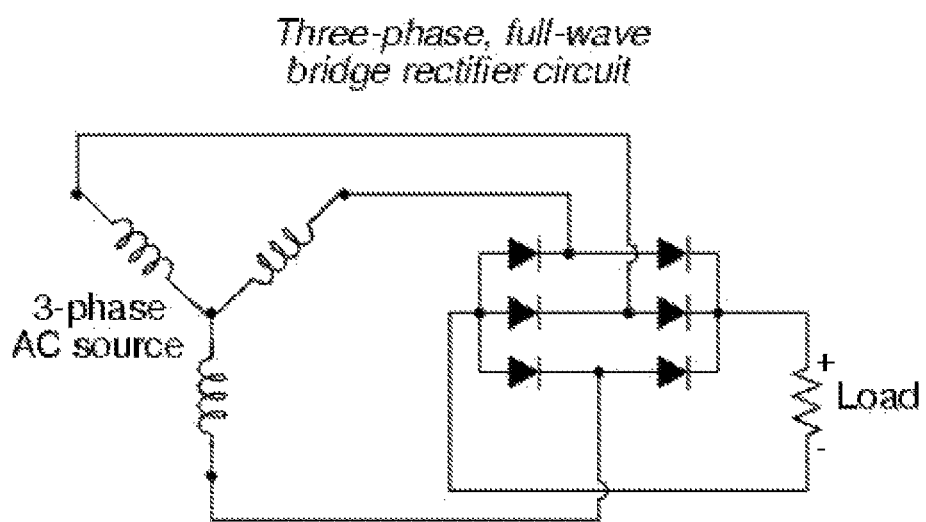
FIG. 24 schematically depicts a rectifier circuit that is useful in the power electronics of electrolysis cells.

To build such an electrolysis cell one would combine 19 of the bipolar version of, for example, the above spiral-wound modules in series. This would yield 380 cells in total, each of which would experience 600/380=1.58 Volts DC. The overall current drawn by the electrolysis cell would then be 101 Amps, which is well within the maximum current load of the Australian three-phase power supply. Such an electrolysis cell would generate 34.2 kg of hydrogen per 24 hour day, with near to 100% efficiency in its conversion of AC to DC electricity. It could be plugged into a standard three-phase wall socket. The AC to DC conversion unit in the power supply required for such an electrolyser could be a very simple arrangement of six diodes and beverage-can sized capacitors wired in a delta arrangement of the type shown in FIG. 24. Units of this type are currently commercially available at $200-$300 each (for example, the "SEMI-KRON—SKD 160/16—BRIDGE RECTIFIER, 3 PH, 160A, 1600V"). Thus, the cost of the power supply would also be minimized and, effectively, trivial overall.

Several alternative approaches exist in which the available three-phase power may be efficiently harnessed. For example, another approach is to subject the three-phase power to half-wave rectification using a very simple circuit that again utilizes only diodes and capacitors and thereby avoids electrical energy losses. An electrolyser tailored to half-wave rectified 300 Volt DC would ideally contain 187 individual cells of the above type in series. Such an electrolyser could be constructed of 9 bipolar modules connected in series, which comprise of 180 individual cells. Each cell would experience 1.67 Volts DC. The overall current drawn would be 96 Amps. Such an electrolyser would generate 16.2 kg of hydrogen per 24 hour day. The electrolyser could be plugged into a standard three-phase wall socket.

Example 14

Other Means of Fabricating Tubular Modules

In an alternative example embodiment, applicable to any of the aforementioned applications, tubular modules comprising stacks of concentric sheet electrodes with associated gas channels and electrolyte channels may be fabricated by means that do not involved physically winding the flexible electrodes onto a central core element. For example, the techniques used in the manufacture of multi-layer cladding on electrical or power cables or wiring may be used to fabricate such modules. In this method, each concentric layer in the module is produced by successive extrusion or co-extrusion steps, to thereby build-up the module structure in a layer-by-layer manner. The resulting module has a very similar appearance to the spiral-wound module. It also performs the same function and therefore falls within the spirit and scope of the current application.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

Optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The invention claimed is:

1. A gas diffusion electrode for an electro-synthetic or electro-energy cell, comprising:
   one or more gas permeable layers;
   a first conductive layer provided on a first side of the gas diffusion electrode, wherein the first conductive layer comprises a porous conductive material; and
   a second layer provided on a second side of the gas diffusion electrode;
   wherein the one or more gas permeable layers provide a gas channel, and the one or more gas permeable layers are positioned between the first conductive layer and the second layer.

2. The electrode of claim 1, wherein the second layer provides a second conductive layer.

3. The electrode of claim 2, wherein the second conductive layer comprises a porous conductive material.

4. The electrode of claim 1, wherein the porous conductive material is a porous metallic material.

5. The electrode of claim 1, wherein, in use, the first side of the gas diffusion electrode and the second side of the gas diffusion electrode contact a liquid electrolyte.

6. The electrode of claim 5, wherein the one or more gas permeable layers are gas permeable and impermeable to the liquid electrolyte.

7. The electrode of claim 1, wherein the porous conductive material is gas permeable and liquid electrolyte permeable.

8. The electrode of claim 1, wherein there are two or more gas permeable layers.

9. The electrode of claim 1, comprising a spacer positioned between the first conductive layer and the second layer.

10. The electrode of claim 9, wherein the spacer is a different material to the one or more gas permeable layers.

11. The electrode of claim 1, wherein the gas diffusion electrode is a double-sided electrode.

12. The electrode of claim 11, further comprising an electrolyte spacer positioned between adjacent gas diffusion electrodes.

13. The electrode of claim 12, wherein a liquid electrolyte can move through the electrolyte spacer.

14. The electrode of claim 1, wherein the first conductive layer and/or the second layer are provided adjacent to or on the one or more gas permeable layers.

15. The electrode of claim 1, wherein the first conductive layer and/or the second layer are deposited on the one or more gas permeable layers.

16. The electrode of claim 1, wherein the gas channel is able to transport gas internally in the gas diffusion electrode.

17. The electrode of claim 1, wherein the one or more gas permeable layers are formed from a gas permeable material.

18. The electrode of claim 17, wherein the gas permeable material is selected from the group of PTFE, ePTFE, polypropylene, polyethylene, polyethersulfone and polysulfone.

19. The electrode of claim 9, wherein the one or more gas permeable layers and the spacer are contiguous.

20. The electrode of claim 12, wherein a gas is extracted or introduced in the gas channel that is substantially parallel to an electrolyte channel provided by the electrolyte spacer.

21. The electrode of claim 20, wherein the gas is extracted or introduced in one direction and a second gas is extracted or introduced in another direction via a second gas channel in a second gas diffusion electrode.

22. The electrode of claim 21, wherein the electrolyte channel is separate from the gas channel and is positioned between the gas diffusion electrode and the second gas diffusion electrode.

23. The electrode of claim 9, wherein the spacer is flexible.

24. The electrode of claim 9, wherein the spacer is a non-conductive polymer, a polyolefin mesh, an electrically insulating polymer net or is provided by embossed polymer structures.

25. The electrode of claim 1, wherein bubbles of gas are not produced at the gas diffusion electrode.

26. The electrode of claim 1, wherein the gas diffusion electrode includes a barrier layer, and the barrier layer limits an amount of an undesired gas permeating through the gas diffusion electrode.

27. A gas diffusion electrode for an electro-synthetic or electro-energy cell, comprising:
one or more gas permeable layers;
a first conductive layer provided on a first side of the gas diffusion electrode;
a second layer provided on a second side of the gas diffusion electrode; and
a spacer positioned between the first conductive layer and the second layer;
wherein the one or more gas permeable layers provide a gas channel, and the one or more gas permeable layers are positioned between the first conductive layer and the second layer, and the spacer forms at least part of the gas channel.

28. The electrode of claim 27, wherein the first conductive layer comprises a porous conductive material.

29. The electrode of claim 27, wherein the second layer provides a second conductive layer.

30. The electrode of claim 29, wherein the second conductive layer comprises a porous conductive material.

31. The electrode of claim 28, wherein the porous conductive material is a porous metallic material.

32. The electrode of claim 27, wherein, in use, the first side of the gas diffusion electrode and the second side of the gas diffusion electrode contact a liquid electrolyte.

33. The electrode of claim 32, wherein the one or more gas permeable layers are gas permeable and impermeable to the liquid electrolyte.

34. The electrode of claim 28, wherein the porous conductive material is gas permeable and liquid electrolyte permeable.

35. The electrode of claim 27, wherein there are two or more gas permeable layers.

36. The electrode of claim 27, wherein the spacer is a different material to the one or more gas permeable layers.

37. The electrode of claim 27, wherein the gas diffusion electrode is a double-sided electrode.

38. The electrode of claim 37, further comprising an electrolyte spacer positioned between adjacent gas diffusion electrodes.

39. The electrode of claim 38, wherein a liquid electrolyte can move through the electrolyte spacer.

40. The electrode of claim 27, wherein the first conductive layer and/or the second layer are provided adjacent to or on the one or more gas permeable layers.

41. The electrode of claim 27, wherein the first conductive layer and/or the second layer are deposited on the one or more gas permeable layers.

42. The electrode of claim 27, wherein the gas channel is able to transport gas internally in the gas diffusion electrode.

43. The electrode of claim 27, wherein the one or more gas permeable layers are formed from a gas permeable material.

44. The electrode of claim 43, wherein the gas permeable material is selected from the group of PTFE, ePTFE, polypropylene. polyethylene, polyethersulfone and polysulfone.

45. The electrode of claim 27, wherein the one or more gas permeable layers and the spacer are contiguous.

46. The electrode of claim 38, wherein a gas is extracted or introduced in the gas channel that is substantially parallel to an electrolyte channel provided by the electrolyte spacer.

47. The electrode of claim 46, wherein the gas is extracted or introduced in one direction and a second gas is extracted or introduced in another direction via a second gas channel in a second gas diffusion electrode.

48. The electrode of claim 47, wherein the electrolyte channel is separate from the gas channel and is positioned between the gas diffusion electrode and the second gas diffusion electrode.

49. The electrode of claim 27, wherein the spacer is flexible.

50. The electrode of claim 27, wherein the spacer is a non-conductive polymer, a polyolefin mesh, an electrically insulating polymer net or is provided by embossed polymer structures.

51. The electrode of claim 27, wherein bubbles of gas are not produced at the gas diffusion electrode.

52. The electrode of claim 27, wherein the gas diffusion electrode includes a barrier layer, and the barrier layer limits an amount of an undesired gas permeating through the gas diffusion electrode.

* * * * *

UNITED STATES PATENT AND TRADEMARK OFFICE
CERTIFICATE OF CORRECTION

PATENT NO.        : 9,871,255 B2
APPLICATION NO.   : 14/908352
DATED             : January 16, 2018
INVENTOR(S)       : Gerhard Frederick Swiegers et al.

It is certified that error appears in the above-identified patent and that said Letters Patent is hereby corrected as shown below:

On the Title Page

Item (30), (Foreign Application Priority Data) at Line 3, Change "2013804804" to --2013904804--.

In the Specification

In Column 10 at Line 61, Change "(LI-V)" to --(LHV)--.

In Column 11 at Line 61, Change "cathodelanode" to --cathode/anode--.

In Column 13 at Line 50, Change "ODE" to --GDE--.

In Column 16 at Line 48, After "operation)" insert --.--.

In Column 19 at Line 8, Change "metals," to --metals;--.

In Column 24 at Line 17, Change "material," to --material;--.

In Column 30 at Line 19, Change "operating" to --operating,--.

In Column 33 at Line 5, Change "mA/cm$^{Z}$" to --mA/cm$^2$--.

In Column 34 at Line 12 (approx.), Before "range" delete "5".

In Column 34 at Line 13 (approx.), Change "mun," to --µm,--.

In Column 47 at Line 22, Change "Naftion™," to --Nafion™,--.

In Column 48 at Lines 5-14, Delete "For the purposes of the current example, we will consider that the series arrangement shown at the bottom of FIG. 12 is present. The schematic in FIG. 11(a) illustrates a Signed and Sealed this
First Day of May, 2018

Andrei Iancu
*Director of the United States Patent and Trademark Office*

"flat-sheet" design for a hydrogen-oxygen fuel cell stack. During operation of the fuel cell, electrolyte is allowed to permeate through the flow-channel spacers in the direction (out of the page) shown in FIG. (11(a)). Thus, during operation, aqueous electrolyte is present at and fills the space between the anodes and cathodes which is otherwise unoccupied by the feed-channel spacers 40." and insert the same on Column 48, Line 4, as a continuation of the same paragraph.

In Column 51 at Line 19, Change "HHV)" to --HHV).--.

In Column 55 at Line 50 (approx.), After "reaction" insert --.--.

In Column 58 at Line 54, Change "chlor-alkai" to --chlor-alkali--.

In Column 59 at Line 27, Change "(AP)" to --($\Delta$P)--.

In the Claims

In Column 64 at Line 18, In Claim 44, change "propylene." to --propylene,--.